(12) United States Patent
Shkolnik et al.

(10) Patent No.: US 10,196,970 B2
(45) Date of Patent: Feb. 5, 2019

(54) ISOCHORIC HEAT ADDITION ENGINES AND METHODS

(71) Applicant: LiquidPiston, Inc., Bloomfield, CT (US)

(72) Inventors: Nikolay Shkolnik, West Hartford, CT (US); Alexander Shkolnik, Wilmington, MA (US)

(73) Assignee: LiquidPiston, Inc., Bloomfield, CT (US)

( * ) Notice: Subject to any disclaimer, the term of this patent is extended or adjusted under 35 U.S.C. 154(b) by 0 days.

(21) Appl. No.: 15/197,149

(22) Filed: Jun. 29, 2016

(65) Prior Publication Data

US 2016/0312691 A1  Oct. 27, 2016

Related U.S. Application Data

(63) Continuation of application No. 14/518,531, filed on Oct. 20, 2014, now Pat. No. 9,382,851, which is a
(Continued)

(51) Int. Cl.
*F02B 53/14* (2006.01)
*F02B 33/40* (2006.01)
(Continued)

(52) U.S. Cl.
CPC ............... *F02B 53/14* (2013.01); *F01C 1/20* (2013.01); *F01C 1/322* (2013.01); *F01C 1/328* (2013.01);
(Continued)

(58) Field of Classification Search
CPC .......... F02B 53/14; F02B 33/40; F02B 53/00; F02D 1/065; F01C 1/02; F01C 1/322;
(Continued)

(56) References Cited

U.S. PATENT DOCUMENTS

| 939,751 A | 11/1909 | Schulz |
| 1,976,042 A | 10/1934 | Skouland |

(Continued)

FOREIGN PATENT DOCUMENTS

| CA | 2 352 047 A1 | 3/2000 |
| EP | 0 345 055 A2 | 12/1989 |

(Continued)

OTHER PUBLICATIONS

The Paulding Racer, The EMD 567 Series Two-Cycle Uniflow Engine, an Inspiration: Part 3, 8 pages, Mar. 22, 2013.

*Primary Examiner* — John Kwon
*Assistant Examiner* — Johnny H Hoang
(74) *Attorney, Agent, or Firm* — Sunstein Kann Murphy & Timbers LLP

(57) ABSTRACT

Engines and methods execute a high efficiency hybrid cycle, which is implemented in a volume within an engine. The cycle includes isochoric heat addition and over-expansion of the volume within the engine, wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

10 Claims, 49 Drawing Sheets

Related U.S. Application Data continuation of application No. 12/535,529, filed on Aug. 4, 2009, now Pat. No. 8,863,724.

(60) Provisional application No. 61/219,495, filed on Jun. 23, 2009, provisional application No. 61/184,627, filed on Jun. 5, 2009, provisional application No. 61/154,539, filed on Feb. 23, 2009, provisional application No. 61/149,889, filed on Feb. 4, 2009, provisional application No. 61/085,928, filed on Aug. 4, 2008.

(51) Int. Cl.
| | | |
|---|---|---|
| *F01C 1/20* | (2006.01) | |
| *F01C 1/32* | (2006.01) | |
| *F01C 1/328* | (2006.01) | |
| *F01C 1/344* | (2006.01) | |
| *F01C 1/356* | (2006.01) | |
| *F01C 9/00* | (2006.01) | |
| *F01C 21/08* | (2006.01) | |
| *F02D 1/06* | (2006.01) | |

(52) U.S. Cl.
CPC .......... *F01C 1/3443* (2013.01); *F01C 1/3446* (2013.01); *F01C 1/3562* (2013.01); *F01C 9/002* (2013.01); *F01C 21/0809* (2013.01); *F02B 33/40* (2013.01); *F02D 1/065* (2013.01); *F01C 21/0836* (2013.01)

(58) Field of Classification Search
CPC ...... F01C 1/328; F01C 1/3443; F01C 1/3446; F01C 1/3562; F01C 9/002; F01C 21/0809; F01C 21/0836
USPC .................................................. 123/200–249
See application file for complete search history.

(56) References Cited

U.S. PATENT DOCUMENTS

| | | | |
|---|---|---|---|
| 2,070,138 A | 2/1937 | Martin | |
| 2,175,265 A | 10/1939 | Johnson | |
| 2,344,496 A | 3/1944 | Conradt | |
| 2,530,281 A | 11/1950 | Barsby | |
| 2,762,346 A | 9/1956 | White | |
| 3,102,682 A | 9/1963 | Paschke | |
| 3,112,870 A | 12/1963 | Bentele | |
| 3,315,648 A | 4/1967 | Castillo | |
| 3,316,887 A | 5/1967 | Melvin | |
| 3,410,254 A | 11/1968 | Huf | |
| 3,441,007 A * | 4/1969 | Johannes | F02B 53/00 123/242 |
| 3,508,530 A | 4/1970 | Clawson | |
| 3,688,749 A | 9/1972 | Wankel | |
| 3,769,788 A | 11/1973 | Korper, III | |
| 3,782,337 A | 1/1974 | Feller | |
| 3,809,024 A | 5/1974 | Abbey | |
| 3,834,845 A | 9/1974 | Siler | |
| 3,978,825 A | 9/1976 | Rogers | |
| 4,028,892 A | 6/1977 | Hinkle | |
| 4,423,710 A | 1/1984 | Williams | |
| 4,486,159 A | 12/1984 | Garside | |
| 5,228,414 A | 7/1993 | Crawford | |
| 5,622,149 A * | 4/1997 | Wittry | F01C 1/07 123/202 |
| 5,865,608 A * | 2/1999 | Goodman | F01B 3/0032 418/101 |
| 6,062,203 A | 5/2000 | Takahashi et al. | |
| 6,135,092 A | 10/2000 | Schaenzer et al. | |
| 7,117,839 B2 | 10/2006 | Horstin | |
| 8,037,862 B1 * | 10/2011 | Jacobs | F01C 1/22 123/200 |
| 8,297,252 B1 * | 10/2012 | Landin | F02B 53/00 123/228 |
| 8,312,859 B2 | 11/2012 | Rom et al. | |
| 8,523,546 B2 * | 9/2013 | Shkolnik | F01C 1/22 418/61.2 |
| 8,862,367 B2 | 10/2014 | Toyohara et al. | |
| 2004/0011321 A1 * | 1/2004 | Al Hawaj | F01C 1/3446 123/243 |
| 2004/0244765 A1 * | 12/2004 | Elmer | F01C 11/002 123/244 |
| 2007/0256660 A1 * | 11/2007 | Tathuzaki | F01C 1/44 123/245 |
| 2008/0141973 A1 | 6/2008 | Shkolnik et al. | |
| 2008/0314350 A1 * | 12/2008 | Reisser | F01C 9/002 123/18 R |
| 2009/0145402 A1 | 6/2009 | Sano | |
| 2010/0122683 A1 * | 5/2010 | Kawana | B25F 5/008 123/195 C |
| 2011/0023814 A1 * | 2/2011 | Shkolnik | F01C 1/20 123/210 |
| 2011/0247583 A1 * | 10/2011 | Shkolnik | F01C 1/3564 123/245 |
| 2012/0171047 A1 | 7/2012 | Itzel et al. | |
| 2012/0294747 A1 | 11/2012 | Shkolnik et al. | |
| 2014/0209056 A1 * | 7/2014 | Shkolnik | F01C 1/104 123/241 |
| 2016/0341042 A1 | 11/2016 | Shkolnik et al. | |

FOREIGN PATENT DOCUMENTS

| | | |
|---|---|---|
| GB | 420860 A | 12/1934 |
| GB | 1046504 A | 10/1966 |
| JP | 6272402 | 5/1987 |
| JP | 484729 | 7/1992 |
| WO | WO 96/12870 A1 | 5/1996 |
| WO | WO 2010/017199 A2 | 2/2010 |
| WO | WO 2012/135556 A2 | 10/2012 |

* cited by examiner

Ideal (Air-standard) Cycle Efficiency (Otto cycle is assumed not to operate at a compression ratio above ~10)

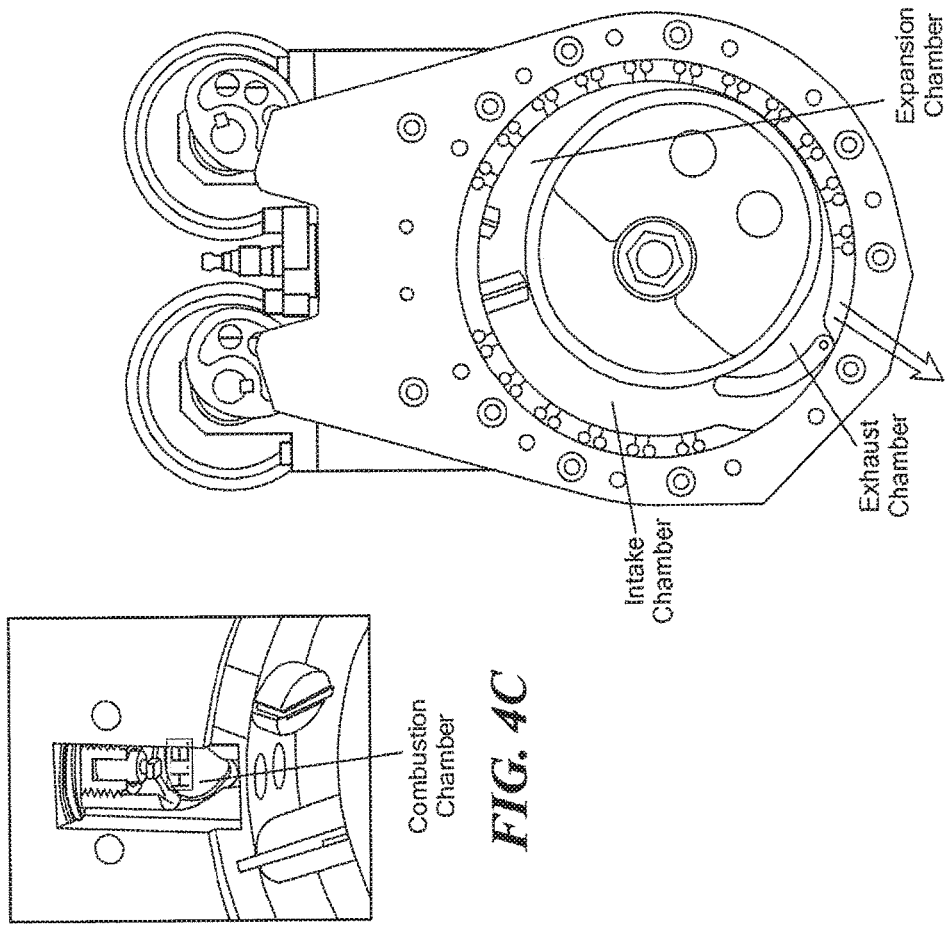
FIG. 4B
FIG. 4C
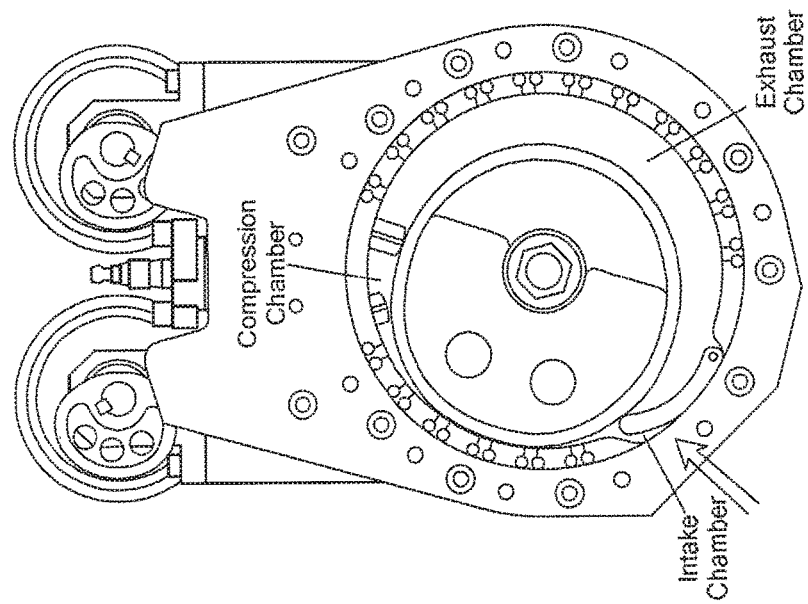
FIG. 4A

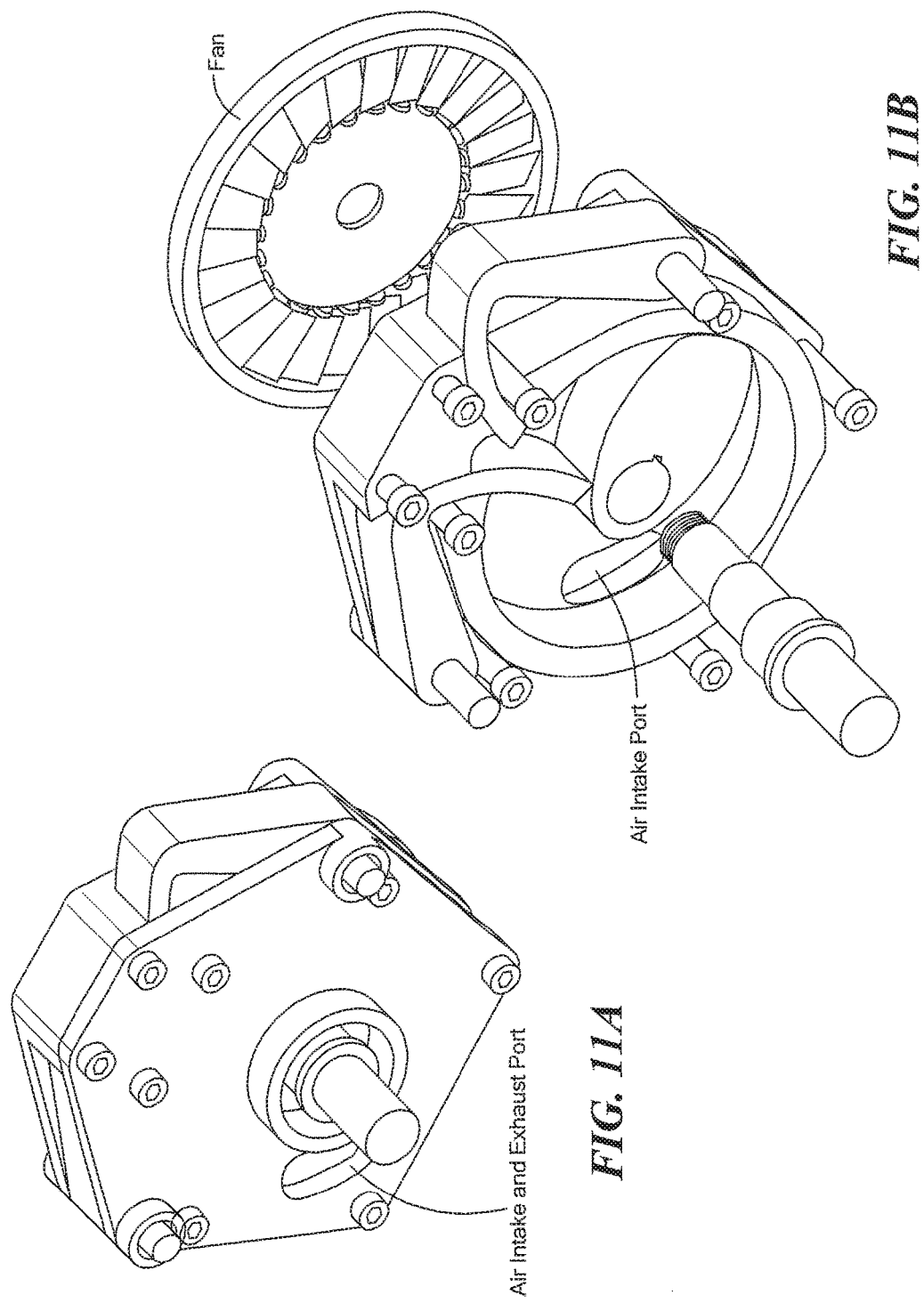

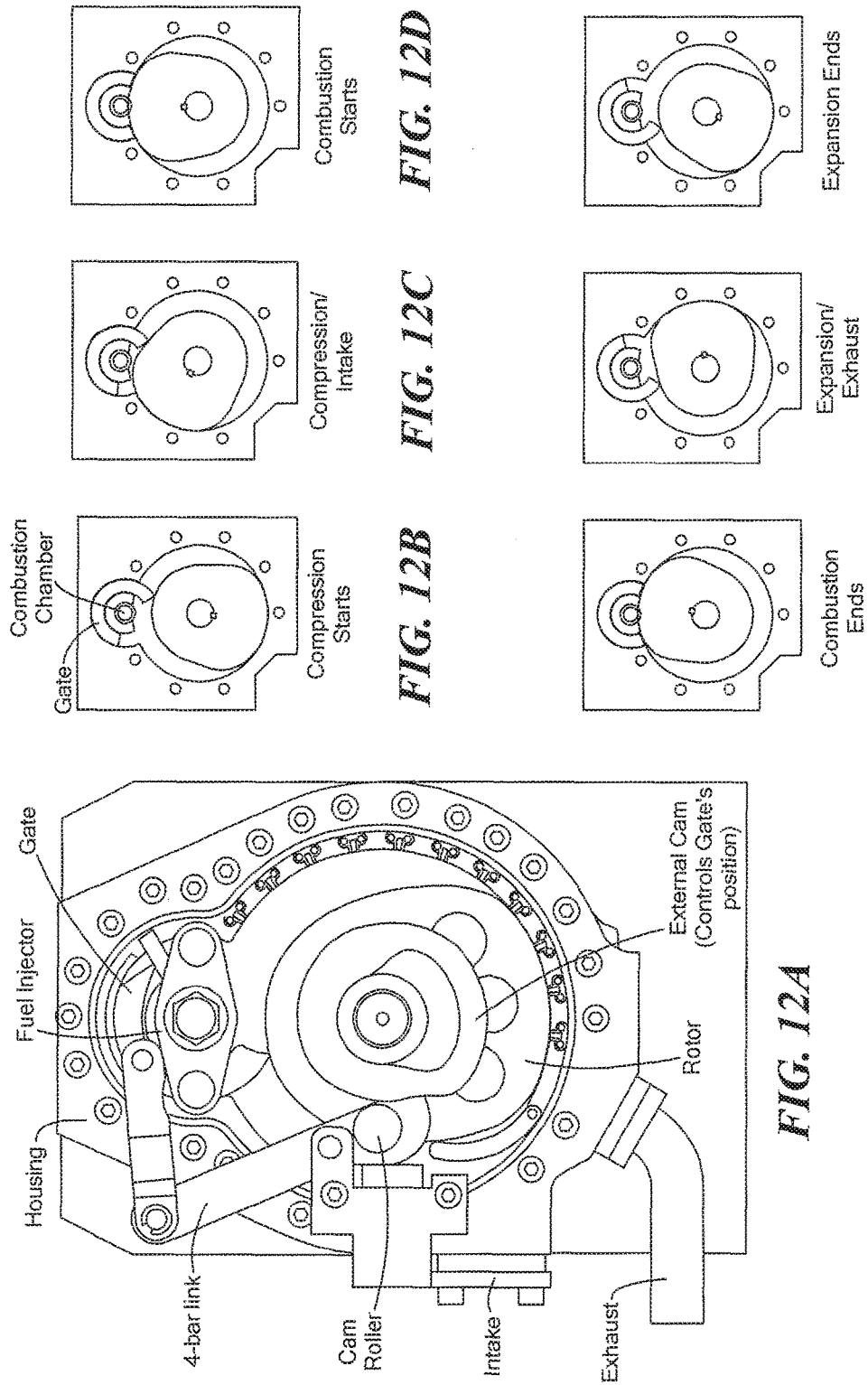

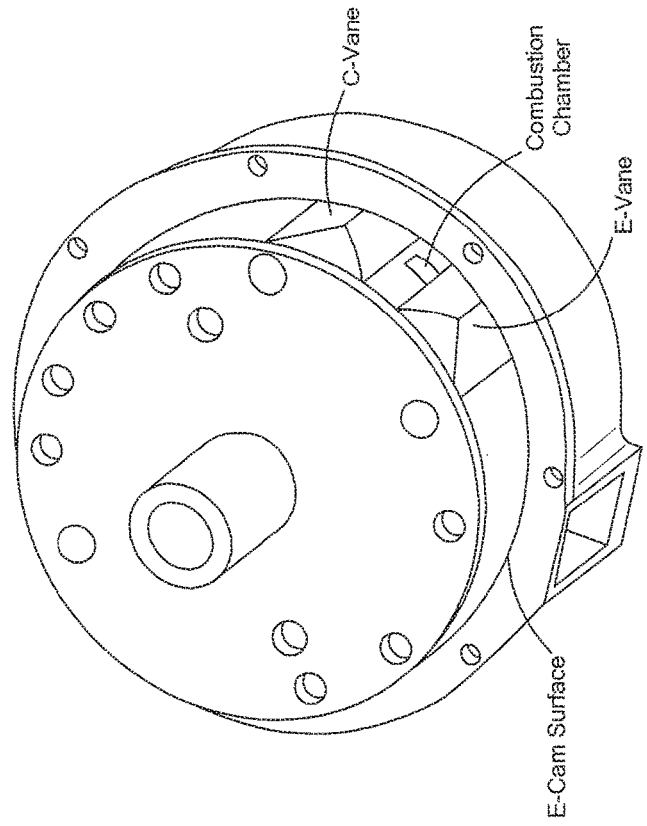
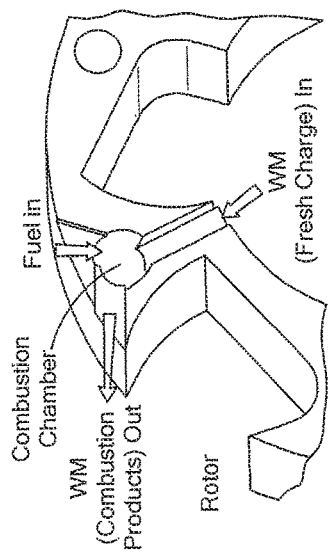
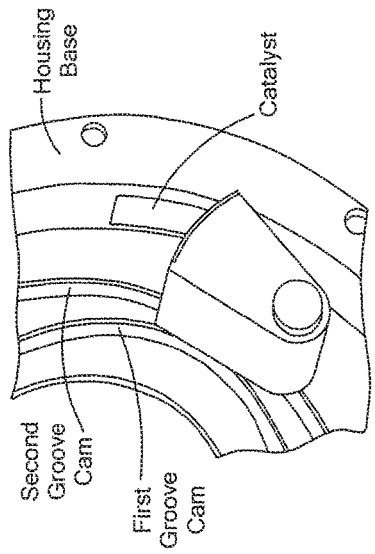
FIG. 20A
FIG. 20B
FIG. 20C

Single Rotor/Multiple (Axial) vanes Embodiments

Single Piston (2-Cylinder) Embodiments

Single Piston with Electromagnetic Coil Embodiments

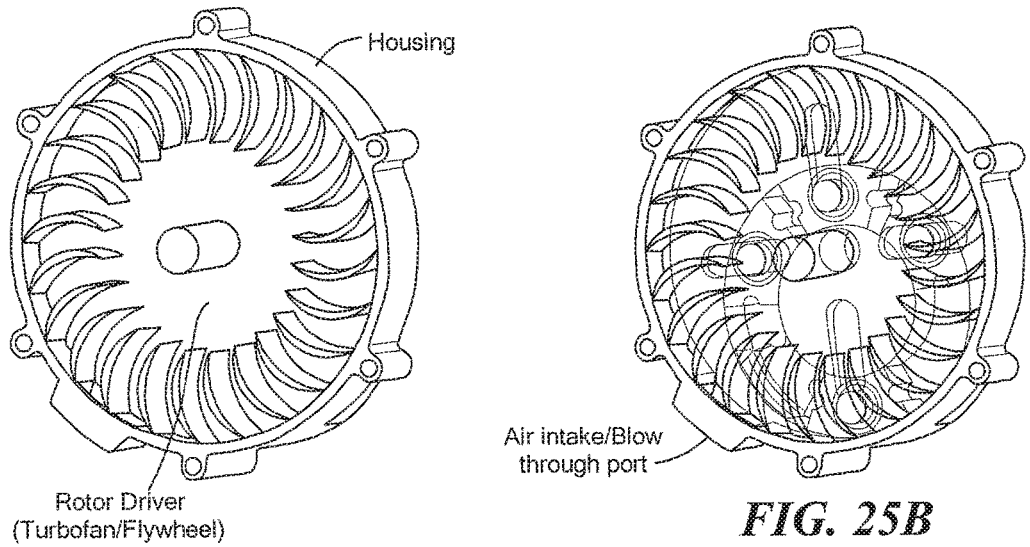
FIG. 25A
FIG. 25B
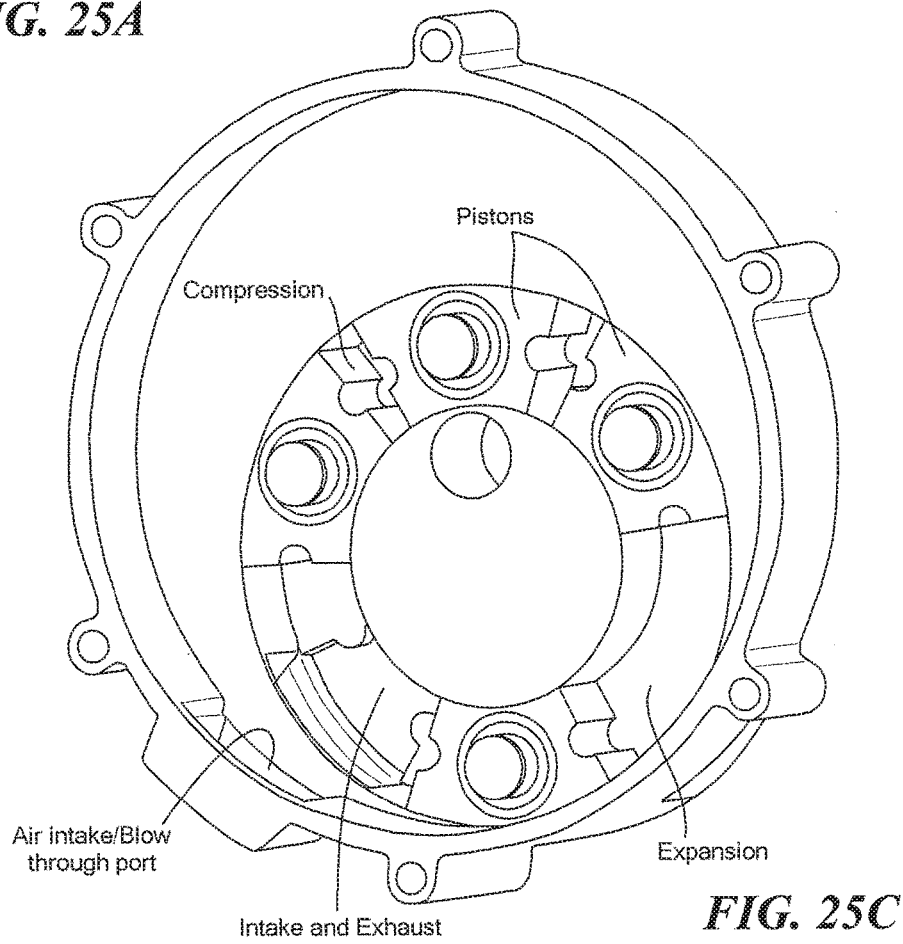
FIG. 25C

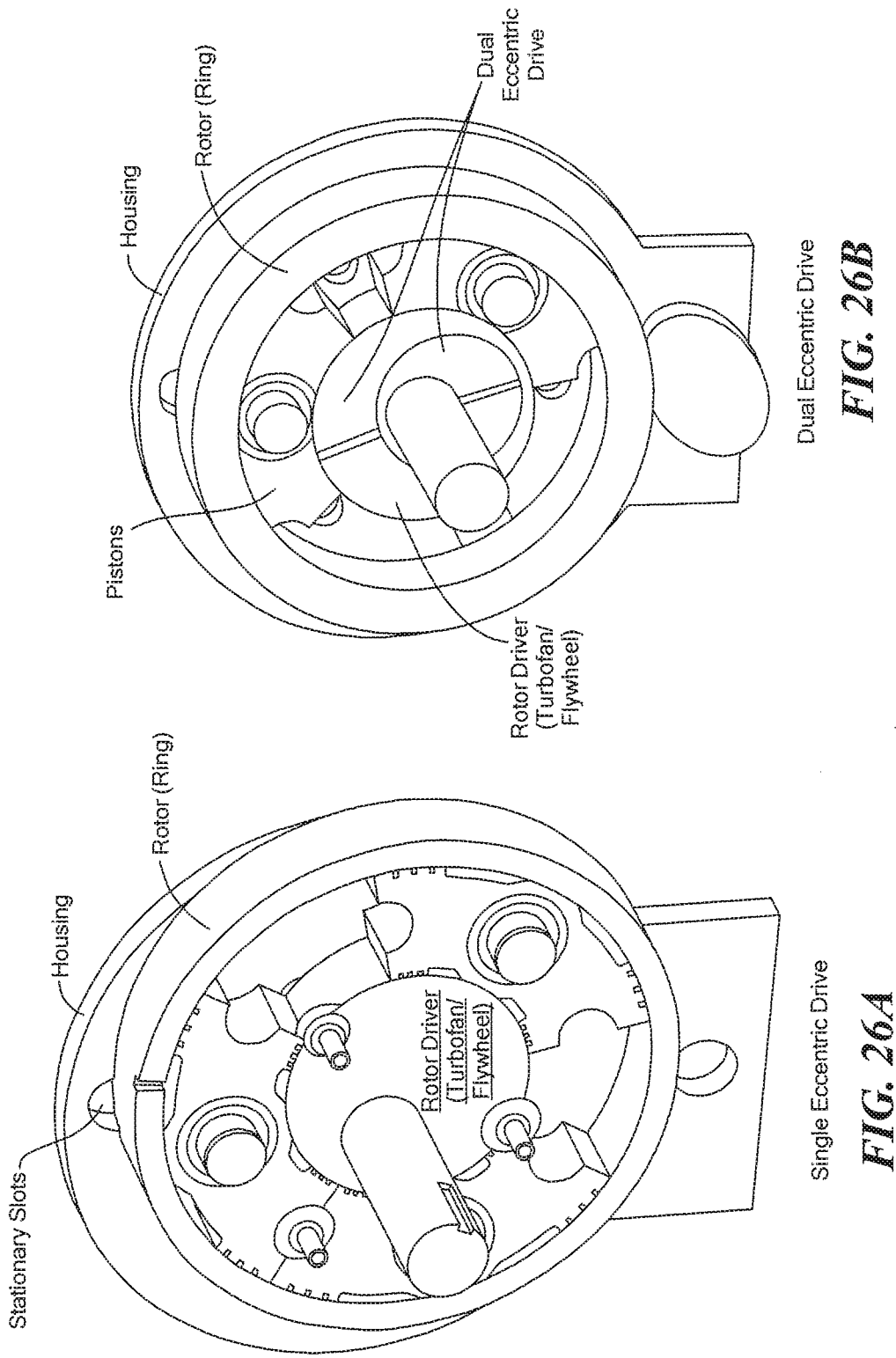

Two Pistons - Opposed Pistons Embodiment. Intake Stroke

Two Pistons - Opposed Pistons Embodiment. Compression Stroke

Two Pistons - Opposed Pistons Embodiment. Constant Volume Combustion

Two Pistons - Opposed Pistons Embodiment. (Over) Expansion Stroke

Two Pistons - Two-Stage Embodiment.

Two Segments: one constant radius and other variable radius

Const Radius Segment has Catalyst Coating

General View

When Catalyst coated surface of Rotors enters CbC space-
it "triggers" combustion reaction in HCCI engine Straight spring energized face seals Wedge profile face seal Wedge seal cross section Multiple straight face seals with button seals at joints Kingsbury pads Hydrodynamic seal Exploded Back View, showing seals Exploded Front View Dual Vanes help to seal against housing. Two vanes are in sliding contact with each other, which could be enhanced by oil film. Oil is delived through the grooves.

Dual Vanes, as an Apex Seal

ISOCHORIC HEAT ADDITION ENGINES AND METHODS

CROSS REFERENCE TO RELATED APPLICATIONS

The present application is a continuation of U.S. patent application Ser. No. 14/518,531, now U.S. Pat. No. 9,382,851, filed Oct. 20, 2014 and entitled "Isochoric Heat Addition Engines and Methods," which is a continuation of U.S. patent application Ser. No. 12/535,529, now U.S. Pat. No. 8,863,724, filed Aug. 4, 2009 and entitled "Isochoric Heat Addition Engines and Methods," which claims priority to U.S. Provisional Application Nos. 61/085,928 filed on Aug. 4, 2008, 61/149,889 filed on Feb. 4, 2009, 61/154,539 filed on Feb. 23, 2009, 61/184,627 filed on Jun. 5, 2009, and 61/219,495 filed on Jun. 23, 2009. All of the foregoing applications and patents are hereby incorporated by reference herein in their entireties.

TECHNICAL FIELD

The present invention relates to internal combustion engines, and more particularly to internal combustion engines completing a high efficiency hybrid cycle.

BACKGROUND ART

It is known in the prior art to run internal combustion engines on cycles such as a Diesel cycle, an Otto cycle, or an Atkinson cycle. These cycles all have distinct characteristics, but each has disadvantages that prevent them from achieving higher levels of efficiency while maintaining high power outputs. Increasing the efficiency of engines designed to complete one of these cycles has proven to be challenging. In a conventional engine part of the challenge stems from the fact that all the processes such as compression, combustion and expansion, happen within the same space only at different times. Additional challenges stem from an inability to create high compression in the compression chamber and the inability to maintain the compressed volume at a constant volume over an interval sufficient to optimize combustion for various operating conditions or loads. Furthermore, with the exception of the Atkinson cycle, which is not completed in a typical combustion engine, efficiency is loss because the expansion cycle is prematurely ended before the products of the combustion process are exhausted and replaced with a fresh intake.

SUMMARY OF THE INVENTION

In a first embodiment, the invention provides a rotary engine. This embodiment includes a housing having an intake port and an exhaust port; a rotor rotatably mounted in the housing; and two gates. Each gate is movably mounted with respect to the housing, so that each gate is engaged at least periodically with the rotor, wherein during engagement of at least one of the two gates with the rotor a volume is maintained between a surface of the at least one gate, the rotor, and the housing. The volume exhibits a cycle during rotation of the rotor wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

In a related embodiment, the gates are slidably mounted with respect to the housing. Alternatively, the gates are pivotally mounted with respect to the housing. In further embodiment, the pivotally mounted gates form an external wall of the housing. In another related embodiment, the engine further includes two cams coupled to the gates, the cams rotated by a drive system synchronized with the rotation of the rotor.

In another embodiment, the invention provides a rotary engine. The embodiment includes a housing having at least one intake port and at least one exhaust port and a plurality of rotors rotatably mounted in the housing. Each rotor is coupled to one of the at least one intake port or to one of the at least one exhaust port. The embodiment also includes a plurality of gates, each gate associated with, and in contact with, one of the rotors; and at least one combustion chamber. Each of the at least one combustion chamber is in communication with each rotor of a pair of the rotors. A first rotor of the pair of rotors is coupled to one of the at least one intake port and a second rotor of the pair of rotors is coupled to one of the at least one exhaust port. The first and second rotors move synchronously, wherein (i) the first rotor and its gate define in relation to the housing a compression volume exhibiting a compression portion of an engine cycle during rotation of the first rotor, by which a compressed volume of air is periodically coupled to the first rotor's corresponding combustion chamber and (ii) the second rotor and its gate define in relation to the housing an expansion volume exhibiting an expansion portion of an engine cycle during rotation of the second rotor, by which a combusted mixture in the first rotor's combustion chamber is periodically coupled to the expansion volume, and wherein the compression volume is reduced in the compression portion of the cycle from a first quantity to a second quantity, a volume in which combustion occurs is held substantially constant at the second quantity during a heat addition portion of the cycle, and the expansion volume is increased in the expansion portion of the cycle to a third quantity, the third quantity being larger than the first quantity.

In yet another embodiment there is provided a rotary engine. The embodiment includes a housing having an intake port and an exhaust port and an interior surface having a first arcuate segment characterized by a constant radius of curvature and a second arcuate segment characterized by a shape different from that of the first segment. The embodiment also includes a rotor rotatably mounted concentrically within the first segment of the housing, and disposed concentrically around a C-cam having a constant radius cylindrical surface except where it has a recess. The embodiment further includes at least one compression vane movably mounted in the rotor for contacting the C-cam and defining a compression volume with the rotor, the C-cam, and the housing. Similarly, the embodiment further includes at least one expansion vane movably mounted in the rotor for contacting the interior surface of the housing and defining an expansion volume with the rotor and the housing. It also includes a combustion chamber, disposed in the rotor, associated with the at least one compression vane and the at least one expansion vane, wherein (i) the compression volume exhibits a compression cycle during rotation of rotor, by which a compressed volume of a working medium is periodically coupled to the combustion chamber and (ii) the expansion volume exhibits an expansion cycle during rotation of the rotor, by which combustion products in the combustion chamber are periodically coupled to the expansion volume.

In a related embodiment, the engine further includes a plurality of compression vanes, a plurality of expansion vanes, and a plurality of combustion chambers, each of the combustion chambers being associated with a corresponding compression vane and a corresponding expansion vane. Alternatively or in addition, the at least one compression vane and the at least one expansion vane are mounted in the rotor by one of a pivotal mount and a slidable mount. Alternatively or in addition, the embodiment further includes a plurality of C-rings mounted in the rotor to provide sealing between the rotor and the housing. Optionally, the embodiment further includes a plurality of grooves formed within the housing for guiding motion of the vanes.

In another embodiment, the invention provides an internal combustion engine including a bilateral piston, having an intake port and an exhaust port, and pair of opposed piston faces; and a housing, mounted concentrically outside of the piston and having a pair of opposed internal contact faces. The housing moves in reciprocal motion relative to the piston, along a longitudinal axis, each contact face coming into proximity of a corresponding one of the piston faces of the piston at a limit of the reciprocal motion. The embodiment includes a piston actuator engaged with the piston relative to the housing. The piston actuator controls the motion of the housing with respect to the piston so that a volume is defined between each piston face and a corresponding one of the contact faces. The volume exhibits a cycle during reciprocation of the housing relative to the piston wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

In a related embodiment, the piston actuator is a cam having a shape that provides a dwell to the reciprocating motion of the housing relative to the piston. Alternatively, the piston actuator is an electromagnetic coil system. Alternatively or in addition, the piston and the housing are cylindrically shaped.

In yet another embodiment, the invention provides an internal combustion engine and the embodiment includes a cylinder having an intake port and an exhaust port and a pair of pistons disposed for coordinated reciprocating motion in the cylinder. Each of the pistons has a piston face. The pistons are coupled to a rotational output in a manner to cause the pistons to define, within the cylinder and between the piston faces, a volume. The volume exhibits a cycle during reciprocation of the pistons wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

In yet another embodiment, the invention provides an internal combustion engine, and the embodiment includes a housing having an intake port and an exhaust port; at least one piston movably mounted with respect to the housing; and means for moving the piston through a cycle so that a volume is maintained between the piston and the housing. The volume exhibits a cycle during movement of the piston wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

In a further related embodiment, the piston includes a liquid.

In yet another embodiment, the invention provides an internal combustion engine, and the embodiment includes a housing having an intake port and an exhaust port; and a low pressure chamber and a high pressure chamber disposed in the housing. The low pressure chamber is larger than the high pressure chamber. Each chamber has an epitrochoid-shaped interior in which is disposed a three-apex rotor, rotationally mounted to move eccentrically within the corresponding chamber, to establish three cavities, which over an engine cycle, handle the functions of intake, compression, intermediate, and expansion, three of such functions being operative at any given time in each chamber; wherein (i) the cavity handling compression in the low pressure chamber is coupled to the cavity handling intake in the high pressure chamber; (ii) the cavity handling expansion in the high pressure chamber is coupled to the cavity handling expansion in the low pressure chamber; and (iii) the cavity in the high pressure chamber handling the intermediate function handles heat addition so as to produce combustion therein.

In yet another embodiment, the invention provides a rotary engine, and the embodiment includes an inner rotor, the inner rotor having a plurality N of lobes, and a receiving member, the inner rotor rotationally moving about an axis that is displaced relative to an axis of the receiving member, the receiving member having N+1 recesses for mating with successive lobes as the inner rotor rotates. The embodiment also includes a drive for causing rotation of the inner rotor relative to the receiving member, so that a volume is defined with respect to each lobe of the inner rotor and a corresponding recess of the receiving member. The volume exhibits a cycle wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

A further related embodiment further includes a housing, the housing having and intake port and an exhaust port, wherein the inner rotor rotates in a first direction relative to the housing and the receiving member rotates in a second direction relative to the housing. In another related embodiment, the receiving member is part of the housing, the housing having an intake port and exhaust port.

Another embodiment provides a system for sealing a rotor of an internal combustion engine in relation to a housing, the rotor having an edge and a face. The system of this embodiment includes a groove formed in the face of the rotor, proximate to the edge and having a radially inward wall and a radially outward wall, the groove having a bevel located in the radially outward wall; and a sealing strip disposed in the grove and having, in contact with the groove, a conformal surface. The strip is engaged in frictional contact against the housing, the housing presenting to the sealing strip a substantially flat surface, the friction tending to cause the strip to rotate slightly with respect to the rotor and to move slightly axially in a direction out of the groove, so as to reduce any gap between the strip and the housing and so as to increase sealing between the rotor and the housing.

In another embodiment, the invention provides a rotary engine, and the embodiment includes a housing having an intake port and an exhaust port; a rotor rotatably mounted in the housing; and an annular segment of a hollow cylinder, mounted and driven to pivot in oscillatory fashion about a central axis. The segment has first and second opposed ends forming a pair of connected gates, each end periodically contacting the rotor, so as to define a volume within the housing. The volume exhibits a cycle during rotation of the rotor wherein, (i) while only the first end contacts the rotor, the volume is reduced in a compression portion of the cycle from a first quantity to a second quantity, (ii) the volume is held substantially constant at the second quantity during a heat addition portion of the cycle, and (iii) while only the second end contacts the rotor, the volume is increased in an expansion portion of the cycle to a third quantity, the third quantity being larger than the first quantity.

In another embodiment, the invention provides an internal combustion engine, and the embodiment includes a housing having an intake port and an exhaust port; at least three pistons movably mounted with respect to the housing, each piston formed of magnetic material; and a series of electromagnetic coils disposed around the housing. The electromagnetic coils are electronically controlled to exert forces on the pistons so as to implement a cycle wherein a volume is maintained between the pistons and the housing. The volume exhibits a cycle during movement of the pistons wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

In another embodiment, the present invention provides a sealing system for a rotary engine, and the embodiment includes a plurality of grooves formed in an interior surface of a housing wall, and a spring-loaded sealing strip disposed in each of the grooves; an orifice in the housing wall located between the grooves, the orifice coupled to an oil supply; and a floating cover disposed between the housing wall and a rotor of the engine. The floating cover has an inner face adjacent to a face of the rotor and an outer face adjacent to the interior surface of the housing wall. The inner face of the floating cover includes a groove having a diameter conforming generally to a diameter of the rotor, and a spring-loaded sealing strip located in the grove of the floating cover. The oil supply causes pressurized oil to apply an axial force to the outer face of the floating cover in opposition to axial forces on the inner face of the floating cover caused by a working medium of the engine so as to assist in sealing the engine.

In another embodiment, the invention provides an apex sealing system in a rotary engine for a first member that is one of a gate or a vane in relation to a second member, moving in relation to the first member and at least periodically in contact therewith at a contact region of the first member. The apex sealing system includes a recess formed in the contact region of the first member; and a roller rotationally mounted in the recess, so that the roller contacts the second member when the first member is in contact with the second member.

In another embodiment, the invention provides a sealing system for sealing, in a rotary engine, an interface between a first member and second member with respect to which the first member moves, the first member presenting an edge, parallel to an axis, and in contact with the second member. The sealing system of this embodiment includes at least one recess formed in the edge; and a plurality of axially adjacent strips, mounted in the at least one recess, each strip being spring loaded, to maintain the strips in engagement with the second member.

In an another embodiment, the invention provides a rotary engine, and the embodiment includes a housing having an intake port and an exhaust port; a rotor rotatably mounted in the housing, the rotor having an axial channel formed in an edge of the rotor, so that the channel lies axially between two integrally formed end plates; and at least one gate movably mounted with respect to the housing so as to be engageable with the axial channel and having a shape conformal with the shape of the axial channel. During engagement of at least one gate with the rotor a volume is maintained between a surface of the at least one gate, the rotor, and the housing. The volume exhibits a cycle during rotation of the rotor wherein the volume is reduced in a compression portion of the cycle from a first quantity to a second quantity, the volume is held substantially constant at the second quantity during a heat addition portion of the cycle, and the volume is increased in an expansion portion of the cycle to a third quantity, the third quantity being larger than the first quantity.

In yet another embodiment, the invention provides a sealing system for improving sealing in a rotary engine between a first member that functions as one of a vane or gate, and capable of motion along an axis, and a second member moving with respect to the first member, the first member engageable against the second member at a limit of motion along the axis. The sealing system of this embodiment includes a matched pair of components, the matched pair serving as the first member. Each one of the matched pair is mounted so as to be separately movable along the axis of movement of the first member, so that each component may move differentially relative to the other component to improve sealing at the limit of motion of the components.

In yet another embodiment, the invention provides a rotor face seal, and the embodiment includes radial features such as ridges, dimples, strips radiated in a radial direction and disposed on a flat surface of the rotor; these features reduce tangential flow of the fluid across the flat face surface of the rotor.

In further related embodiment, there is provided a method of operating an HEHC engine in a manner permitting adjustment of power output, the method of this embodiment includes, in the heat addition portion of the cycle, adding fuel to the volume and causing combustion of the fuel, the amount of fuel added, when fuel is added, being substantially constant over all cycles, so as to produce maximum power over each cycle when fuel is added; and controlling addition of fuel to occur only over a sufficient number of cycles per unit of time in order to produce a desired power output of the engine, and, for each cycle wherein addition of fuel is withheld, supplying heat during the heat addition portion of the cycle by heat transfer from at least one of (i) walls of the engine directly and .(ii) a heat exchanger. In a further related embodiment, the HEHC engine is any of the engine embodiments described above.

Yet another embodiment provides an improved rotary internal combustion engine of the homogenous charge compression ignition type, causing combustion of a fuel-air mixture when a state of the mixture is transformed from subcritical to critical. The improvement includes a catalytic surface carried on a mechanical substrate, the surface being normally concealed from the mixture; and a trigger for initiating combustion by causing the catalytic surface to be exposed to the mixture when the mixture is placed under minimum volume conditions. In a further related embodiment, the trigger includes a catalytic surface placed directly on a rotor of the engine, in such a manner that it is exposed each time the rotor reaches a specific angular extent in the cycle. Alternatively or in addition, the trigger includes a catalytic surface placed in a location of a housing of the engine, in such a manner that it is exposed each time the rotor reaches a specific angular extent in the cycle.

BRIEF DESCRIPTION OF THE DRAWINGS

The foregoing features of the invention will be more readily understood by reference to the following detailed description, taken with reference to the accompanying drawings, in which:

FIGS. 4A-4C and 5A-5C illustrate the engine of FIGS. 3A-3C during different portions of the high efficiency hybrid cycle.

FIGS. 11A-11B illustrate a rotary engine with 2 pivoting gates that may be used with a cycle incorporating the scavenging process in accordance with an embodiment of the present invention.

FIGS. 12A-12G illustrate a rotary engine with a rotor and a pivoting gate in accordance with an embodiment of the present invention.

FIGS. 20A-20C provide magnified details of elements of the engine demonstrated in FIG. 15.

FIGS. 25A-25C illustrate an engine with a gate drive and multiple pistons in accordance with an embodiment of the present invention.

FIGS. 26A-26B illustrate an engine having dual gates and multiple pistons in accordance with an embodiment of the present invention.

37A-37B illustrate a fuel delivery system in accordance with embodiments of the present invention.

Figure 38B:
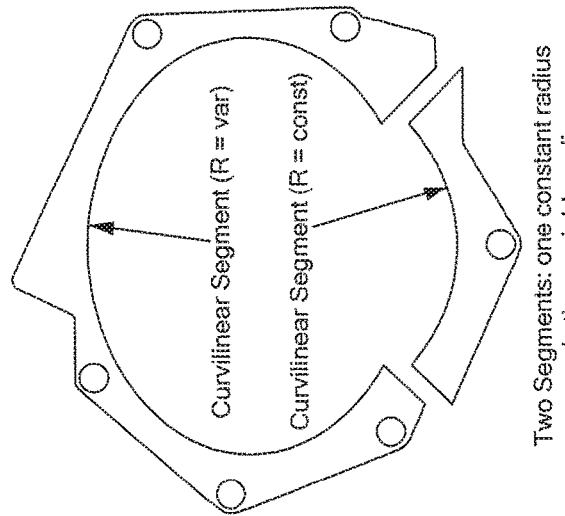
Figure 38C:
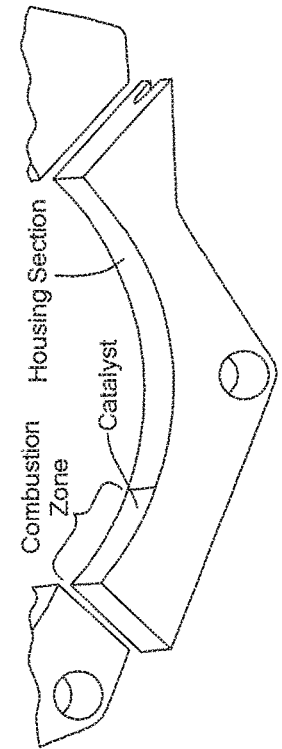
Figure 38A:
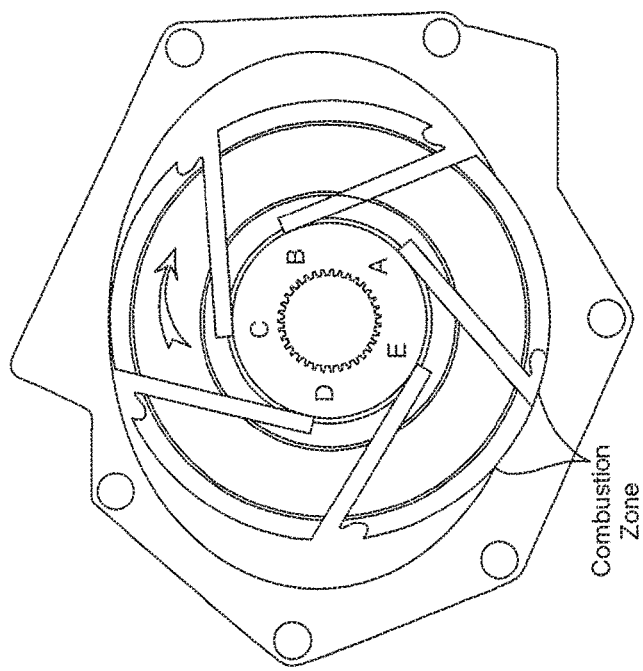

FIGS. 38A-38C illustrate a catalyst used as a homogenous charge compression ignition trigger (HCCI) in accordance with an embodiment of the present invention.

Figure 39A:
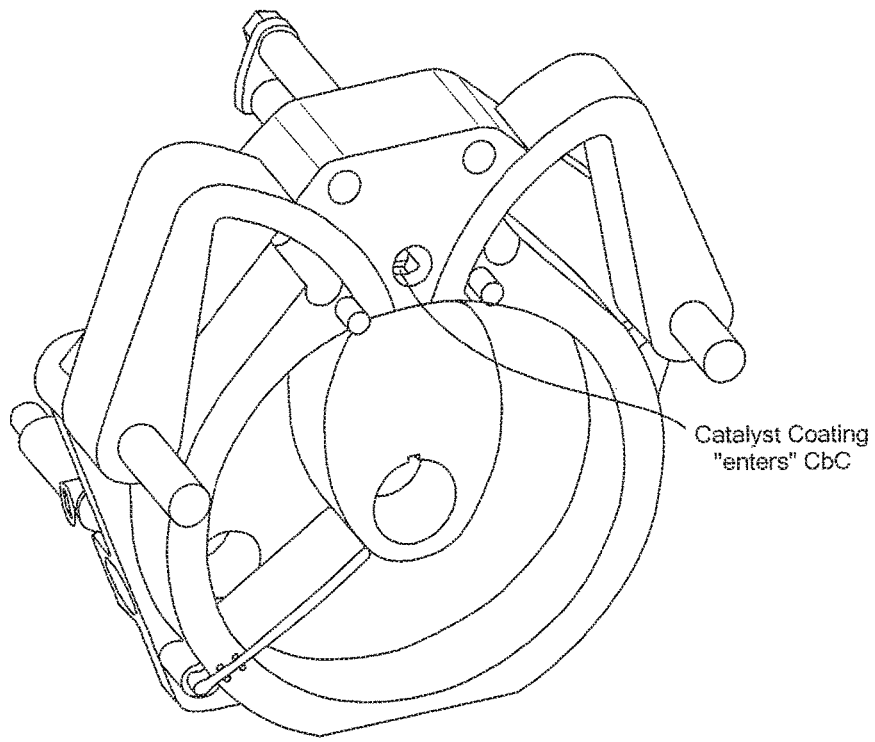
Figure 39B:
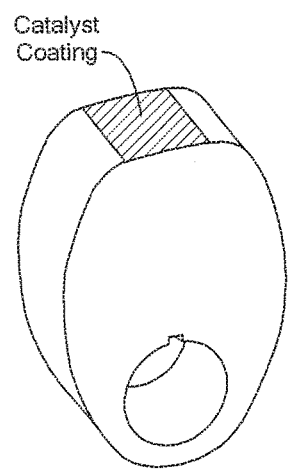

FIGS. 39A-39B illustrate a catalyst coated rotor for use with an embodiment of the present invention.

FIGS. 40A-40E illustrate various face seals in accordance with embodiments of the present invention.

Figure 41B:
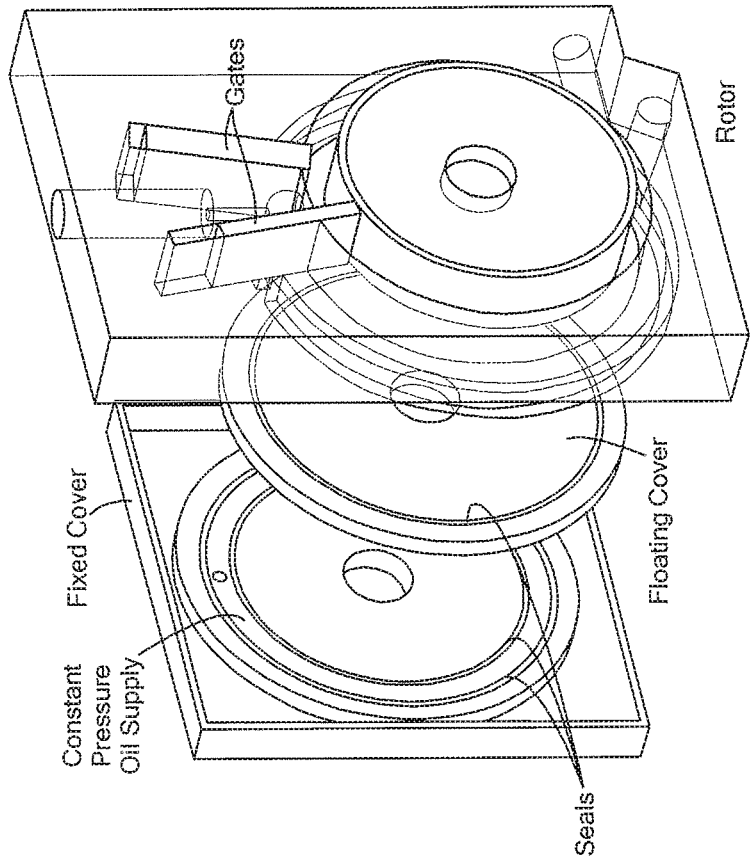
Figure 41A:
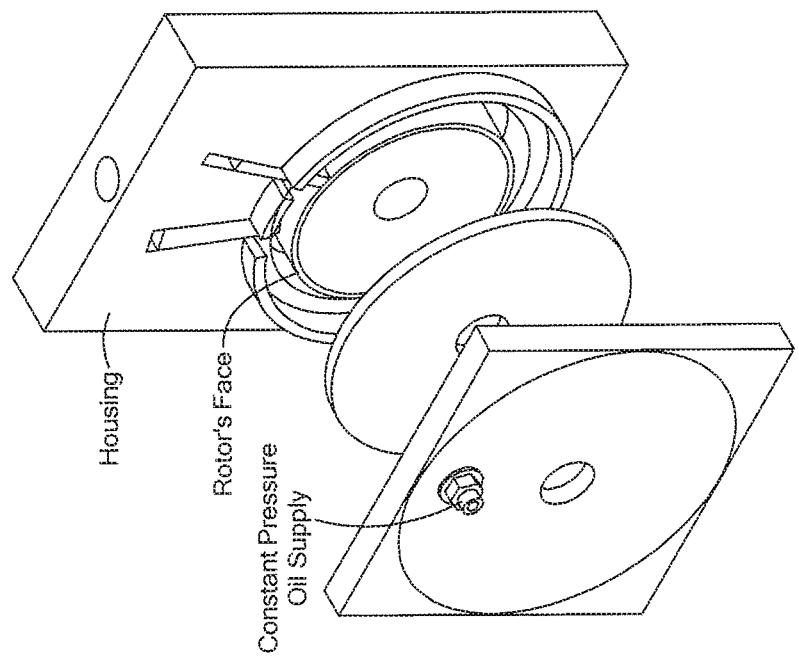

FIGS. 41A-41B illustrate a floating cover seal design in accordance with an embodiment of the present invention.

Figure 42C:
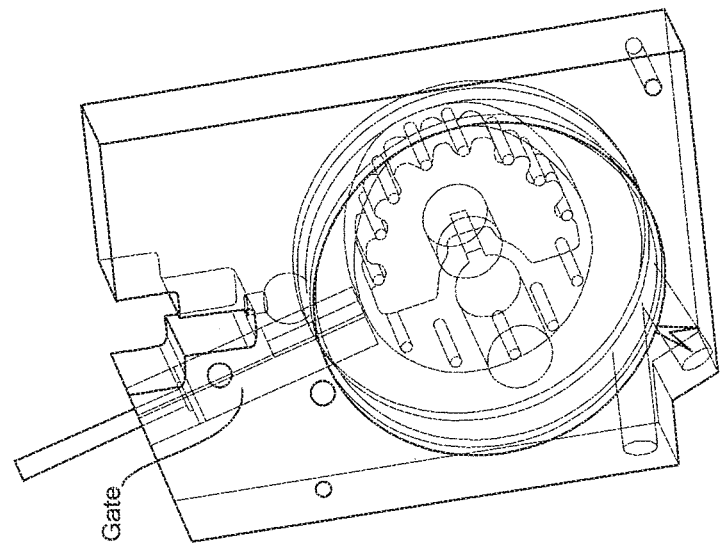
Figure 42B:
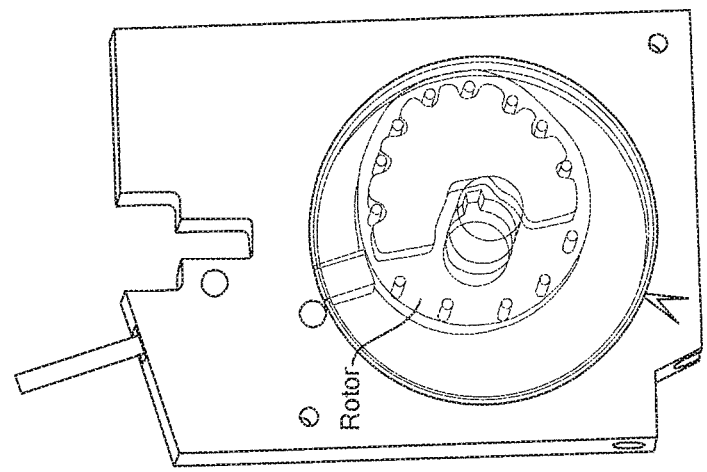
Figure 42A:
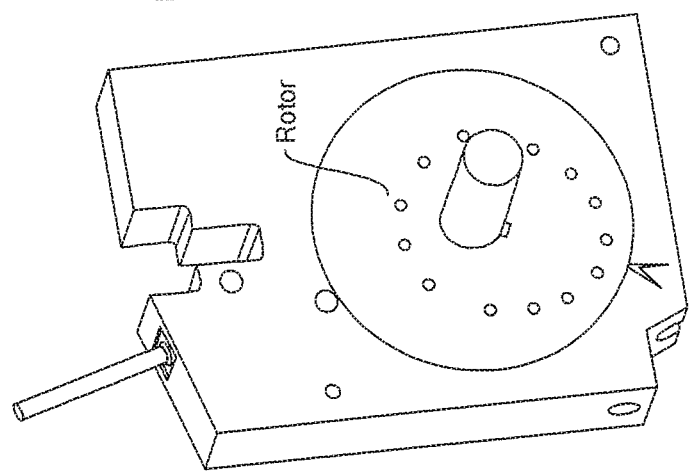

FIGS. 42A-42C depict an integrated rotor engine in accordance with embodiments of the present invention.

FIG. 43A-43E show various rotor sealing mechanisms in accordance with embodiments of the present invention.

Figure 44A:
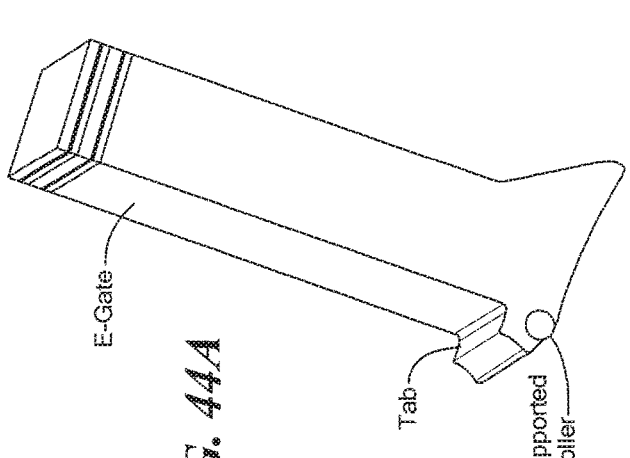
Figure 44B:
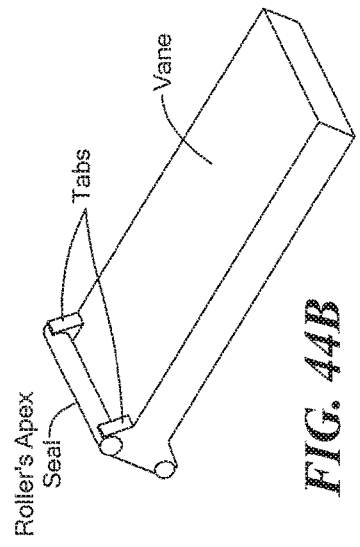
Figure 44:
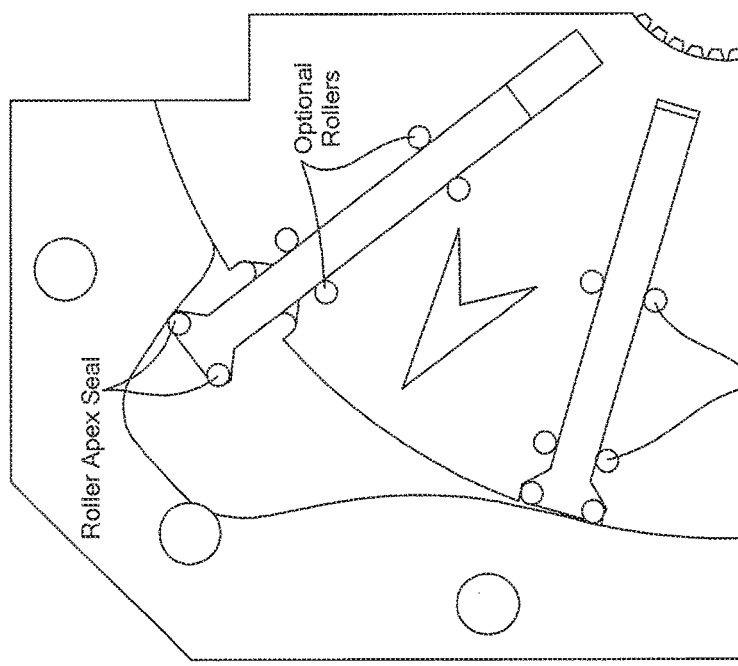

FIGS. 44, 44A and 44B shows roller and apex seals for use with embodiments of the present invention.

Figure 45C:
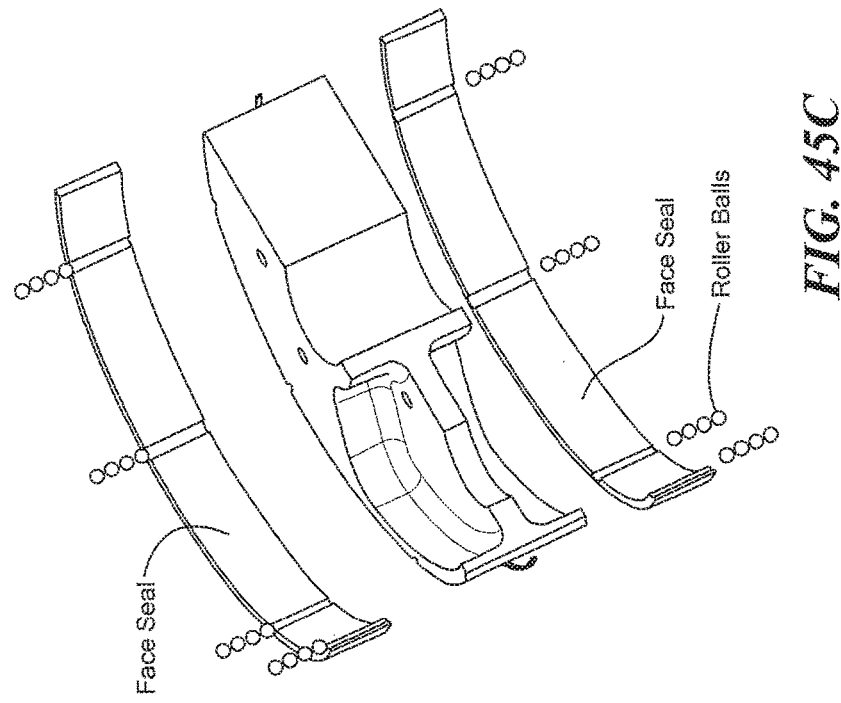
Figure 45A:
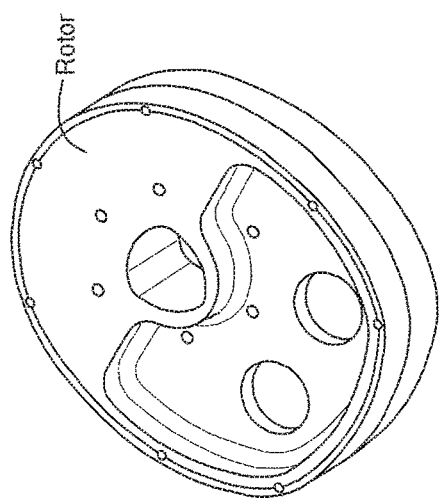
Figure 45B:
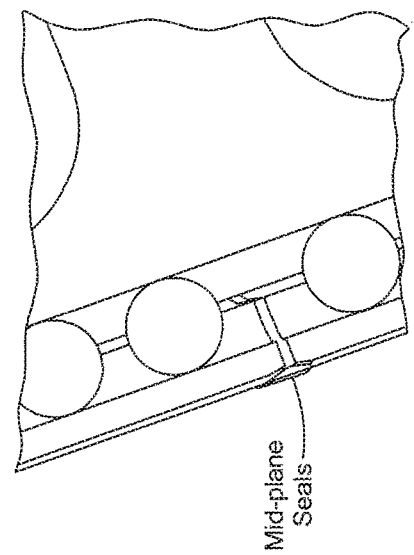

FIGS. 45A-45C illustrate split faces seals in accordance with embodiments of the present invention.

Figure 46:
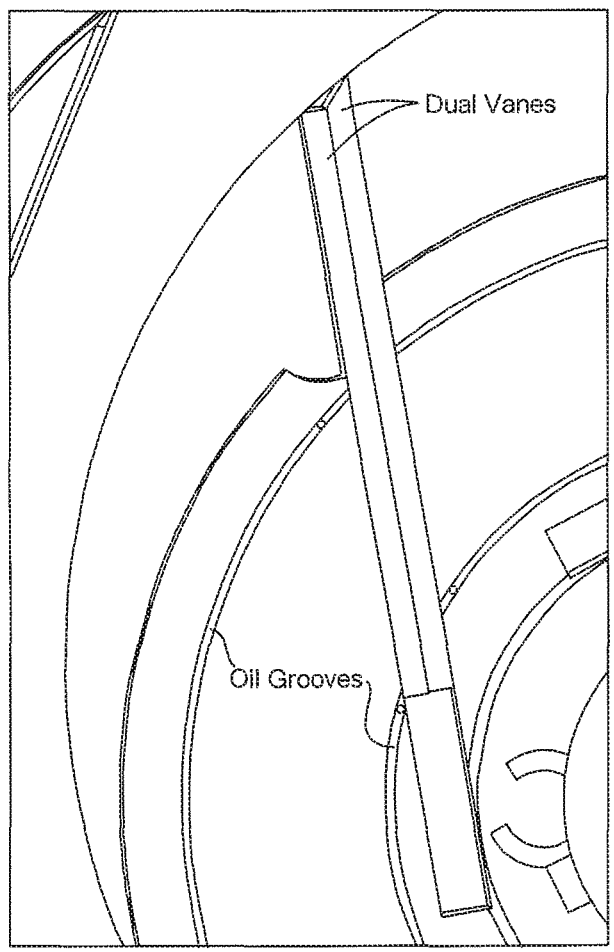
Figure 47A:
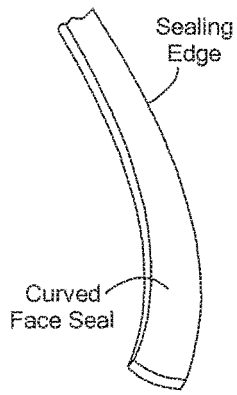
Figure 47B:
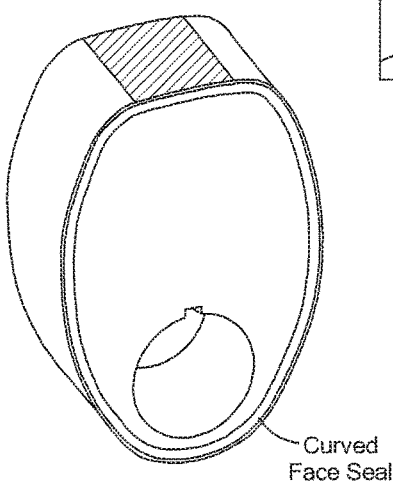
Figure 47C:
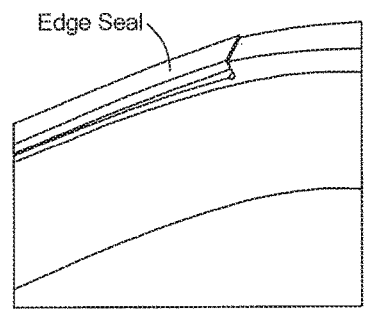
Figure 47D:
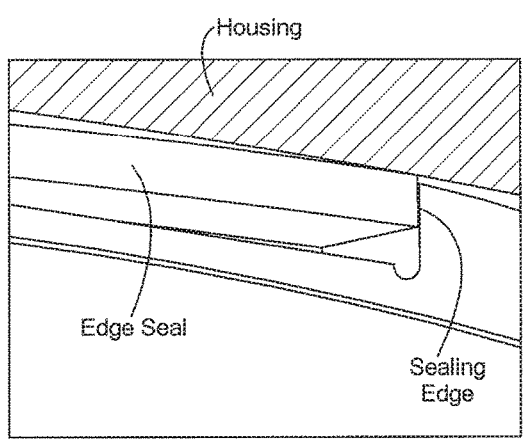
Figure 47E:
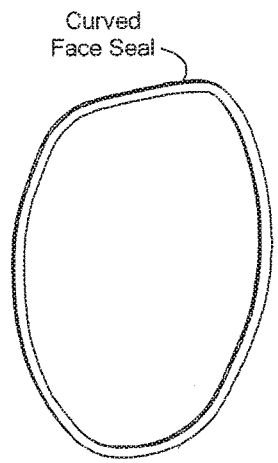

FIG. 46 illustrates dual vane sealing in accordance with an embodiment of the present invention.

FIGS. 47A-47E illustrate face and apex seals in accordance with an embodiment of the present invention.

DETAILED DESCRIPTION OF SPECIFIC EMBODIMENTS

Definitions. As used in this description and the accompanying claims, the following terms shall have the meanings indicated, unless the context otherwise requires:

A "rotor" is a structure, rotatably mounted in a housing that transmits torque, developed as a result of combustion, to a mechanical output.

A "gate" is a movable structure, for partitioning a volume, that is periodically or continuously in contact with a member, such as a rotor, that is moving with respect thereto. A gate may move with a rotating or translating motion, and such motion need not substantially change the volume of a relevant cavity.

A "vane" is a movable structure, motion of which causes displacement of a volume, that also has a partitioning function and is periodically or continuously in contact with a member, such as a rotor or a housing that is moving with respect thereto.

A "piston" is a mass moving linearly with respect to a housing in which it is located and that transmits force relative to the housing, developed as a result of combustion, directly or indirectly to a mechanical output. "Linear" motion here includes motion along a path that may be straight or curved.

A "sealing system" is an arrangement for reducing a gap between two mating parts that are movably mounted with respect to one another. Such a gap may be attributable, among other things, to limitations of manufacturing tolerances as well as to differences in thermal expansion experienced by the mating parts.

A prismatic surface is a surface generated by all the lines that are parallel to a given line and intersect a broken line that is not in the same plane as the given line. The broken line is the directrix of the surface; the parallel lines are its generators (or elements). If the broken line is close (i.e. a closed polygon), then the surface is a closed prismatic surface.

For the sake of the foregoing discussion the following terms with their corresponding definitions will be used:

A/F-Air/Fuel

Air Knife-an air blown by the fan through the scavenging chamber or through inlet and outlet ports, located opposite to each other or under some angle to each other.

Chambers:
  a. CbC-Combustion Chamber
  b. CmC-Compression Chamber
  c. EpC-Expansion Chamber
  d. EhC-Exhaust Chamber Chambers-the Space between various components of the engine filled with Working Medium CV CbC-Constant Volume Combustion Chamber EGR-Exhaust Gas Recirculation Gates:
  a. Compressor Gate; also called C-Gate.
  b. Expander Gate; also called E-Gate.

HEHC-High Efficiency Hybrid Cycle

HCHC-Homogeneous Charge Hybrid Cycle

HEHC-S-High Efficiency Hybrid Cycle (in Scavenging mode)

HCHC-S-Homogeneous Charge Hybrid Cycle (in Scavenging mode)

Heat Addition-heat may be added by combusting the fuel in the air or by a heat exchange process with a heat exchanger, shown by way of example as item H.E. in FIG. 4C, located within the constant volume combustion chamber or just with the walls of the engine (primarily combustion chamber walls)

FI-Fuel Injector $V_{CbC}$-Combustion Chamber Volume

WM-Working Medium-Air or Air/Fuel Mixture or combusted gases

In this application, several different engine embodiments are disclosed. These engine embodiments describe engines which are capable of operating at very high maximum efficiency (~57% or above), very high maximum average efficiency (above ~50%), very high power density and specific power, low vibration levels, low sound levels, and low emissions levels.

Figure 1A:
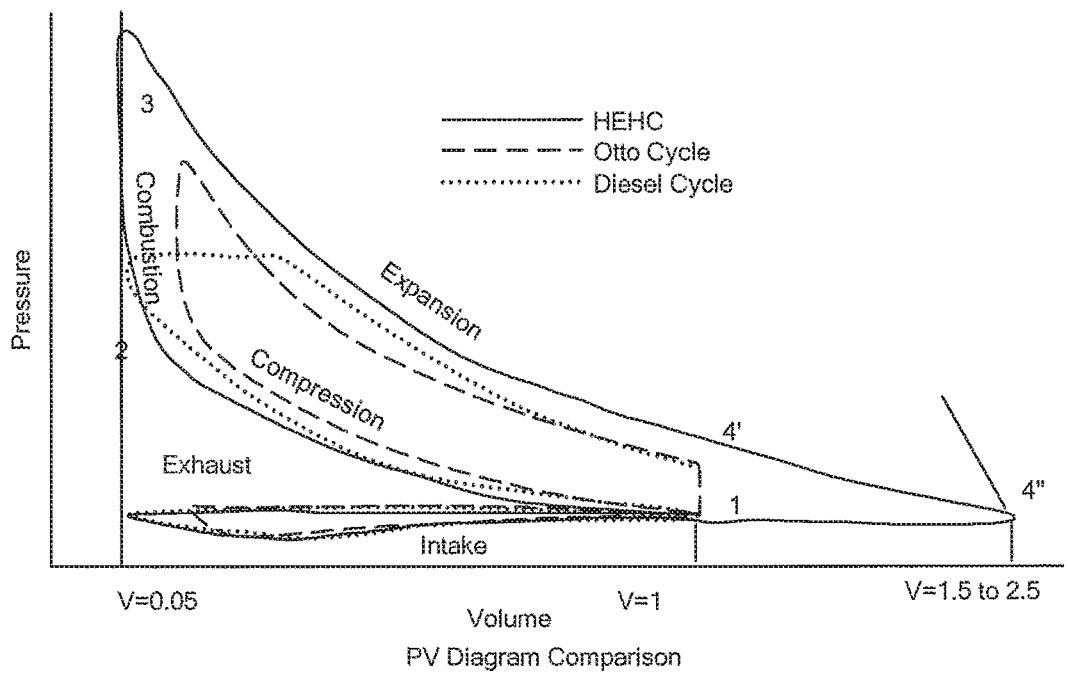
FIGS. 1A and 1B are graphs illustrating a high efficiency hybrid cycle in accordance with an embodiment of the present invention in comparison to an Otto and Diesel cycle.
Figure 1B:
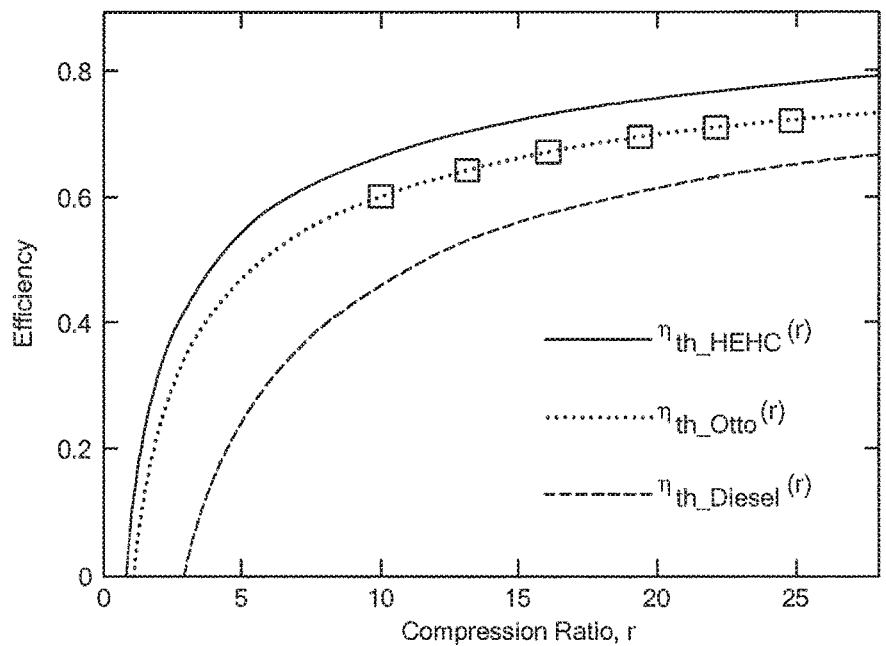

To understand the design intent and for completeness sake, we will reiterate the basic thermodynamic principles behind the high efficiency hybrid cycle, which are illustrated in FIGS. 1A and 1B. The basic premise of the cycle show in figures comprises the following cycle portions: (1) compression of air only to high compression ratio (similar to Diesel cycle engines), (2) heat addition (by combustion of fuel or externally) at constant volume conditions (similar to Otto cycle engines), and (3) expansion to atmospheric pressure (similar to Atkinson or Miller cycles engines). Because this engine completes a cycle wherein heat is added at a constant volume, during which the pressure increases the engine may be characterized as an isochoric heat addition engine.

An engine capable of operating in a regime of isochoric heat addition and over-expansion consists of stationary and movable parts. Stationary parts are sometimes herein referred to as the housing. Movable parts may include one or more of the following structures: rotors, pistons, gates, and vanes. The movable parts generally separate a cavity during at least some portion of a cycle, wherein a cavity includes a void formed between a stationary housing and movable components. A cavity is filled with a working medium during the cycle. A change in the cavity volume during the operation of the engine is the manifestation of the compression or expansion of the working medium.

During operation of an engine in accordance with an embodiment of the present invention, a cavity formed between the stationary housing and a moving component is filled with a working medium. This working medium (WM) undergoes cyclical transformations during operation of the engine. In a first stage the cavity is contracted from its initial volume $V_1$ to a minimal volume $V_2$. During this step the cavity will be called the compression chamber (CmC), having an initial volume $V_1$. In a second stage the cavity remains substantially constant at $V_2$ for a finite time period of time. During this stage the cavity will be called the combustion chamber (CbC), having a constant volume $V_2$. Subsequently the cavity will expand to a volume $V_4$, so that $V_4 \geq V_1 \geq V_2$. During this stage the cavity will be called an expansion chamber (EpC), having a final volume $V_4$.

Heat could be added to the working medium while the volume of this cavity is at $V_2 \leq V \leq V_1$. Work on the working medium is exerted during the phase of operation when the volume is contracted from $V_1$ to $V_2$. No work is exerted or extracted on or from the working medium, except perhaps to overcome small frictional losses, during the phase of operation when the volume of the cavity remains substantially constant at $V_2$. Work is extracted from the working medium during the phase of operation when the volume is expanding from $V_2$ to $V_4$.

The net work produced by the cycle is the difference between extracted work and exerted work, also taking into account the losses due to the friction in the system. If heat is added by means of combusting fuel, the engine constitutes an internal combustion engine. If heat is added by external means, such as via heat pipe or directly heating the housing walls, etc., the engine is an external combustion engine.

In this application several embodiments are disclosed that include various housing configurations and different movable parts. The embodiments disclosed are all capable of executing the high efficiency hybrid cycle disclosed herein in addition to other standard cycles, such as Diesel, Otto, HCCI, etc.

Various engines embodiments of the present invention will operate in a conventional Otto cycle with spark ignition, in a conventional Diesel mode with fuel injection, or in HCCI mode.

In analogy with conventional piston engines the high efficiency hybrid cycle (HEHC) and the homogeneous charge hybrid cycle (HCHC) may be called 4-stroke cycles as they have 4 distinctive strokes: Intake, Compression, Combustion & Expansion, and Exhaust. A scavenging variant of either of these cycles is equivalent to a 2-stroke engine cycle wherein, at the end of expansion, the cavity is scavenged by the blow-by ambient air, which removes combusted gases and refills the cavity with a fresh air or an air/fuel mixture charge.

Figure 2:
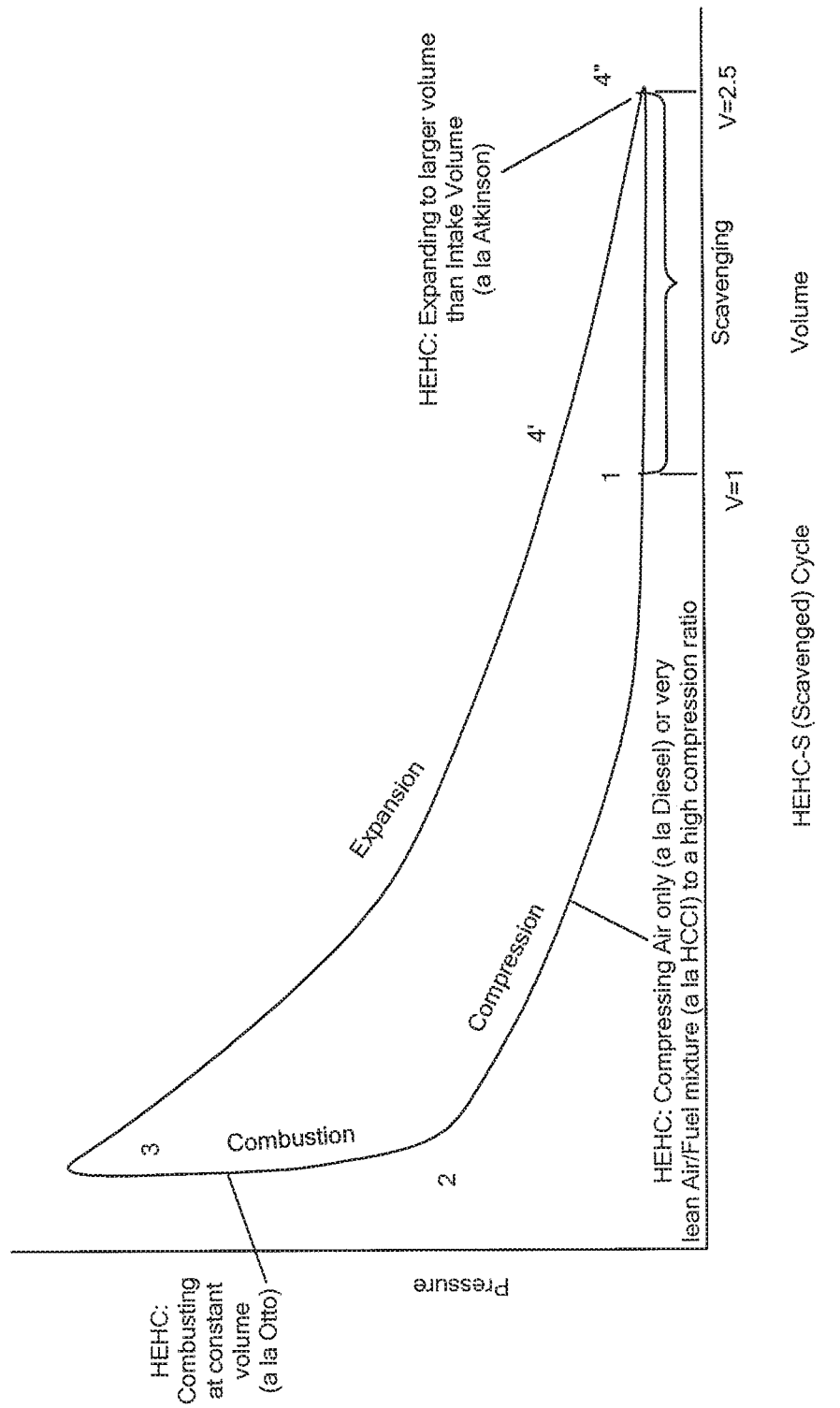
FIG. 2 is a graph illustrating a high efficiency hybrid cycle implementing a scavenging method in accordance with an embodiment of the present invention.

As indicated, the HEHC pressure-volume diagram is shown in FIGS. 1A, 1B, and 2. In the initial state, only the air is compressed, like in Diesel cycle, during the compression stroke. Fuel may be added close to the end of compression stroke or just after the compression stroke. Since air is already compressed at this point to a relatively high pressure (~55 bar), high injection pressures, similar to those used in modern diesel engines are required to achieve full combustion and clean exhausts. The operation is akin to Diesel engines except for the fact that combustion occurs at the constant volume, as achieved in Otto cycle engines that are spark ignited. However, unlike spark ignition engines, the combustion occurs due to fuel injection into a very hot compressed air. Having said this, however, a spark plug may be used as well. Expansion occurs in this cycle to ambient pressures, similar to Atkinson cycle.

Partial load operation may be accomplished by fuel modulation, as in Diesel engines or by skipping some of the injections all together, as it will be described below.

Due to similarities of this cycle to Diesel, Otto and Atkinson, this cycle is referred to as a "Hybrid Cycle". It may also possible to inject water during combustion and/or expansion strokes as this may improve the efficiency of the engine, while providing for cooling from within the engine.

If leakage between moving components and housing is kept at low level, the maximum efficiency of this cycle is expected to be about 57%, while average efficiency is expected to be above 50%.

From a design point of view, implementation of such a cycle will require existence of constant volume combustion chamber over a finite time period and expansion chamber volume larger than intake volume. Additionally, intake and exhaust strokes may be eliminated if scavenging (air blow trough during intake/exhaust) is used as shown in FIG. 2

The homogeneous charge hybrid cycle (HCHC) is a modification of the HEHC, in which a lean air/fuel mixture, formed during intake and/or compression strokes, is being compressed as opposed to the compression of only air. When the mixture reaches temperatures sufficient for auto-ignition at the end of compression stroke, a spontaneous combustion occurs. Compared to HEHC, the HCHC is characterized by slightly lower compression ratio and, therefore, exhibits a lower efficiency.

The HCHC cycle may also be compared with a conventional Homogeneous Charge Compression Ignition (HCCI), which will occur when temperature of air/fuel mixture reaches the auto-ignition point, which, if engine is properly designed, should occur exactly at, or just prior to, the end of compression. The ignition in an HCCI cycle is almost instantaneous throughout the whole volume occurring without flame propagation or shock wave and at lower temperatures (which is a good thing for emissions and engine integrity) but, albeit, at a lower pressures, which leads to lower efficiencies lower than those achieved during an HEHC.

For a given air inlet temperature, pressure, the amount of Exhaust Gas Recirculation (EGR), air humidity, etc. there exists a critical ratio of air to fuel (lambda) under which spontaneous combustion will occur when temperature of compressing mixture reaches the auto-ignition point at the end of compression. For the sake of further discussion, we define this set of conditions as "critical conditions". If for example, the inlet temperature is too cold, and all other parameters are the same, then when air/fuel mixture reaches the target compression ratio, no combustion will occur. Conversely, if all the parameters are critical, but air/fuel mixture is too lean, then no combustion will occur either. Such conditions may be referred to as "sub-critical".

In conventional HCCI engines, a very narrow time window exists when auto-ignition may occur and this presents very challenging problems for engine control during part load conditions. That is why conventional HCCI engines are still in research stage for the last 25 years. In Otto engines the sparks play a role of combustion trigger. In Diesel engines, the start of the fuel injection is a trigger. In classical HCCI, there exists no trigger, which is why the combustion process is very difficult to control. If ignition occurs before top dead center (TDC), the combustion gas forces acting upon full face of the piston will be directed against the motion of the piston and will not only slow the engine and greatly reduce the efficiency, but will eventually destroy the engine. If ignition occurs after TDC the efficiency will be significantly reduced. The longer the delay, the lower the efficiency.

Since combustion is almost instantaneous, the constant volume combustion chamber is not strictly speaking required from efficiency standpoint, but is critical from the control point of view as it creates rather large window for combustion to occur. The HCHC cycle is superior to the conventional HCCI cycle due to several reasons. One reason includes the fact that it has a larger expansion volume than intake volume, which leads to a higher efficiency. The fuel in both HCCI and HCHC engines may be injected together with air into the intake port by low-pressure fuel injector or carburetor. In addition to this, a second fuel injection could be performed right before the auto-ignition conditions are reached. This additional injection will have only minor effect on autoignition timing due to combustion delay, but would allow control at part-load conditions and result in increase in efficiency. The additional fuel will not have sufficient time to undergo through homogenization process and this fuel will represent small clusters suspended in or moving through the original homogeneous air/fuel mix. The original mix or slightly sub-critical mix will auto-ignite as in the case of HCCI above, while additional fuel will quickly evaporate and provide for secondary combustion. The degree of "sub-criticality" for the most efficient burn has to be determined analytically and experimentally. By the way, such an additional fuel injection is also possible in conventional HCCI. While it is possible to use both the carburetor and fuel injector (FI), since both of them provide very similar functionality, it is probable that only one will be used in the engine. To control the part-load operation by shutting off the fuel supply, it would be preferable to use FI. If carburetor is being used, it should be run at full throttle to avoid throttling losses, so only needle valve supplying the specific amount of fuel might need to be controlled.

Having a constant volume combustion chamber (CV CbC) allows large operating time window for auto ignition to occur. This is due to the fact that auto ignition can occur any time after CV CbC is created (which is equivalent to TDC point of conventional engines).

The timing of ignition event in some embodiments, while important is not critical: if auto-ignition occurs slightly before the end of compression stroke (a point that could be compared with TDC), the differential force on the moving element (i.e. Rotor) of the engine will be very small, due to the small size of the CbC "throat" or exit cross section. Any occurrence of auto-ignition after the "TDC" is ok as well since it will occur within the CV CbC, i.e. at the time when forces acting upon the moving element (i.e. Rotor) will act in radial direction only and will be fully absorbed by the bearings—i.e. they will not impede the motion.

It is also a relatively easy to introduce a "trigger" into the system, due to existence of CV CbC, by exposing the CbC to catalytic substance. The combustion will occur due to stimulated ignition which could be accomplished by various means described in patent application PCT/US07/74980, incorporated herein by reference. One simple way of accomplishing this is by the deposition of catalyst, such as Nickel, onto one of the surfaces that makes CV CbC in such a way that when chamber containing the compressed air/fuel mixture in slightly "sub-critical" condition enters the segment containing the catalyst—reaction will be triggered by such a catalyst. This catalytic segment may be extended into the expansion zone if burning is expected to continue in this zone (though this is undesirable from efficiency standpoint), see FIGS. 39A-39B.

The term "Scavenged" is borrowed herein from conventional 2-cycle compression or spark ignition engines: the air is blown through the cylinder at the end of expansion stroke and combusted air is replaced with a fresh charge. The same notion may be applied to engine operating under the HEHC or HCHC, if we will blow the air through the chamber at the end of expansion stroke. Thus, the exhaust chamber and the intake chamber can be replaced by scavenging chamber.

Scavenging may be accomplished by an "Air Knife"—an air blown by the fan through the scavenging chamber or through inlet and outlet ports, located opposite to each other or under some angle to each other.

The benefit of this mode is increase in power density, as one of the chambers is eliminated. This may be especially beneficial if external engine cooling is required as scavenging may be combined with cooling.

The deficiency is slight reduction in efficiency as energy is required to scavenge the air.

A qualitative comparison of theoretical efficiencies is shown in FIG. 1A. A quantitative comparison of ideal cycles, which calculates the maximal theoretical efficiency, is shown in FIG. 1B), which was computed on the basis of below expressions for HEHC, Diesel and Otto Cycles:

$$\eta_{th}^{HEHC} = 1 - k\frac{T_4 - T_1}{T_3 - T_2} = 1 - k\frac{r_E - r_C}{r_E^k - r_C^k}$$

$$\eta_{th}^{Diesel} = 1 - \left(\frac{1}{k}\right)\frac{T_4 - T_1}{T_3 - T_2} = 1 - \left(\frac{1}{k}\right)\frac{r_E^{-k} - r_C^{-k}}{r_E^{-1} - r_C^{-1}}$$

$$\eta_{th}^{Otto} = 1 - \frac{T_4 - T_1}{T_3 - T_2} = 1 - \frac{1}{r_C^{k-1}}$$

Here, k=1.3; $r_C$-compression ratio; $r_E$-expansion ratio; $T_1$ through $T_4$ are temperatures of WM through various points in a cycle. See also points defined in a FIG. 1a.

Operation at full load is transparent and the maximal amount of fuel is injected by one of the means described above. To operate at part load, especially with heavy fuels like Diesel, JP8, etc., a number of options are available. The amount of fuel may be modulated as in as in conventional engines. The engine may be run lean, i.e. inject less then stoichiometric amount of fuel and run in HCHC mode. The amount of EGR may be varied, as in conventional HCCI engines. Alternatively, and preferably, the engine may be run in "digital mode"-by running every cycle at full load, but skipping cycles once and a while. For example, skipping three out of each ten cycles would enable us to run under ~70% of full power; skipping eight out of each ten cycles will enable us to run under ~20% loan, etc.

The cycle skipping can be implemented simply by cutting off the fuel supply. In this case, the air compressed in the Compressor will then expand in the Expander. This will not only occur with minimal loss in energy, as working media (air, in this case) acts as an air spring, but some energy recovery is possible, as heat is transferred from the Expander's walls to the air, thereby cooling the engine internally, while increasing the temperature and, therefore, pressure of the expanding gases thereby recuperating some of these cooling losses. This is in contrast with conventional engines, which require external cooling (either air or coolant), where the losses are irrecoverable.

To implement such a mode of operation, the engine is equipped with electronically controlled valves and a check valve, which prevents pressure drop below the ambient during the "off" cycles. A flywheel is employed to smooth torque fluctuations or, alternatively, multi-cylinder configuration is used instead of or in addition to flywheel.

If the engine is equipped with an external tank and clutches, the compressor could be disconnected for duration of increased power demand, thus allowing about 50% power boost, since the engine will not spend this amount of energy for the compression of air. Alternatively, if used in a car, the braking energy could be partially recovered by disconnecting the expander and applying car momentum to turn the wheels, which in turn will drive the compressor, which in turn will compress the air and push it into an external air tank.

The embodiments described hereafter are embodiments which may be used to implement the cycles provided as a part of the present invention. Throughout this document, the references will be made to automobile engine. It should be understood, that the engines provided should be equally applicable for any other applications as well.

One embodiment of the present invention is provided as a rotor and straight gate embodiment. The rotor & two straight gates embodiment has a cavity, formed by housing (which includes cover(s)), rotor and gate(s), which undergoes cyclical transformation according to generalized description above. This engine is shown in FIGS. 3A through 7D.

Figure 3C:
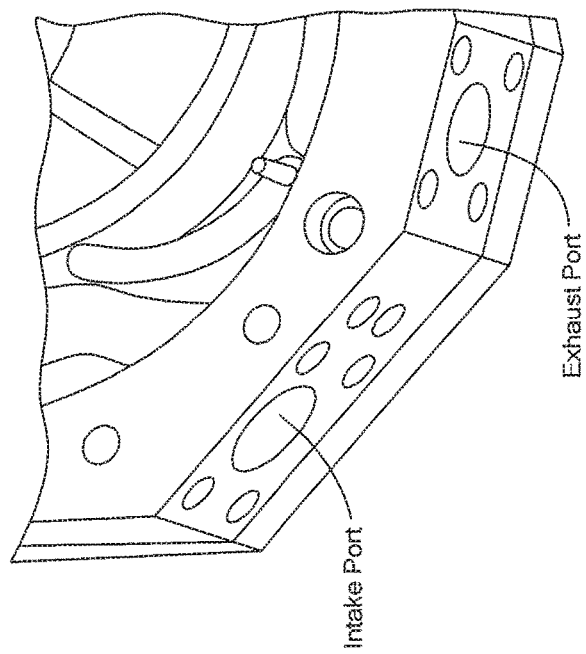
FIGS. 3A-3C illustrate a rotary engine with 2 straight gates in accordance with an embodiment of the present invention.
Figure 3A:
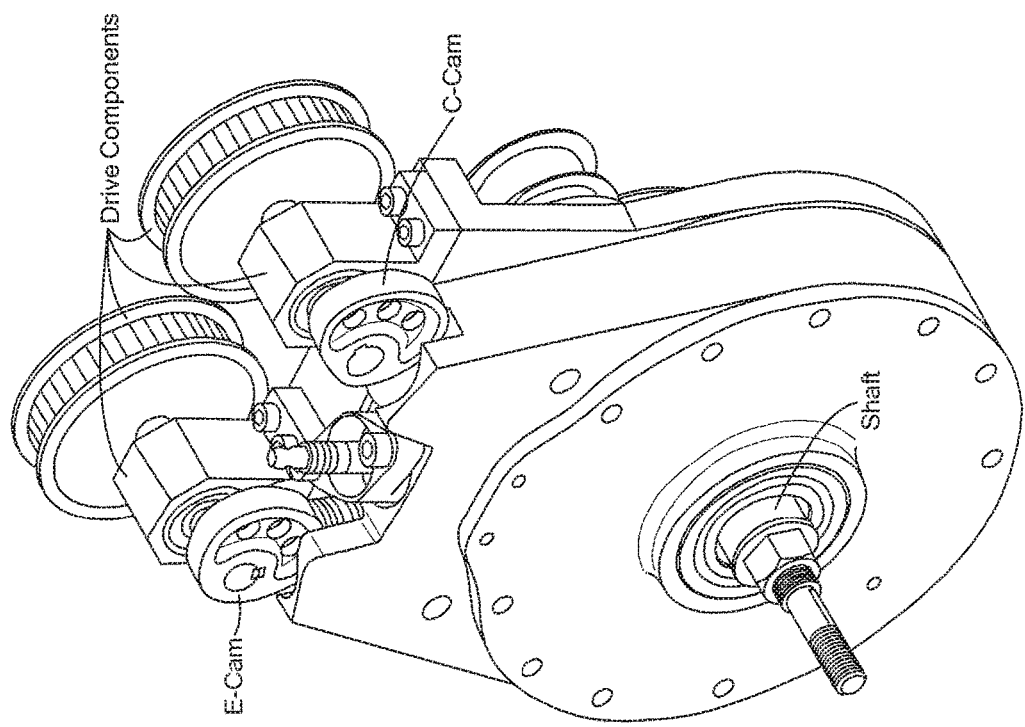
Figure 3B:
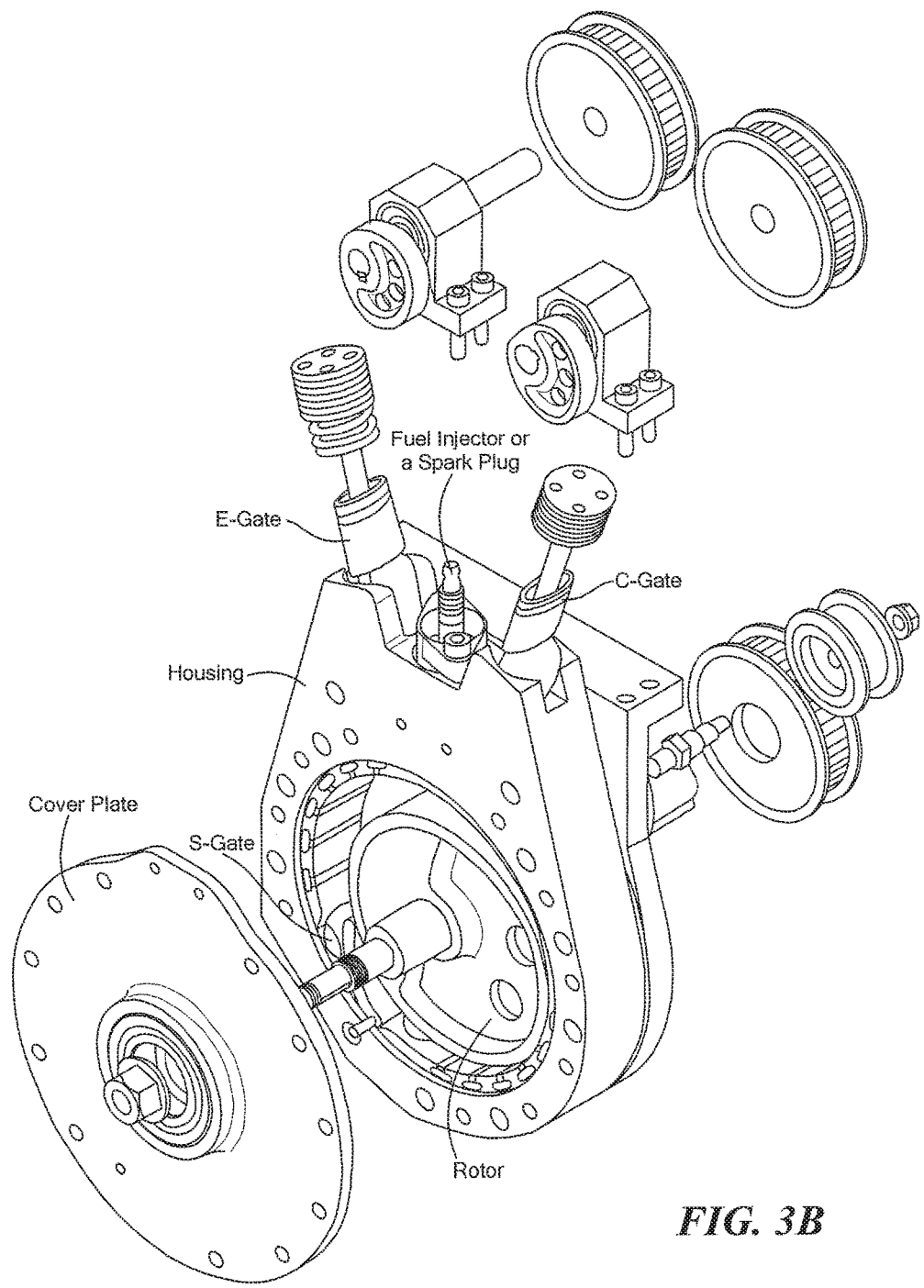

FIGS. 3A-3C give both general and exploded views of the engine, whose gates, in this case, are controlled via external cams. It also provides the nomenclature for the main components of the engine, namely a housing and cover plate with an intake and exhaust ports, all of which may be called a housing in some embodiments, a rotor, two gates, including a c-gate or compressor gate and an e-gate or an expander gate and an optional s-gate or separator gate.

A rotor, in a course of its clock-wise rotation, together with a housing, cover and gates forms variable volume cavities, which we will call now chambers, as shown in FIGS. 4A-4C and include a compression chamber (CmP), a intake Chamber (InC), a combustion chamber (CbC), an expansion Chamber (EpC), and an exhaust chamber (EhC). Note that not all of the chambers will exists at the same time, as is evident from FIGS. 4A-4C and 5A-5C. All chambers except the CbC have variable volumes.

To facilitate the foregoing discussion and referencing FIG. 2 for cycle description and FIGS. 5A-5C and 6A-6C for corresponding operational sequence, we define the following terms: $V_1$ is the CmC intake air volume (See point 1 on PV-diagram, FIG. 1A), a maximum volume that this chamber can assume during the intake stroke; $V_2$-CbC compressed air volume (See point 2 on PV-diagram FIG. 1A; $V_1 \approx 12\times$ to $25 \times V_2$; this is a constant volume CbC.); $V_3$ is $V_2$ less the volume at the end of combustion (See point 3 on PV-diagram, FIG. 1A); $V_4$ is the EpC exhaust volume of combusted gases at point 4, which corresponds to $P_4=1$ bar. (See point 4 on PV-diagram, FIG. 1A)

Figure 5C:
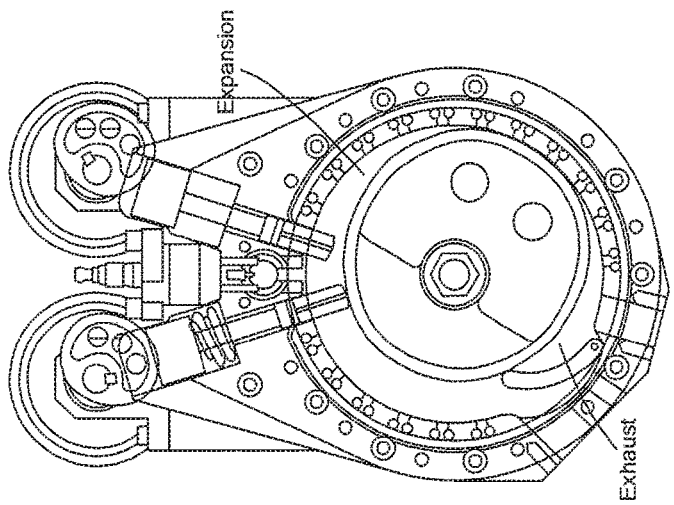
Figure 5B:
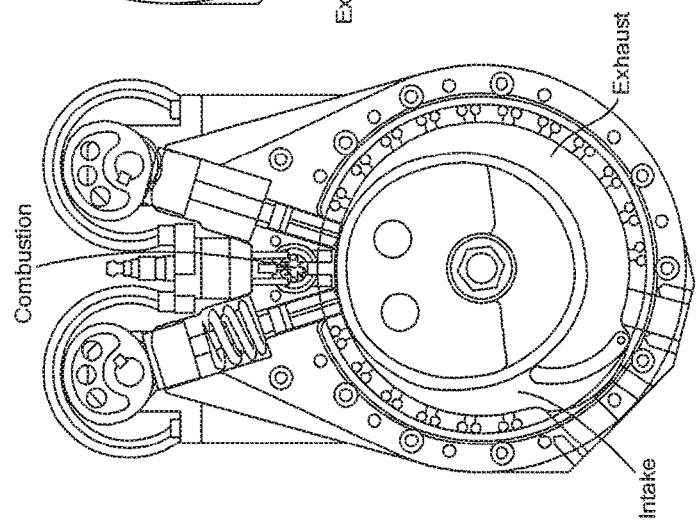
Figure 5A:
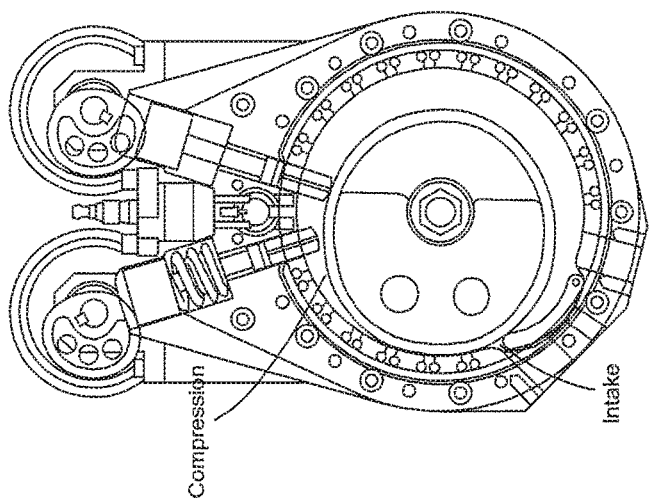

Operational sequence of the Engine is shown in FIG. 5a) through c) and described in the table below.

|  | Intake | Compression | Combustion | Expansion | Exhaust |
| --- | --- | --- | --- | --- | --- |
| FIG. 5A | Begins | In Progress | | | |
| FIG. 5B | | | In Progress | | Begins |
| FIG. 5C | | | | In Progress | In Progress |

Gates in an embodiment of the present invention are driven and controlled by one of the following means: external cam(s) with springs as shown in FIGS. 3A-6C (this is very similar to poppet valve actuation in modern engines), and desmodromic cams, when two cams control the position of the gate (again this is similar to poppet valve actuation in modern engines, which employ desmodromic cams). Sometimes, the desmodromic cams are known under the name "conjugate cams".

Figure 6B:
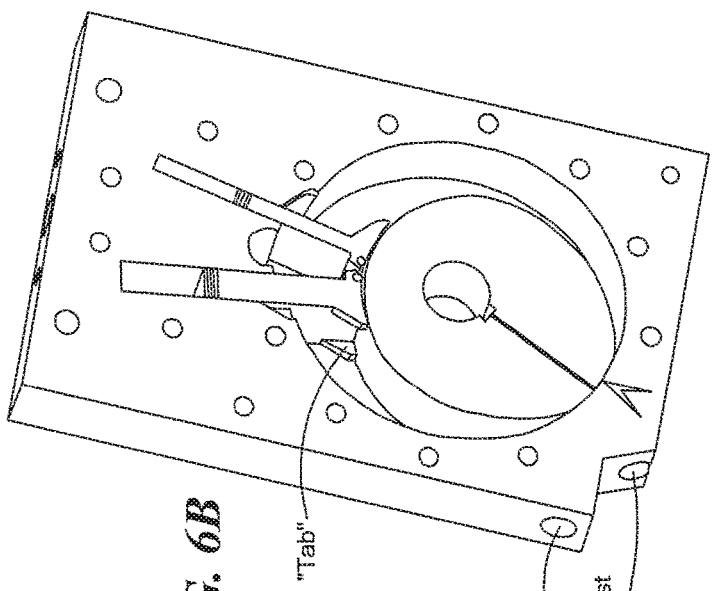
FIGS. 6A-6C illustrate a rotary engine with 2 straight gates in accordance with another embodiment of the present invention.
Figure 6C:
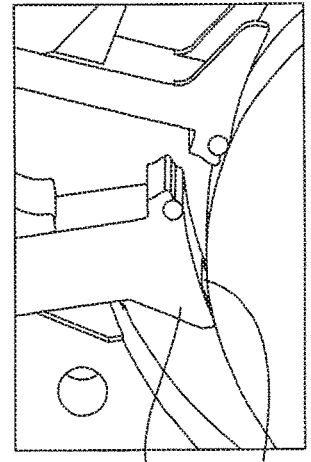
Figure 6A:
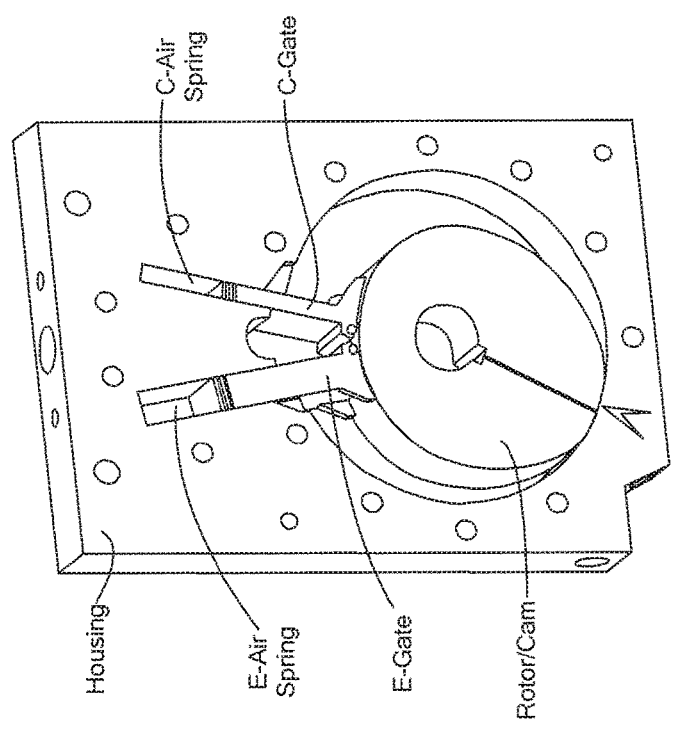
Figure 7A:
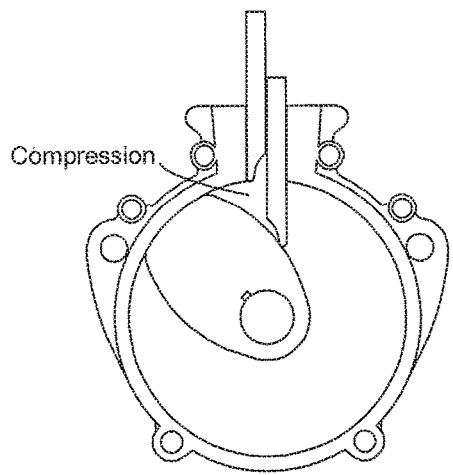
FIGS. 7A-7D illustrate a rotary engine with 2 straight gates in accordance with another embodiment of the present invention.
Figure 7B:
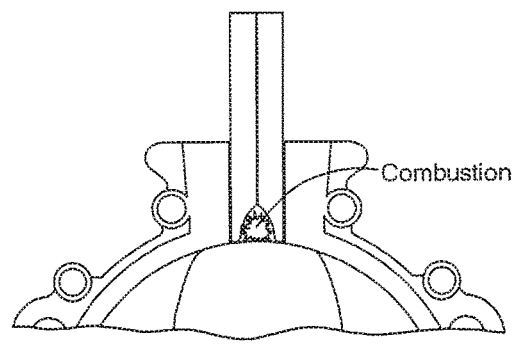
Figure 7C:
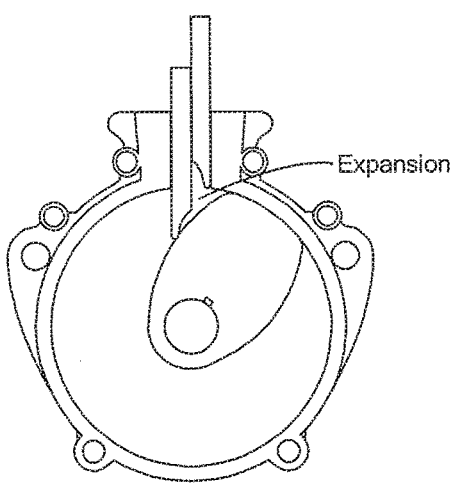
Figure 7D:
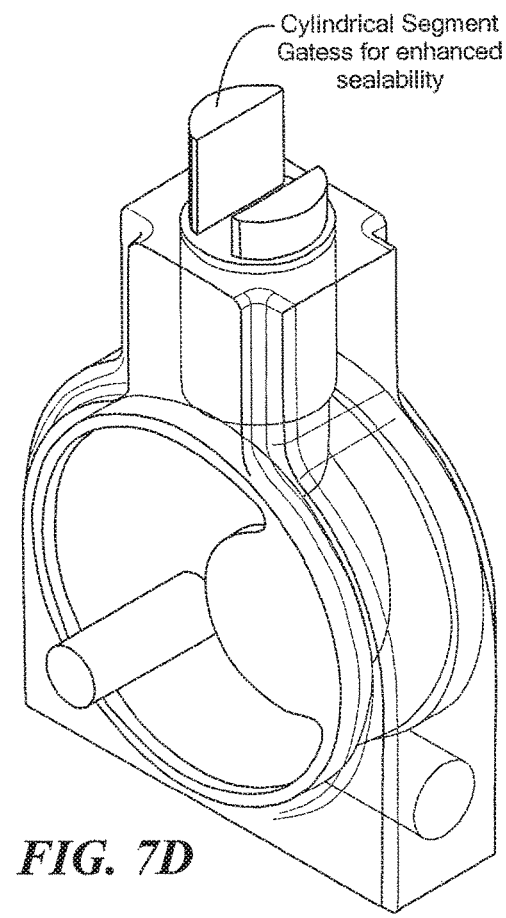
Figure 8A:
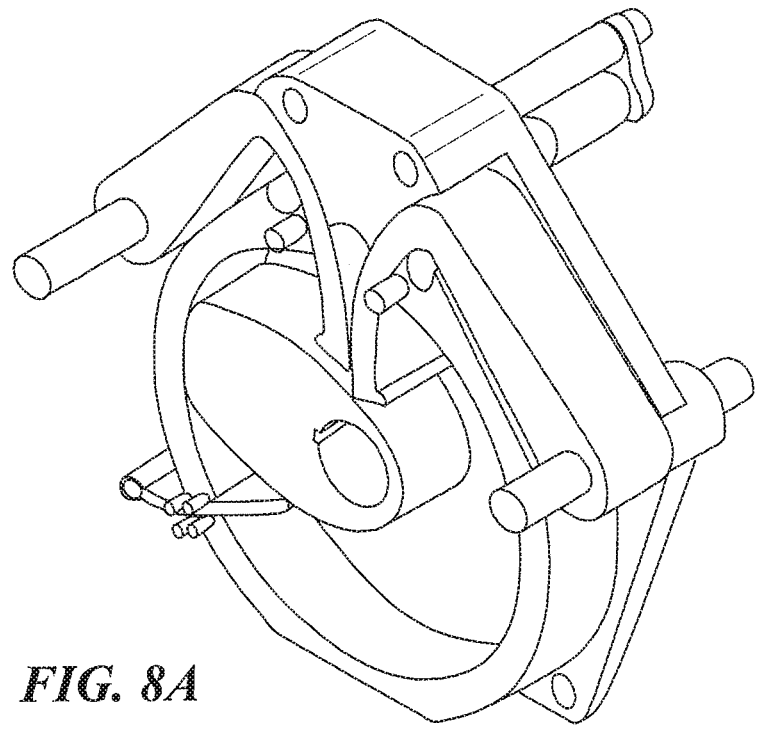
FIGS. 8A-8B illustrate a rotary engine with 2 pivoting gates in accordance with an embodiment of the present invention.
Figure 8B:
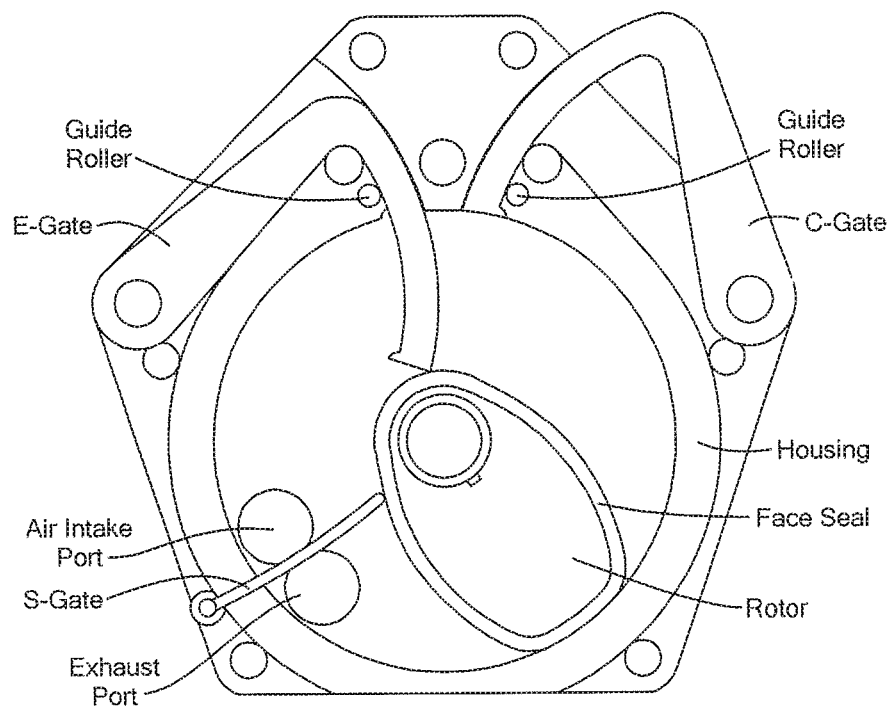

Gates also may also be driven by the Rotor itself, which in this case acts as a cam as shown in FIGS. 6A-6C. The opposing motion could be provided either by external cam, or by the return spring, both conventional or air spring. The strategically located tabs on the gate allow gases to escape under the gate, when such a gate is not participating in a corresponding stroke. For example, the compressed gas would go under the e-gate, which is not part of a compression cycle and is there just "for a ride". Similarly, during the expansion stroke, the expanding gases escape under c-gate, which does not participates in the expansion stroke.

Direct electro-mechanical, pneumatic, hydraulic or any other suitable drives (not shown) are also possible. Besides trivial modifications, for those proficient in the art, which involve changes in gate geometry, pivoting points, wall's geometry and angles (for example a conical Rotor and corresponding housing walls and gates, etc.), there are numerous modifications that may enhance the design and operation of the engine, especially as far as sealability of the engine is concerned.

Some of these variations include various configurations of gates such as oval gates shown in FIGS. 3A-3C, which may offer enhanced sealability, as conventional high-temperature polymer o-rings could be used on oval shapes. A rectangular, triangular, curved segment, etc. cross sections may be used as well. Gates may also be guided by the housing and/or rollers (see FIGS. 6A-6C and 7A-7D). Also, various features on the gate may be useful: i.e. a lip on the gate is used to enhance the sealing (due to WM pressure acting on this lip) as well as the stop to limit the retraction of the gate as shown in FIGS. 38A-38C.

Gates may also be guided by the rollers. The gates may be controlled by a stepper motor, a linear motor, an electromagnetic system, a pneumatic system, a hydraulic system or any other suitable means for control. This allows greater flexibility in operating cycles as well and it may also provide a low constant frictional force and tight sealing between the gates and the rotor.

Combustion chamber may be sectioned in an axial direction. Two, three or more sections may provide separate FI and thus provide additional control for part-load operation. For example, if CbC is portioned into 3 chambers and fuel is added only to 2 out of 3 sub-chambers-the power generated will be ⅔ of full power. Additional important benefit of this is a potential reduction of NOx formation since relatively cold air will be combined with hot combusted gases.

A position of intake port may be variable with respect to Rotor location. This will effectively allow varying $V_1$ and, therefore, the compression ratio. Alternatively, variable sized CbC (for example by using retractable plunger) may be used as this would enable variable compression ratios, without changing the intake volume $V_1$. Both of these options may be used when greater flexibility in intake volume $V_1$ and compression ratio is required.

Nitrogen/Oxygen membrane or Oxygen concentrators may be installed at the intake port of the engine, limiting the amount of $N_2$ from the air and, therefore the amount of $NO_x$ formation. See also U.S. Pat. No. 6,640,794, (http://www.csiro.au/hannover/2001/catalog/projects/ceramic.html, http://www.csiro.au/solutions/psw3.html)

For instances where gates are spring-loaded and motion is controlled by the gas pressure, it is important to assure a small but constant force excreted from the blade on the Rotor (or vice versa). To enable this it is possible to have a cam operated spring, such that the force excreted by the spring-$F=k\ x$, where k is a spring const and x is deflection, is provided with more or less constant deflection. I.e. one end of the spring should be fixed on the movable gate, while other end should be supported either directly by cam or by surface that is supported by cam. The cam would ensure that the deflection x remains approximately constant.

The gate, rotor (and Vane, as appropriate) may be split in the middle (perpendicular to axes) and C-Seal/Spring or gas-filled seal/spring could be placed between two halves, which would force the flat faces of the gates/rotors/vanes to serve as face seals. An alternative to splitting gates/rotors/vanes is to split the outer surfaces of these elements that would serve as a seal themselves. This is shown in FIGS. 45A-45C for the rotor and FIGS. 43A-43E for the gate. The same concept could be applied to vanes. The edges may be hardened, while the remaining flat surface could be slightly recessed to prevent interaction with flat surfaces of the housing, which might break the seal. The recessed volume may also carry some oil/grease to aid in sealing and lubrication.

The holes in the Rotor are to lighten the Rotor and to allow the gas to escape from under the recess to prevent "floating".

Both gates are driven by the rotor/cam and back-pressured by the air spring located above the gates. In fully extracted position (FIGS. 6A-6C) there is little pressure from the air-spring onto the gates. In fully inserted position the pressure on the gates is high. The oil in the air springs cavities seals the air spring and lubricates the gates. Oil is also supplied to the gate's rollers to reduce friction and to form the hydrodynamic bearing. The tails on the gates are to enable support the gates by the rotor/cam and to allow the gases to get into or from the CbC. Recesses in the housing allow tails in the gates to be fully inserted, which minimizes the air losses. During the operation, one gate is supported by the roller, while the other is supported by the tail (except for combustion stroke, when both gates are supported by the rollers.) The roller serves as a seal.

If integrated Rotor (FIGS. 43A-43E) is used-the rotor may utilize hydrodynamic bearings, which will double in function as additional seals, thus eliminating the need of bearing supporting the rotor.

Figure 9B:
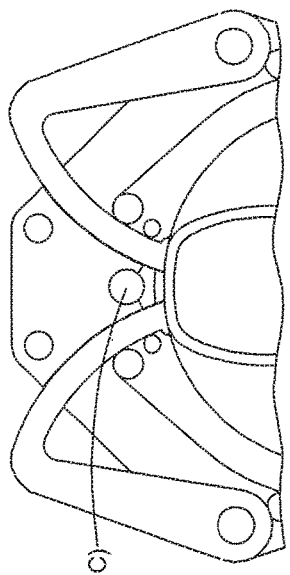
FIGS. 9A-9C illustrate the engine embodiment of FIGS. 8A-8B during different portions of the high efficiency hybrid cycle.
Figure 9C:
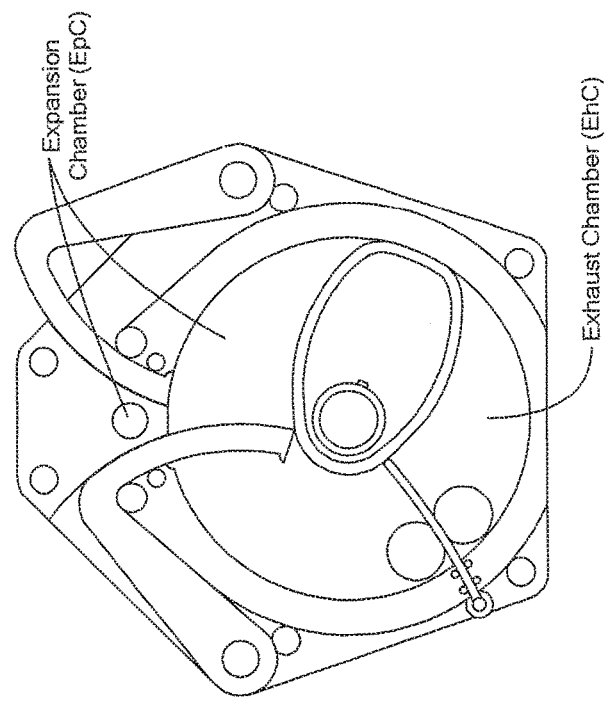
Figure 9A:
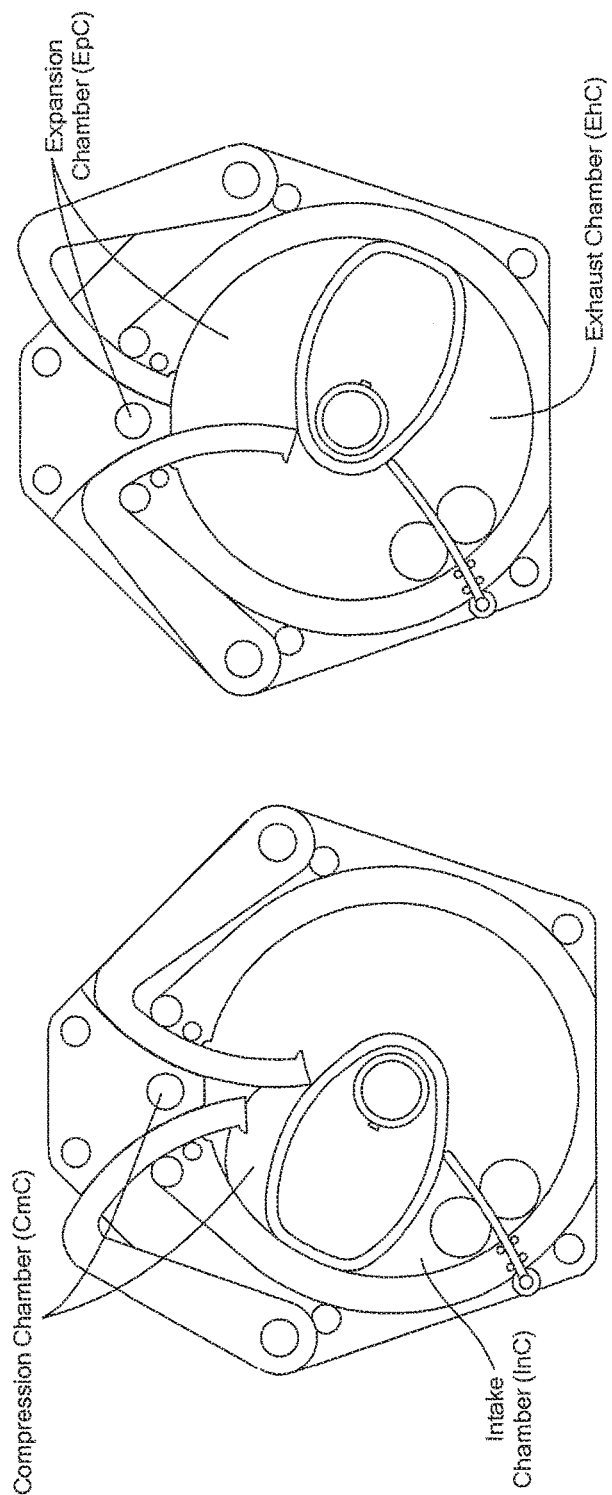

Another variation is possible comprising gates that are straight or are pivoting inside the rotating rotor. The basic geometry of the engine is shown in FIGS. 6A-6C and 8A-8B. The differences with the straight gate design are minor. The gates pivot in an arc rather than slide. Operation of this engine is analogues to that of the straight gate design and is shown in FIGS. 9A-9C. In addition to variations described for straight gate design, the variations to Pivoting Gate geometry might include: gates that are be pivoted by flexural pivot bearings, gates that are pivoted on the same pivot axes.

Another embodiment of the present invention includes a rotor with two pivoting gates. This embodiment may incorporate a scavenging design. Scavenging may be accomplished in number of different ways, including the use of scavenging gate designs. Other ways may include universal methods, like the "air knife" concept that is applicable to most embodiments.

Figure 10C:
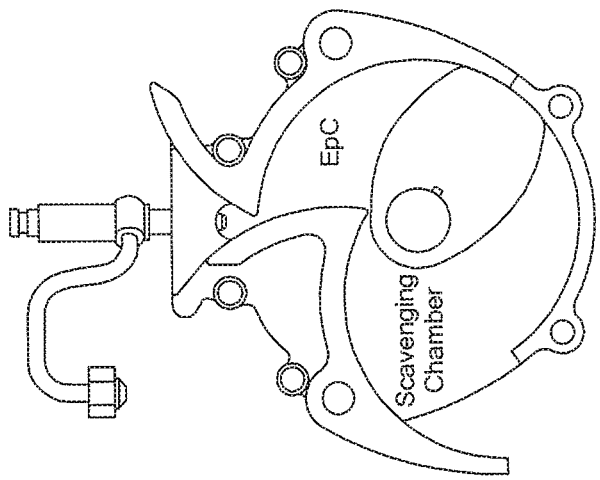
FIGS. 10A-10C illustrate a rotary engine with 2 pivoting gates that form a part of the housing in accordance with another embodiment of the present invention.
Figure 10B:
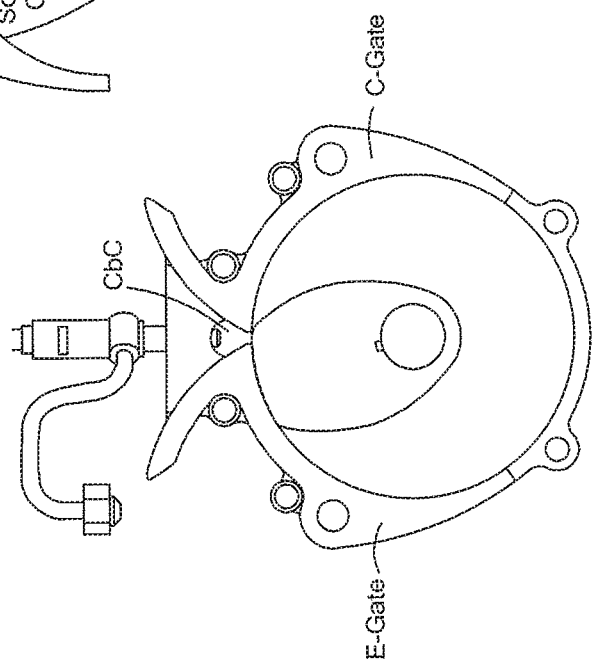
Figure 10A:
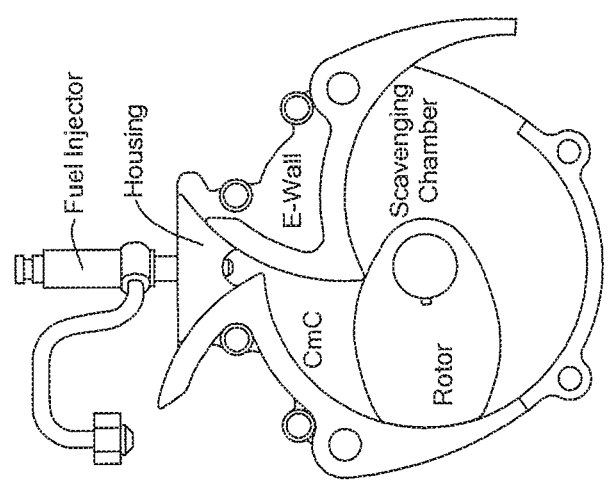

The rotor with two pivoting gates embodiments implementing a scavenging design has a cavity, formed by a housing, a cover, a rotor and pivoting gates, which undergo cyclical transformation according to the afore provided descriptions. This engine is shown in FIGS. 10A-10C. Gates are pivoted into operating position by external cams (not shown, but similar to those shown in FIGS. 12A-12G).). The cover is removed reviling and identifies the main components of the engine which include: a housing (a cover plate, not shown), a rotor, two pivoting gates, which simultaneously serve as walls of the engine, a c-gate or compressor gate an e-gate or expander gate. Two gates do not have to be the same shape.

The rotor, in a course of its rotation, together with a housing, a cover and gates forms variable volume chambers, as shown in FIGS. 9A-9C. The chambers formed include a compression chamber (CmP), a combustion chamber (CbC), and an expansion chamber (EpC). Note that not all of the chambers will exists at the same time, as is evident from FIGS. 9A-9C. All chambers except the CbC have variable volumes.

Unlike previous Pivoted embodiment, there are no Intake and Exhaust chambers and ports (though it is possible to have them, if beneficial) and engine operates in "2-cycle" scavenged mode. In this case, even scavenging fan blowing the fresh air charge is not necessary since scavenging chamber is a wide open space.

Operation of this engine is analogous to straight gates and Pivoted Gates embodiments. Variations of the invention are shown in FIGS. 10A-10C where the gates are pivoted around pivot points. An alternative arrangement has the side gates in a sliding configuration. Appropriately mounted bearing guides should be able to accept the side loads from high pressure WM. Finally, a combination of slide and pivot could be employed as well.

Altogether different variation of scavenging designs involve locating the intake and Exhaust ports in close proximity to each other, preferably in opposition to each other and blowing the air through the intake port, thus creating an "Air Knife", which will act as a "wall" preventing a cross flow from the exhaust chamber into an intake chamber. The Air Knife will "drag" the exhaust gases out of exhaust chamber. This concept is shown in FIGS. 11A-11B and is applicable to most of the embodiments that are discussed in this application.

A rotor and pivoting connected gates embodiment is also provided in accordance with an embodiment of the present invention. This embodiment is similar to pivoting gates design, except that the gates have the same pivot point and are connected to each other, thus forming what appears to be one gate with two ends that serve as e-gate and a c-gate. Geometrically this represents a segment of a hollow cylinder.

The CbC is located inside of the hollow cylinder. This limits the access to it from the top, but since it is possible to access it from both sides, this should not represent the major problem. The access is needed for fuel delivery and pressure/temperature measurements inside of the CbC.

Operation of this engine is analogous to straight gates and pivoted gates embodiments. The gate is driven in oscillatory manner around the combustion chamber by a spring loaded 4-bar link mechanism, as shown in FIGS. 12A-12G, or by symmetric 4-bar mechanism, which, in essence becomes a desmodromic drive, or by any other suitable means.

There may be a number of variations of this very compact design. If we allow the covers to be rigidly attached to the Rotor and thus turn together with the Rotor, as will be described in FIGS. 41A-41B, we can form groves within these covers which will serve as cams to drive the gate. This variation is especially great for HCHC, since no access to CbC for fuel injectors is required. For HEHC operation, the fuel injector could be located on the side of the engine-perpendicular to Gate's pivot axis.

Pivoted gates may be transformed into a completely rotary gate, albeit turning with a non-uniform speed. The motion can be continuous or intermittent with short dwells during which CV CbC is formed. Finally, the gate itself may serve as a CbC.

Figure 13:
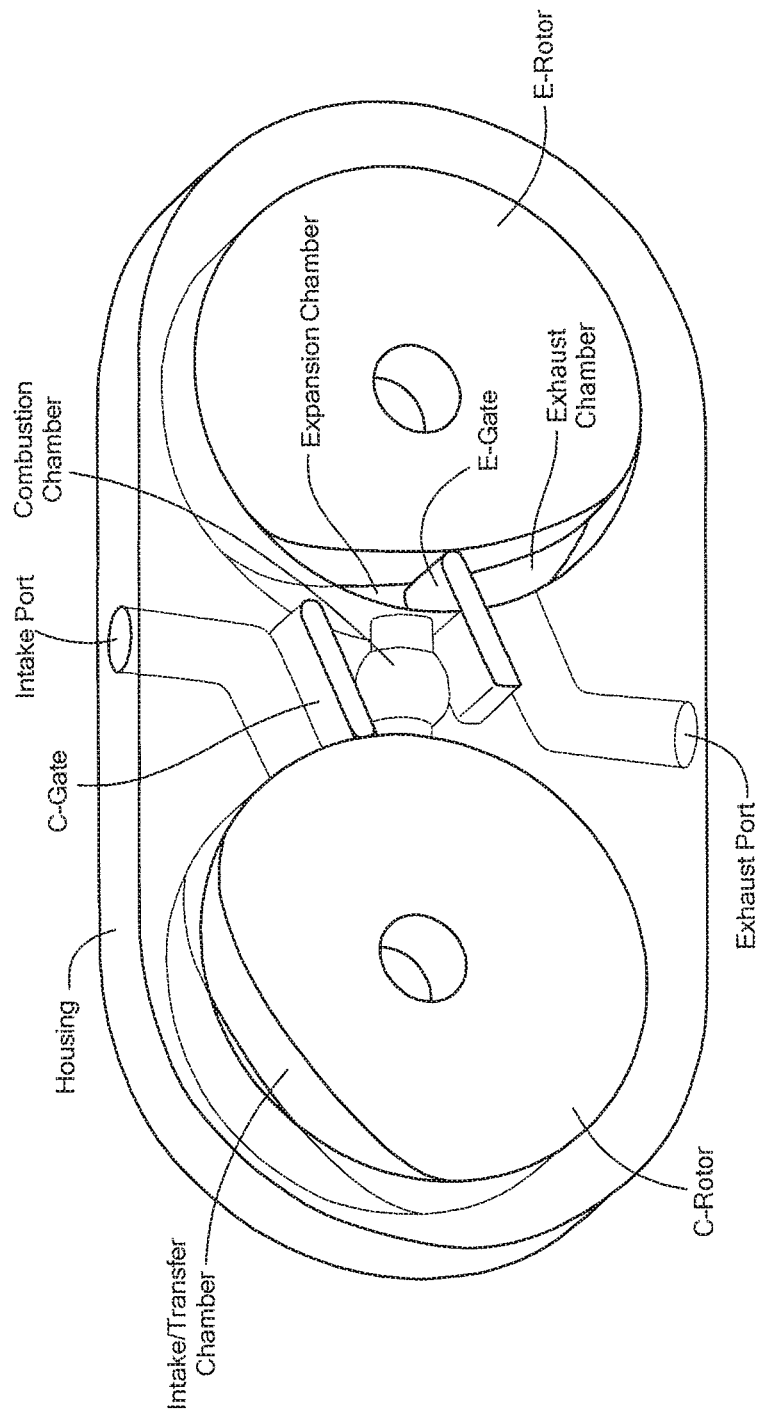
FIG. 13 shows an engine with 2 rotors and 2 gates in accordance with an embodiment of the present invention.

Another embodiment of the present invention provides an engine with two rotors and two gates. The two rotors and two gates embodiment is shown in FIG. 13. It consists of two rotors, a c-rotor and an e-rotor; and two gates, a c-gate and an e-gate, and the housing. Transfer channels, containing the CbC connect the cavities formed by housing, rotors and gates. Rotors are coupled mechanically via gears, chains or timing belts. Covers, shafts, injectors, etc. are not shown for clarity. For the sake of further discussion, we will call this embodiment a "single deck", which, basically, corresponds to a single-cylinder engine.

Rotors are basically D-shaped; having a rather large constant radius segment is essential for valving function of the rotor, which will be described below. D-shape is here used to indicate a mostly circular geometry with the straight cut segment removed from the circle. Corners are rounded, of course for smoothness of operation. Such a rotor is referred to herein as a D-shaped or single-lobe rotor. The rotor, in a course of its clock-wise rotation, together with housing, covers and gates forms variable volume cavities or chambers, shown in FIG. 13 including a compression chamber (CmP), an intake and transfer chamber (InC), a combustion chamber (CbC), an expansion chamber (EpC), and an exhaust chamber (EhC). Note that not all of the chambers will exists at the same time, as is evident from FIGS. 5A-5C.

During operation of this engine air enters the intake port into a CmC formed c-rotor, gate and the housing. Air is transferred then in a course of a large part of its angular travel, without changing its volume.

During the transfer part of the operation, air is trapped within the CmC. This could be used to our advantage to increase the efficiency of engine operation by transferring the heat from the expander's walls to compressor's walls via heat pipe, by locating the second "deck" in opposition to the first, i.e. by having the e-rotor of the second "deck" being coaxial with c-rotor of the first "deck".

After transfer phase, the c-gate engages the c-rotor and air is being compressed into a constant volume CbC by the leading edge of the "D", while simultaneously it is being inducted on the trailing edge of the "D". After all air is compressed into CbC, the radial part of the D-shaped Rotor plugs the hole leading to a CbC. Thus, the rotor executes the additional function of a valve.

At this moment of time, the e-rotor, which rotates in the same or opposite direction, depending upon design, still plugs the hole leading from the CbC into the expansion chamber. The overlap of these two rotors defines the length of constant volume time.

Variations of the above embodiment may include having two independent rotors. Such an embodiment affords great flexibility to design as the rotor shape may deviate from the D-shape. While having a rather large constant radius segment is essential for valving functions of the rotor, the remaining non-constant radius part may assume any shape, from straight to concave.

There could be more than one "cut" in the Rotor shape-two or three, or even more are practical. Correspondingly, such a rotor would be called 2-lobes, 3-lobes, etc. This would increase the power density of the engine.

Gates could be straight or curved, sliding inside of the Housing or pivoted. Rollers could be used for guiding purposes and to reduce the friction.

If rotors are of "integrated type", i.e. they are coupled to covers that rotate together with the rotor as shown in FIGS. 43A-43E, the gates may be driven by cams located on the end plates themselves.

Rotors may be of different diameters or thickness to accommodate for $V_4 > V_1$ condition of the HEHC. The gates may be driven by the rotors (if spring loaded; spring might be an air-spring) or by external cams or electromagnetic, hydraulic or other means.

The rotors do not have to rotate with the same speed (and direction). Having rather long dwells, during which WM is being transferred from one position to another, may be reduced or even completely eliminated, by having multi-lobed rotors and/or rotating two rotors with different speed.

Figure 14A:
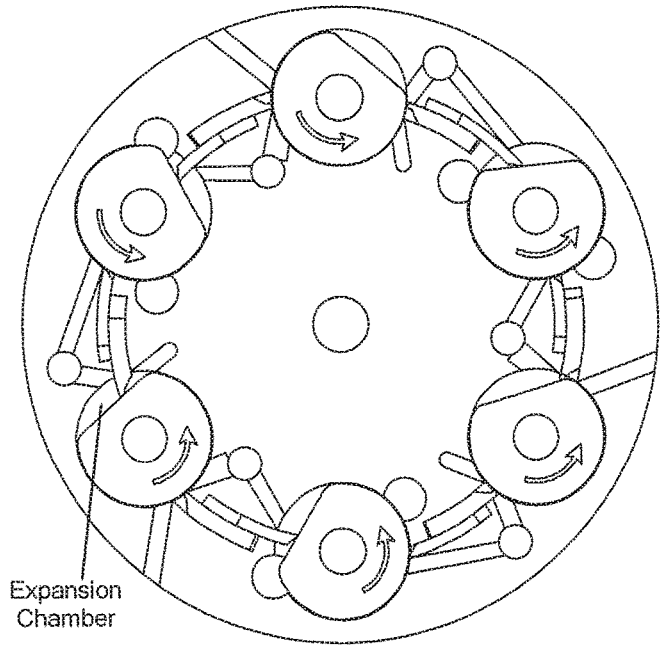
FIGS. 14A-14B show an engine with a plurality of rotors and gates in accordance with an embodiment of the present invention.
Figure 14B:
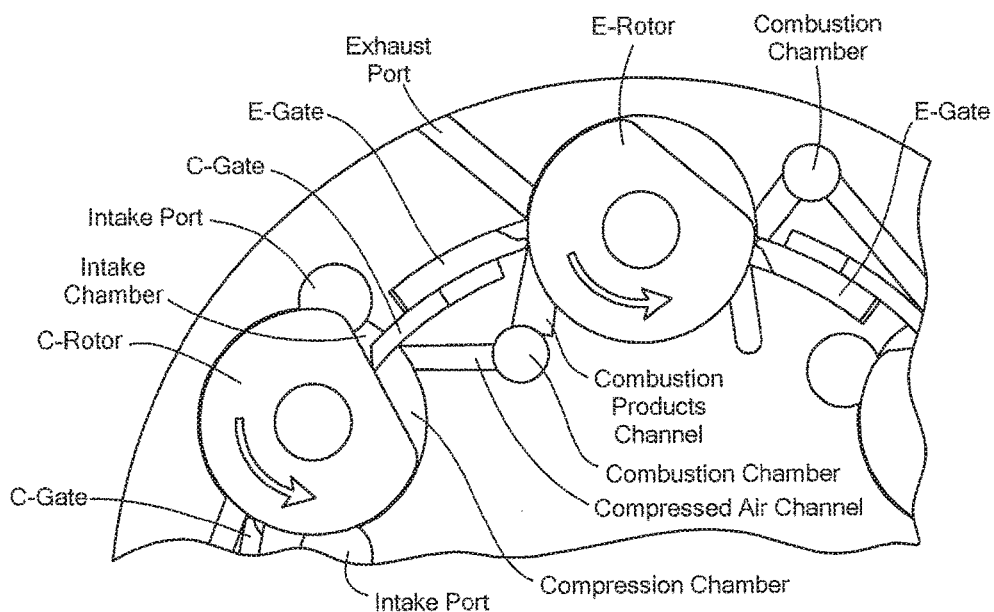
Figure 15:
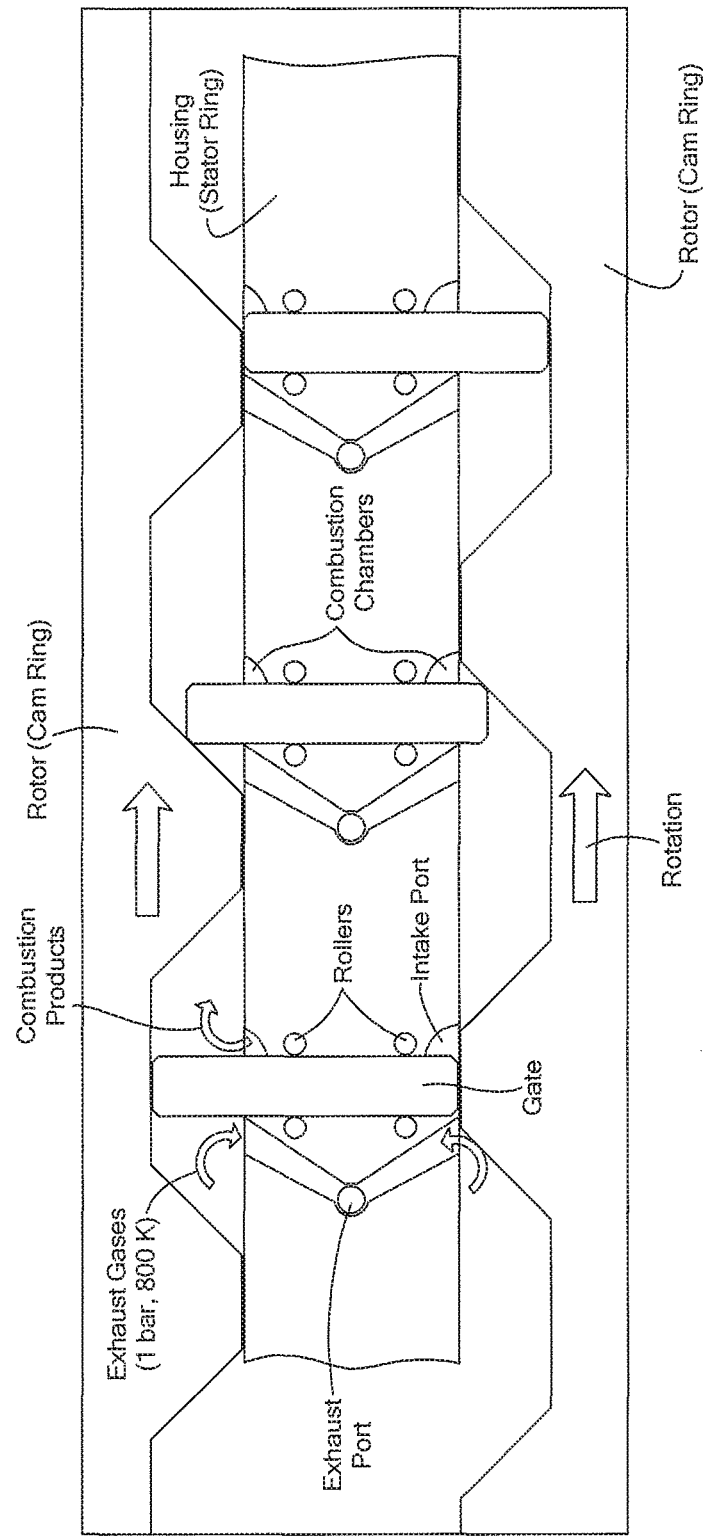
FIG. 15 shows an embodiment of the present invention having two rotors with multiple gates.
Figure 16B:
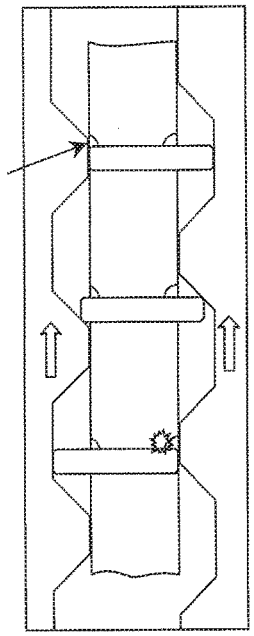
FIGS. 16A-16F show the operational sequence of an engine depicted in FIG. 15.
Figure 16D:
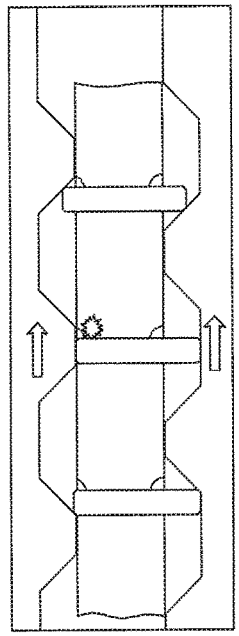
Figure 16F:
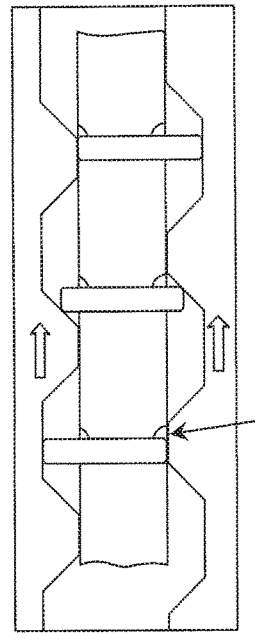
Figure 16A:
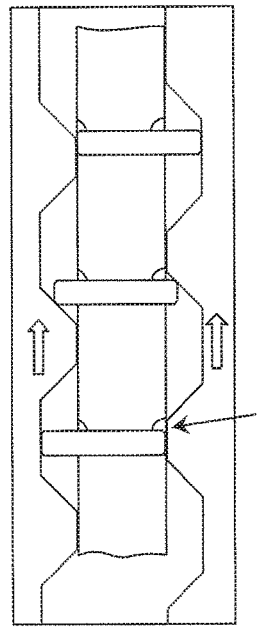
Figure 16C:
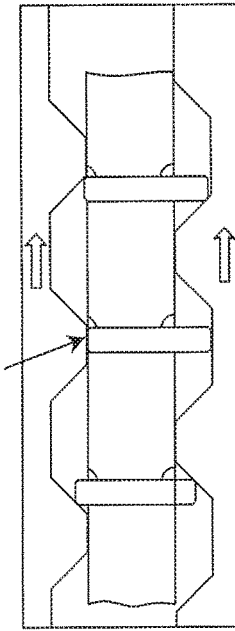
Figure 16E:
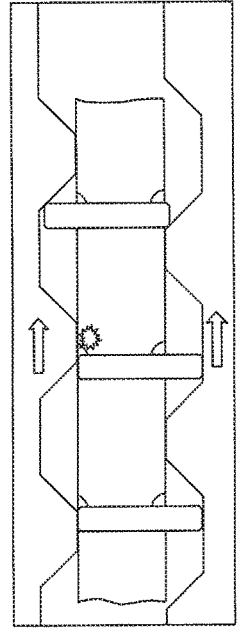

The 2-rotor/2-gate embodiment may be considered a building block for larger systems. While this is true for any of the embodiments described above, this is especially beneficial for this engine. FIGS. 14A-14B demonstrates the example of 6-rotor/12 gate embodiment, which benefits in that it doubles the output of the equivalent 2-rotor/2-gate system as each pair of rotors fires twice in a course of a single revolution. To clarify, if a 2-rotor/2-gate rotor power output is P, then a 6-rotors/12 gates system will produce P×3×2=6×P.

Especially compact configurations may be made with a single centrally located c-rotor and two, three or more e-rotors, having the same or different sizes, same or different numbers of lobes, same or different rotational speed, etc. E-rotors may be located symmetrically around the c-rotor; thus, forming a generally triangular configuration in the case of three e-rotors or a quad configuration in the case of four, etc.

In another embodiment of the present invention a two rotor engine with multiple gates is provided. Multiple variations of basic engine are possible and may be apparent to those skilled in the art. One particularly interesting example is that of axial vane engine in which the vanes move in axial direction instead off a radial direction. Appropriately locating air intake slots and exhaust slots in the housing and/or cover plates allows implementing the HEHC, M-HCCI, M-HCCI+FI, HEHC-S, etc.

In another embodiment of the present invention a single rotor, multiple vane engine configuration is provided. In this geometry, a rotor rotates within the housing and carries with it two (or more) sets of vanes, each set consisting of c-vane, which compresses a fresh air charge into a CbC, and e-vane, which expands the combustion products while transferring power through the rotor to the shaft. The engine, shown in FIG. 17A through FIGS. 19A-19D, undergoes cyclical transformation according to generalized description above.

Figure 17A:
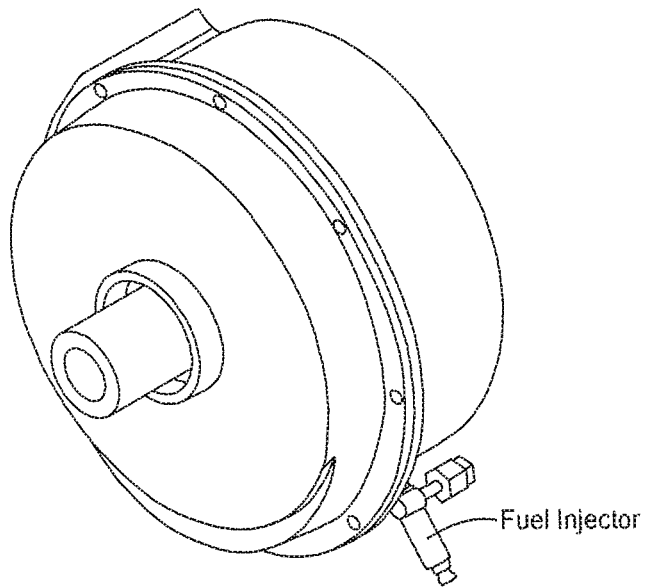
FIGS. 17A-17C show an exploded view of an engine with multiple sets of pivoting gates in accordance with an embodiment of the present invention.
Figure 17C:
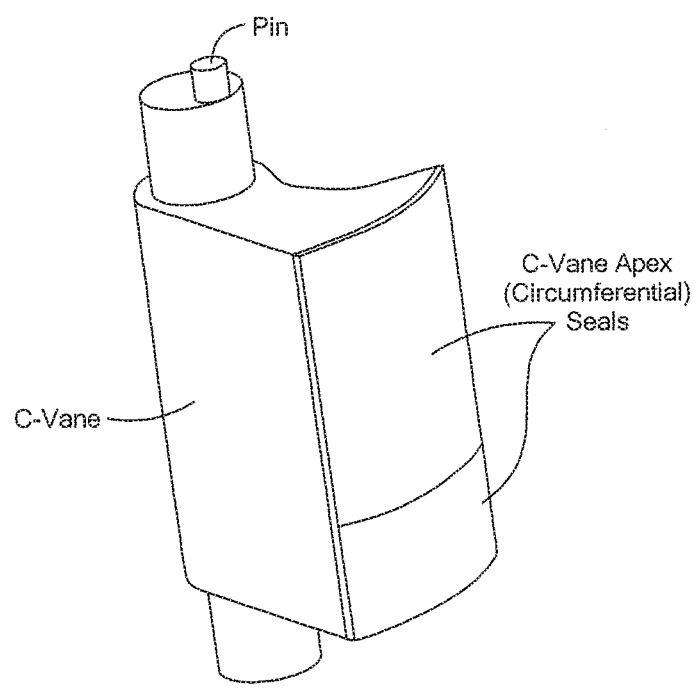
Figure 17B:
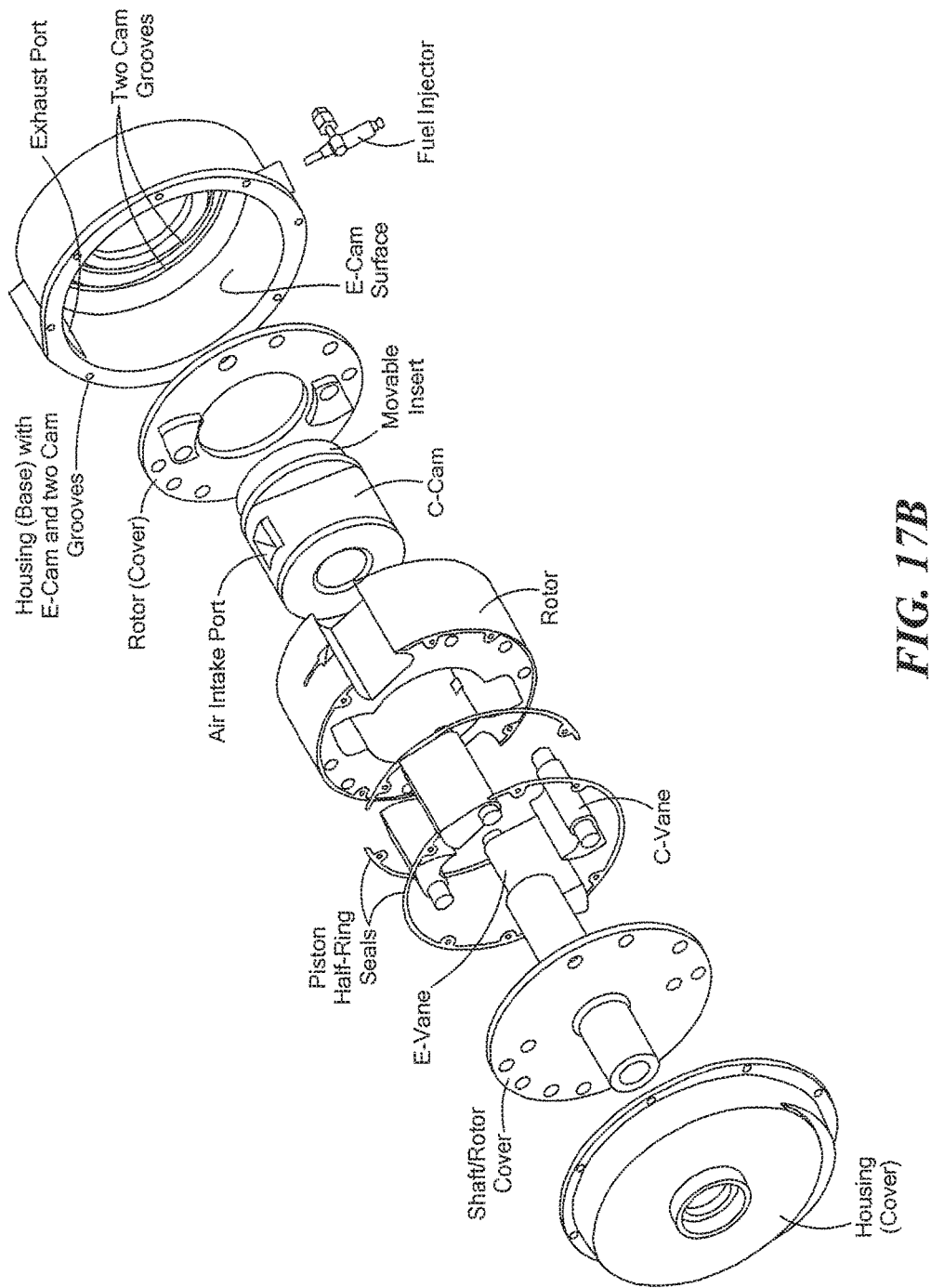
Figures 18A, 18B:
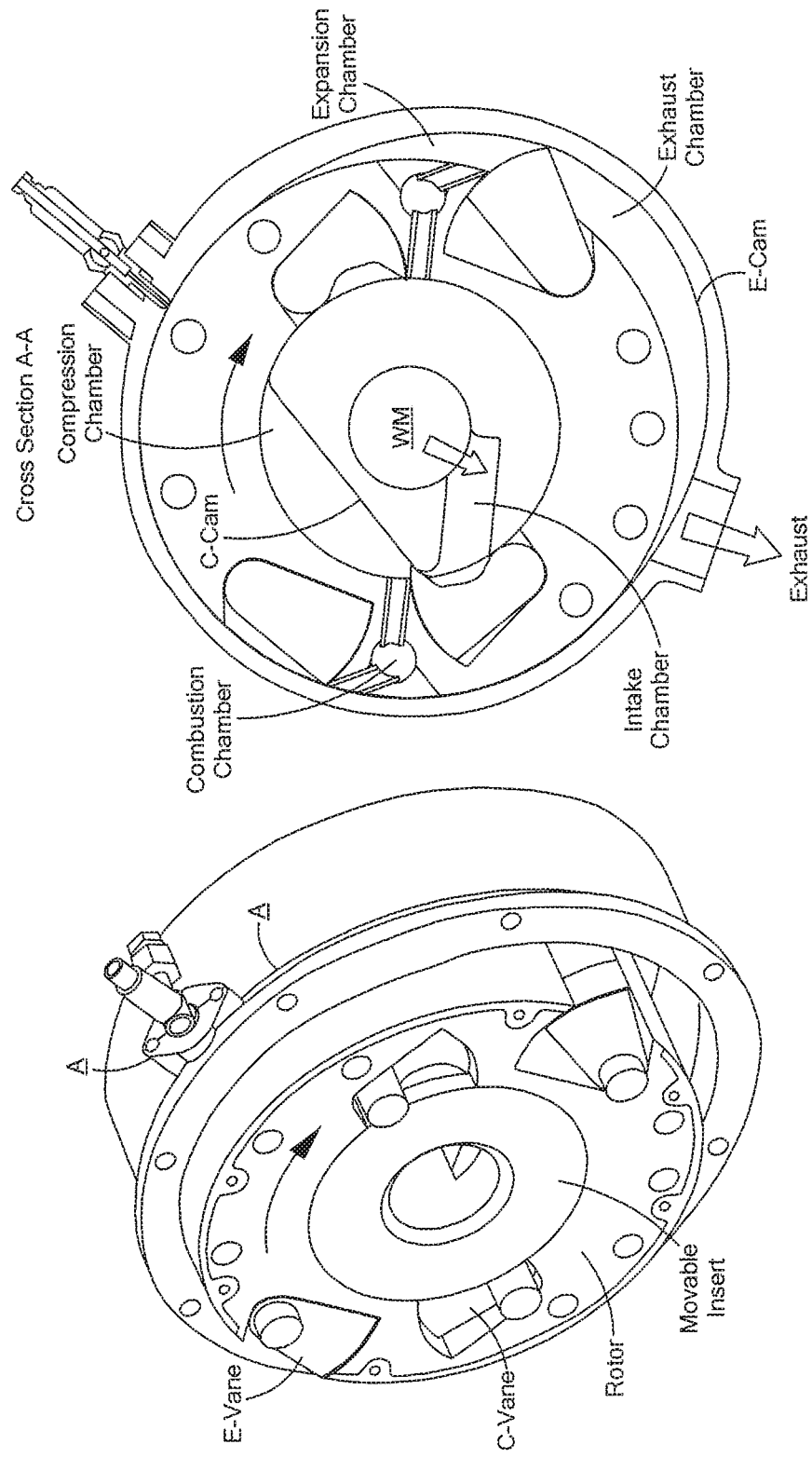
FIGS. 18A and 18B show a perspective view, respectively, and cross sectional view of the engine depicted in FIGS. 17A-17C.

FIGS. 17A-17C give both general and exploded views of the engine and also defines the nomenclature for the main components of the engine, which include a rotating rotor, attached to an output shaft, and two (or more) sets of vanes, including a c-vane or compressor vane, which glides in a close proximity to a c-cam formed by an insert, without touching it. The position of the c-vane is controlled by the pin, guided by the first groove cam in housing base (FIG. 20C). A small gap between the vane and the c-cam surface of a movable insert, which exists to accommodate manufacturing tolerances and thermal expansion, is closed by a set of apex and face seals located on the c-vane and piston-like seals located on the rotor.

An e-vane or expander vane glides in a close proximity to an e-cam formed by a housing base, without touching it. The position of the e-vane is controlled by the pin, guided by the second groove cam in housing base (FIG. 20C). A small gap between the e-vane and the e-cam surface of a housing base, which exists to accommodate manufacturing tolerances and thermal expansion, is closed by a set of apex and face seals located on the e-vane and piston-like seals located on the rotor.

The housing base (with an exhaust port), the housing cover and a movable insert (with an intake port), may be referred to herein with regards to some embodiments as the "housing." The housing (base and cover) in addition to defining (enclosing) the cavities, has a curved wall, forming an e-cam, which guides the apex seal of e-vanes. The flat surface on either the housing base or the housing cover, or both, has two grooved cams, which control general position of the vanes.

The movable insert, in addition to defining (enclosing) the cavities, has a curved wall, forming a c-cam, which guides the apex seals of c-vanes. The insert is rotatably mounted within the housing base. It could be rotated ±30 degrees, (or more, if necessary) while stationary or dynamically, to change the angle and, therefore, the phasing between two cams. This angle will control the length of time the constant volume combustion chamber is formed. The phaser for changing the angle dynamically, (i.e. while the engine is running), is not shown.

Working cavities (chambers) are formed by the housing, rotor, vanes and sealing components of the engine. These are demonstrated in FIGS. 18A-18B.

The chambers are formed by the variable volume cavities existing between the housing, rotor, vanes, and sealing components. These chambers, as we will call them from now on, are undergoing transformation, wherein the volumes are swept from a minimum volume, $V_2$, to a maximum volume, $V_4$. The combustion chamber has a constant volume $V_2$. The expansion chamber, increases its volume from $V_2$ to $V_4$. The exhaust chamber decreases its volume from $V_4$ to 0. The intake chamber increases its volume from 0 to $V_1$.

The engine works by executing one of the cycles defined above. In a course of its operation, many strokes happen simultaneously. As shown in FIGS. 19A-19D, the engine begins at the intake portion of the cycle. During intake a fresh volume of working medium is admitted through the intake port located either on the side of the insert or within the center of it (the latter arrangement is shown in FIG. 19A-19D), during a substantial part of the shaft rotation, such rotation being approximately 45 degrees for the 2-set configuration shown in FIGS. 17A-19D.

As the rotor rotates (clockwise), it pushes and pivots the c-vane with corresponding seals along the c-cam surface of the insert. The WM is compressed into a CbC. The "exit port" of the CbC is closed by the housing.

Figure 19B:
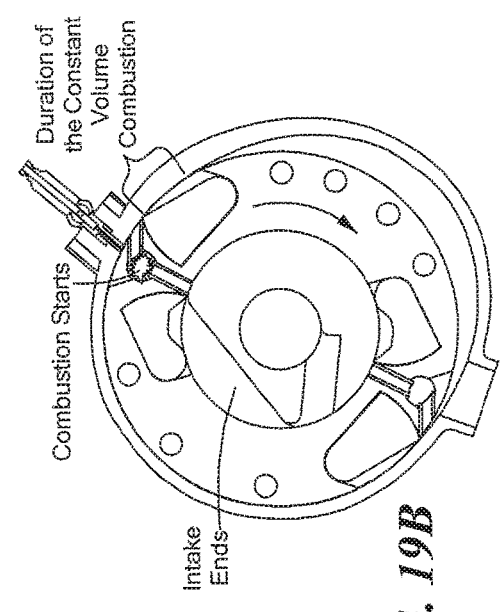
FIGS. 19A-19D show the engine embodiment of FIG. 17 during different portions of the high efficiency hybrid cycle.
Figure 19D:
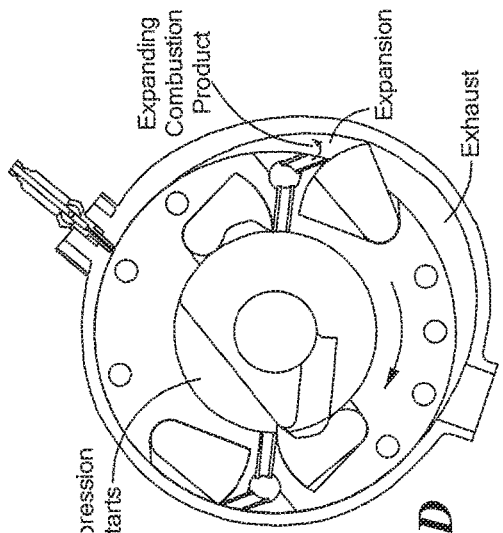
Figure 19A:
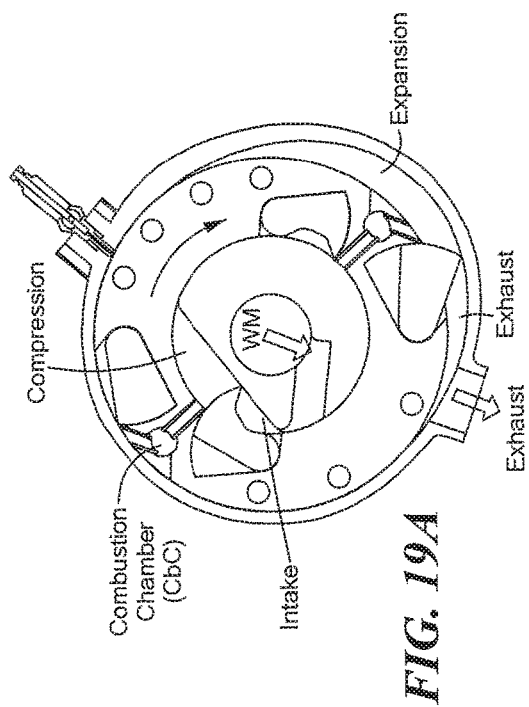

Compression is shown in FIGS. 19A and 19D. Intake is shown in FIGS. 19A, 19B, and 19D. The end of the compression stroke and the beginning of combustion stroke is shown in FIG. 19B. The combustion process proceeds to its completion, while the volume of CbC remains constant. The duration of time during which it remains constant is controlled by the phasing between the c- and e-cams, and, therefore by position of the movable insert.

Figure 19C:
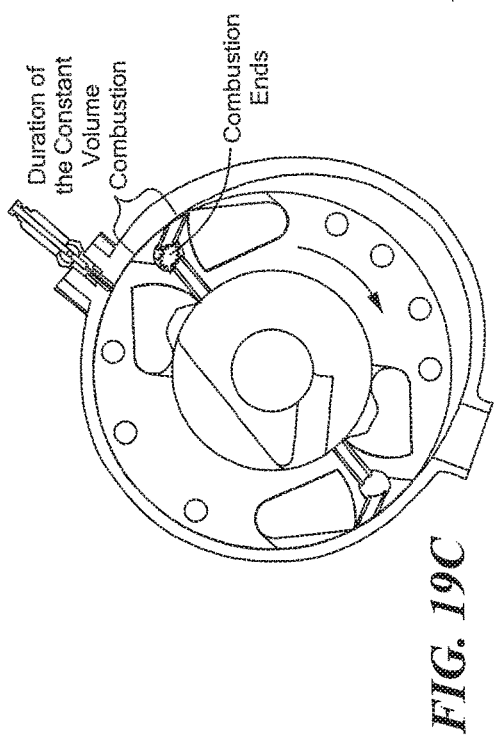
Figure 21:
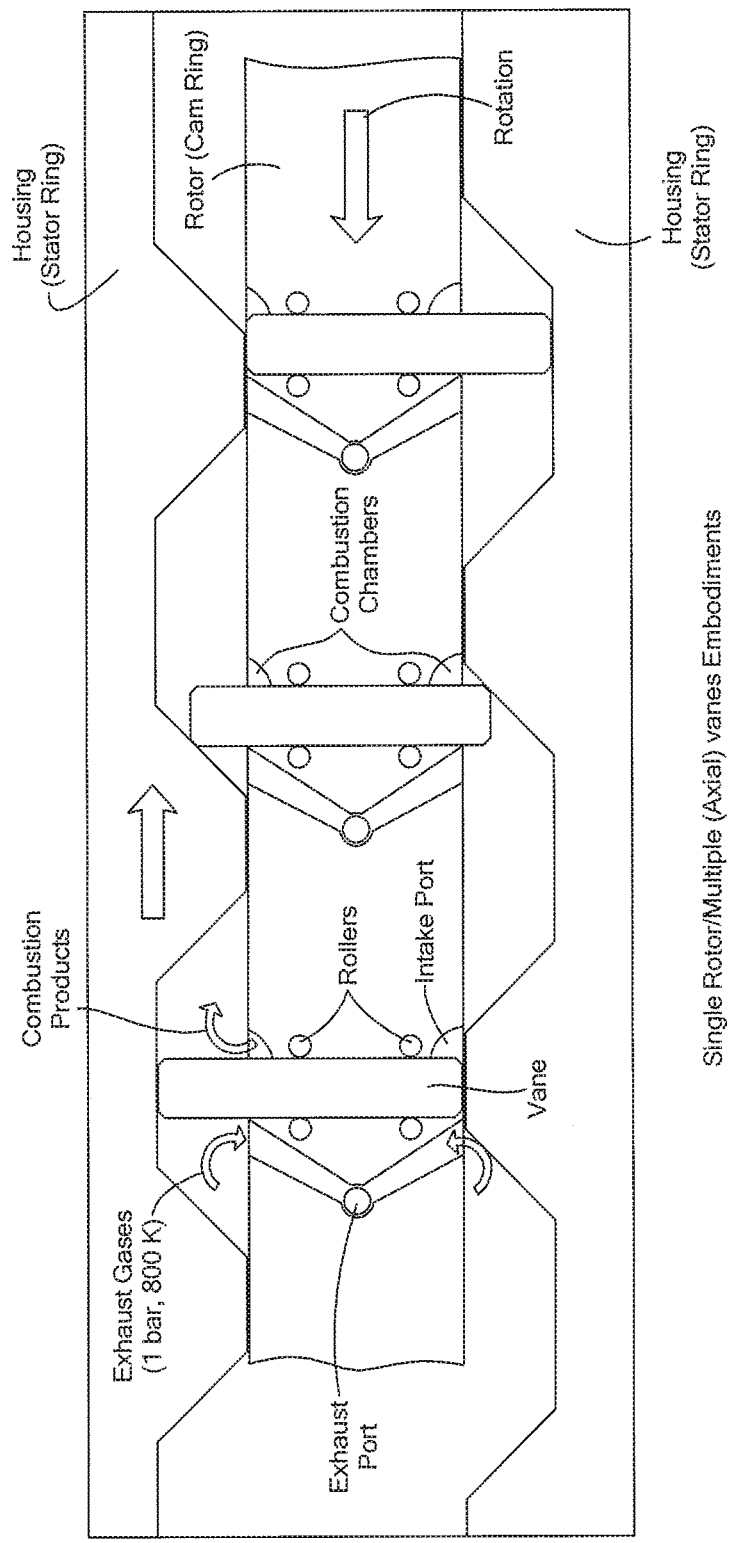
FIG. 21 shows an engine having a single rotor and multiple vanes.

The end of combustion and the beginning of expansion is shown in FIG. 19C. Burnt WM exits the CbC and pushes the e-vane with a very large pressure but over the small area exposed to this burnt WM. As rotation continues, area is increased, while pressure is decreased, causing relatively constant torque over the substantial part of the expansion stroke.

The leading edge of the e-vane, meanwhile, pushes the exhaust from previous cycle out of the exhaust port. Both expansion and exhaust are shown in FIG. 19A and FIG. 19D.

Besides trivial modifications, for those proficient in the art, which involve changes in rotor or vane geometry, pivoting points, housing geometry and angles (for example a conical Rotor and corresponding Housing walls and Vanes, etc.), there are numerous modifications that may enhance the design and operation of the engine, especially as far as sealability of the engine is concerned. Some of these modifications include an embodiment shown in FIGS. 17A-17C and 19A-19D, where both vanes (in each set) run continuously on two different cams, including both a c-cam and an e-cam. It is possible and may be beneficial to run both vanes intermittently on the same cam, located on the housing. The CbC will be located within the rotor as with earlier embodiments, but the CvC will be defined by the profile of the cam rather than by the mutual phasing of the cam action on vanes. This is shown in FIG. 20B.

Straight vanes moving in a linear way may be used in place of pivoting vanes both in the basic design configuration (shown in FIGS. 17A-17C and 19A-19D) as well as in all variations shown in FIG. 20b). These can be supported by rollers, as required for enhancing load bearing capacity and sealability.

A phaser may be used to continuously vary the dwell (duration of constant volume CbC)

Apex seals may be of a conventional type, like those used in a Wankel engines, or of any types discussed in this application. FIGS. 17A-17C, for example, shows a circumferential seal.

Vanes may be single or multi-body design.

Half ring seals have to be energized in both circular dimension and in a flat dimension, either by its own geometry or by separate springs.

A sealing grid is formed by a plurality of half-ring, apex and face seals located within the vanes, the rotor and the housing.

As with most embodiments disclosed in this application, it is possible to implement the HCHC by injecting a lean fuel/air mixture during the intake stroke or shortly thereafter. The WM should reach its "critical conditions", described in the homogeneous charge hybrid cycle (HCHC) any time during the constant CbC volume phase. To assist in reaching this condition, one can coat the section of the housing walls (e-cam) with a suitable catalyst, which will initiate the combustion within some small delay (a fraction of a m-sec.) after the WM is exposed to such a catalyst as shown in FIG. 20c.

Another embodiment of the present invention includes a single piston design with 2 cylinders. This embodiment, sometimes referred to as a double-acting piston engine, may be modified to work on high efficiency hybrid cycle and may be operated in digital mode as shown in FIGS. 22A-22C.

Figure 22A:
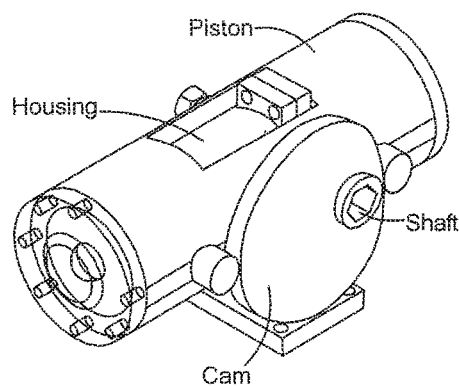
FIGS. 22A-22C illustrate a bilateral piston engine in accordance with an embodiment of the present invention.
Figure 22C:
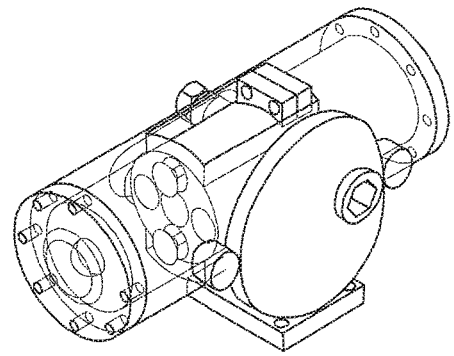
Figure 22B:
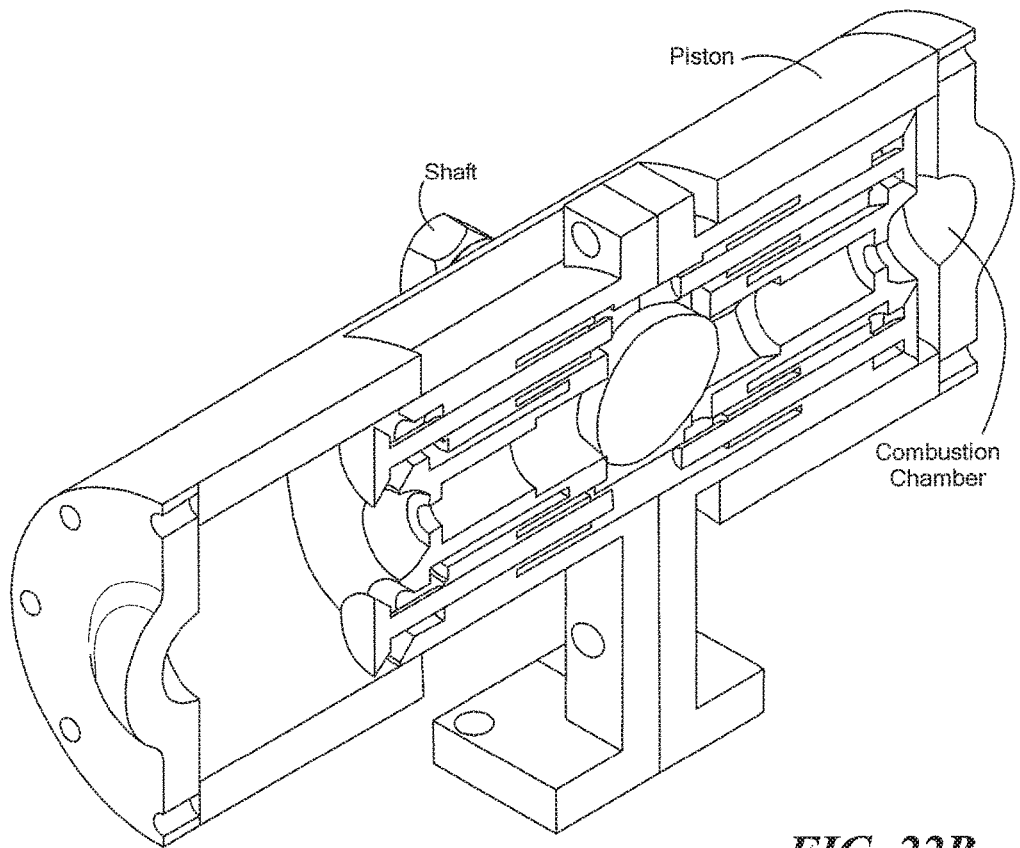
Figure 23:
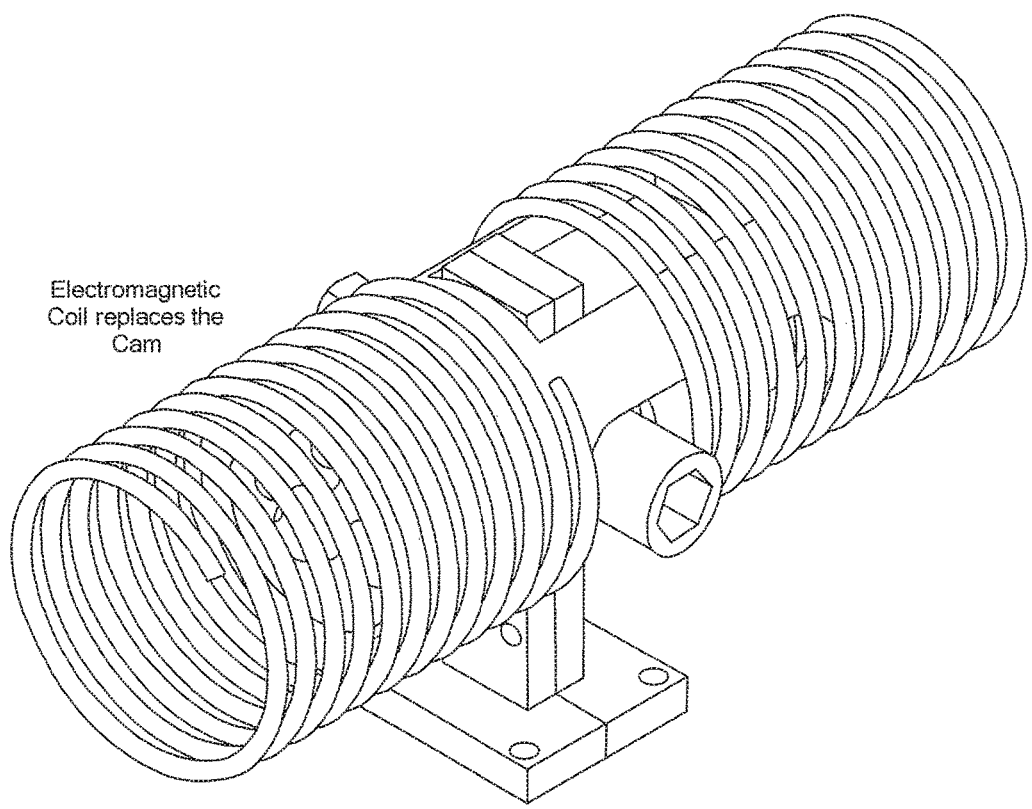
FIG. 23 illustrates a bilateral piston engine in accordance with another embodiment of the present invention.
Figure 24A:
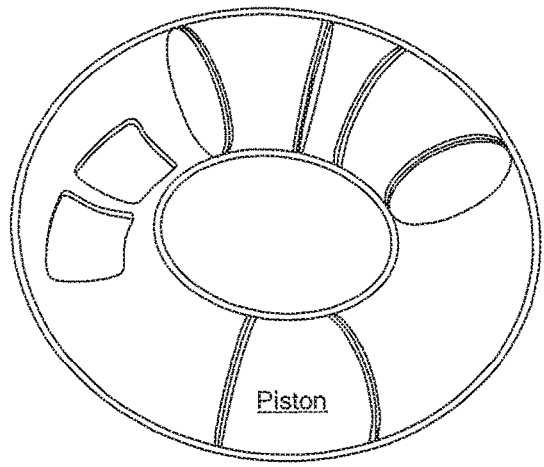
FIGS. 24A-24B illustrate a multiple piston engine in accordance with another embodiment of the present invention.
Figure 24B:
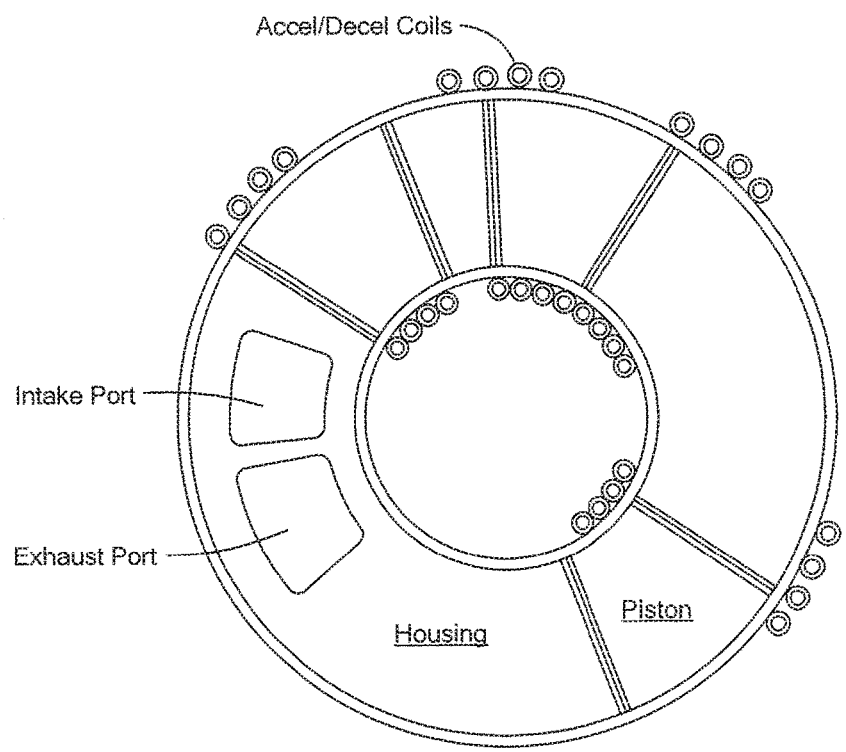

FIGS. 22A-22C show the 3D view of double-acting piston engine of specifically compact configuration. The cam, which drives the cylinder (an alternative configuration where piston is cam driven is also possible), may be of any suitable type: face, groove, barrel, plate, etc. It is preferable that such a cam has a dwell, which imparts no motion to the cylinder during the combustion process, and would provide a smaller intake volume than expansion volume. This type of motion together with appropriate timing of valves implements the HEHC for piston-like engines. It is also possible that the profile of the cam provides a very rapid expansion of combusted gases in the temperature range where NOx is formed, typically from 1350 to 1100 deg C. This limits the time the N2 and O2 have to recombine to form NOx, thus potentially, lowering the NOx emissions. The cam, may also serve as a flywheel.

FIGS. 22A-22C displays the spherical combustion chamber, which lowers the heat losses during the combustion process and retains a constant volume due to momentarily stops imparted by the cam motion.

The valves, fuel pump (not shown) and oil pump (not shown) are all driven by the internal cams, one of which is shown in FIGS. 22A-22C, and/or gears. The intake and exhaust manifolds (not shown) are located within the central post.

A gang of two engines, not shown, may simply be connected by a hex drive. More than two engines may be connected to obtain the required power. The benefits of the multiple-engines configuration are that phases may be shifted in increments of 60 degrees to supply more uniform motion to the load as well as finer control at the part load operations.

If the cylinder is made out of a soft iron or, a high-temperature super magnetic materials and is surrounded by electromagnetic coil, then power generated by the engine can be converted directly into electricity. In addition, if electromagnetic force is used to compress the air as well, one can implement this engine without the drive cam. All of the valves and pumps may also be electromagnetically driven or cam driven. To supply the mechanical energy for compression, the electric energy can be stored in suitable batteries and/or supercapacitors. An efficient controller would be required as a substitute for a cammed-controlled motion. Finally, if cylinders and pistons are arranged as segments of the torus, (FIGS. 25A-25C), and pistons are made of the soft magnetic material or, or better yet, high-temperature super magnetic materials, then there will be no need for the valves, which are replaced by appropriate ports. The cylinder walls may also be made of compounds, (i.e. partially made of strong metal) where compression and, especially, combustion and expansion take place, and partially made of non-magnetic material, where piston acceleration/deceleration takes place. Energy is expanded for acceleration of pistons and extracted for deceleration of pistons, which results in a conversion of chemical energy of fuel into electrical energy generation. It is clear that similar results could be obtained with cylindrical configurations, rather than toroidal. This has the potential to simplify the mechanical components of the engine.

There may also be multiple configurations of rotary type of engines, HEHC combined with digital operation modes. Some of these configurations are shown in the following figures.

Various configurations described herein, especially rotary-types, require sufficient sealing to enable efficient operation of the engine. These sealing solutions are described below.

Figure 40A:
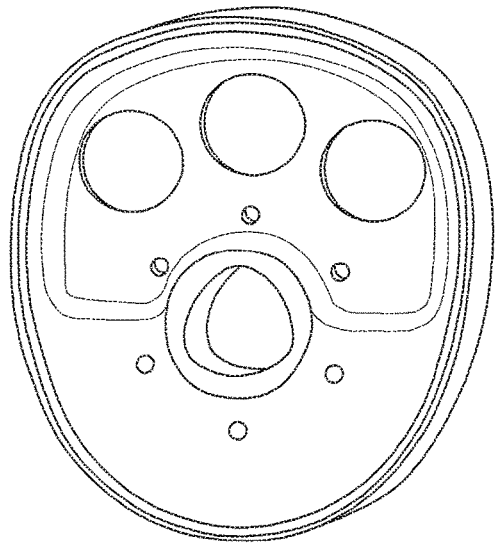
Figure 40B:
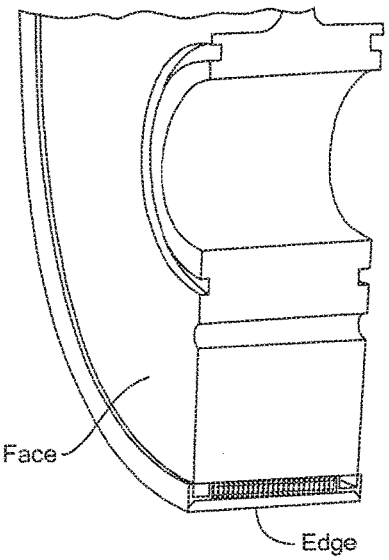
Figure 40C:
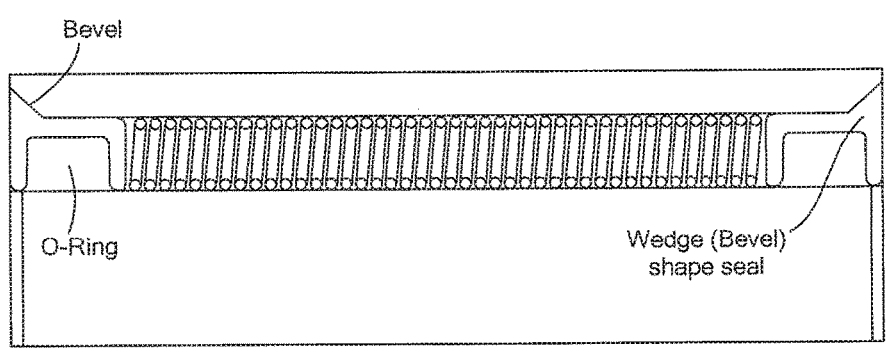
Figure 40D:
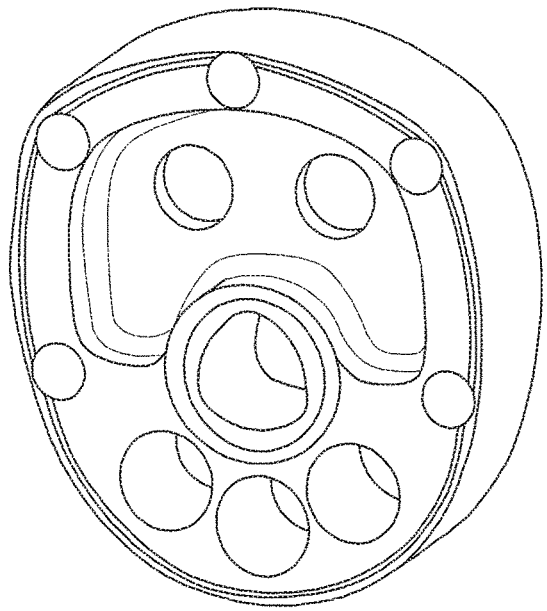
Figure 40E:
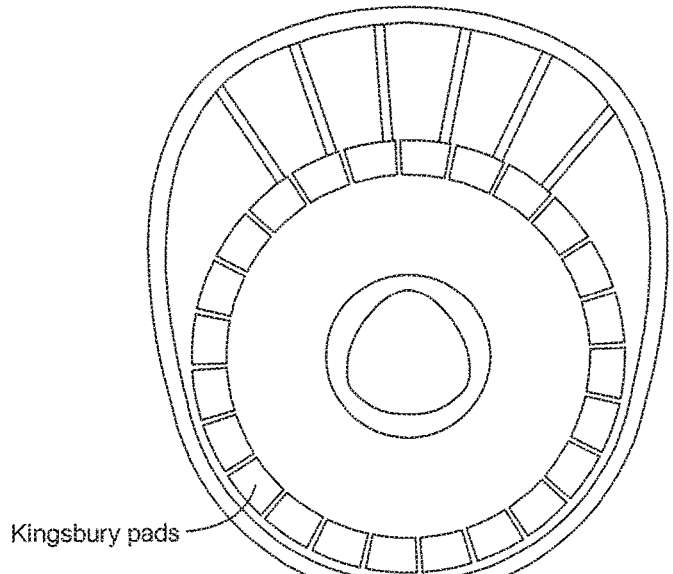

A wedge seal is show in FIG. 40b. A flat metal or composite material with a angled profile on one or both sides such that any tangential motion due to the rotation of the rotor is translated into axial force to increase the sealing pressure.

An integrated rotor is shown in FIGS. 43A-43E. In this sealing system the rotor face seals are eliminated by incorporating the rotor with the cover and allowing the cover to spin with the rotor. The sealing location now moves from the face of the rotor to the radial surface of the cover.

Another embodiment of the invention includes the use of liquid metal seals. This concept uses low melting temperature metal captured in a grove on the face of the rotor. When the rotor spins, friction and gas temperature melt the metal which then acts as a liquid seal.

Oil barrier seals may also be used with embodiments of the invention. Oil is supplied to the face of the rotor in such a way that it collects in a grove along the face and act as a barrier preventing the working gas from escaping. A similar concept is the use of oil saturated "cloth", but the cloth aids in containing the sealing oil and reducing oil leakage.

A split rotor seal is another embodiment of the present invention. The seal includes 2 parts with a Wankel-style seal between the parts or a 0.01"×0.01" rectangular wire as a seal. Each half of the rotor seal is energized by a spring and allowed to float inside to housing to minimize the working gap.

A split rotor may be provided where there are multiple "slices,"~0.1" thick, separated by oil film. The rotor is split into multiple layers separated by a fluid film similar to a wet clutch mechanism. As the rotor spins the fluid layer increases thickness separating the rotor plates and closing the face to cover gap and forming a seal.

Nanocarpet (nano-wires, nano-brushes) may be provided that are saturated by oil. Nano sized fibers are grown on the face of the rotor and position to contain an oil layer, which acts as a barrier seal preventing the working gas from escaping.

Another embodiment of the present invention includes a single piston engine with an electromagnetic coil. The geometry of this engine is similar to the embodiment previously described as a single piston, 2-cylinder engine. In this embodiment if the cylinder is made out of soft iron or, better yet, high-temperature super magnetic materials and surrounded by electromagnetic coil, then a cam may be substituted with an electromagnetic drive.

The power generated by the engine is converted directly into electricity through the following steps: (1) electric energy, stored initially in a small battery, charges bank of supercapacitors; (2) a controller then energizes the coil and moves piston to induce and then compress the air; (3) fuel is added as usual and combustion occurs, leading to an expansion stroke;(4) the controller de-energizes coils and switches them to recharge the supercapacitors; and (5) excess electricity is used to drive the electrical load. All the valves/pumps are cam or electromagnetically driven.

The cycle is most suitable for HCHC operation, so that a dwell is not required.

Another embodiment of the present invention includes the use of multiple pistons with electromagnetic coils.

If cylinders and pistons are arranged as segments of the torus, (FIGS. 25A-25C), and pistons are made of the soft magnetic material or, better yet, high-temperature super magnetic materials, as in the embodiment above, then there will be no need in valves, which are replaced by appropriate ports. The cylinder walls may be made compound, (i.e. partially of strong metal) where compression and, especially, combustion and expansion takes place, and partially made of non-magnetic material, where piston acceleration/deceleration takes place. The energy is expanded for acceleration of pistons and extracted for deceleration allowing for the conversion of chemical energy of fuel into electrical energy generation. It is clear that similar results may be obtained with cylindrical configuration, rather than toroidal. This has a potential of mechanical simplification of components of the engine.

Operation of the engine is similar to the one described as a single piston with an electromagnetic coil embodiment.

Another embodiment of the present invention uses a rotor with multiple pistons. FIGS. 25A-25C show a variation of McEwan Ross "Rota" engine. In this configuration, fresh air charge is pushed by a small turbofan (which also serves as a flywheel and driver for pistons), it works as a turbocharger/scavenger or as air knife/scavenger. By scavenger we mean that in the same operation the exhaust products are being pushed our as the fresh charged is pulled in. This corresponds to 2-stroke version of HEHC. The fresh air charge is then compressed by the pistons, which execute a complex rotational/oscillation motion driven by the cam followers riding within the slots located on the inside surface of turbofan/flywheel/driver. A straight version of slots is shown for simplicity. However if curved slots are used, the compression cycle is concluded with a short pause, during which two adjoining pistons practically do not move with respect to each other. During this pause, the space between these adjoining pistons remains constant. This corresponds to constant volume combustion (CvC). The fuel should be injected at some prior instance so it has time to mix with the air. This is accomplished by means of high pressure fuel injector ported to the Frame and corresponding ECU (Electronic Control Unit) and data from the position and various other encoders. This fuel injection mechanism is standard on modern diesels and applicable to all configurations discussed in this applications and will not be repeated for the sake of brevity.

A 4-stroke version of this configuration may be provided, where intake and exhaust ports are separated, but requires a more complicated driving means, which could include cam or double eccentric (not shown). In addition, as shown in FIGS. 25A-25C, the driver with the slots may be made stationary or oscillatory, while pistons may be driven by the eccentric dual-eccentric drive with corresponding camming or non-cylindrical gears to provide for a CvC chamber. In this case a stationary constant volume combustion chamber is created and conventional poppet valves may be used.

A rotor driver, which also serves as an air-knife scavenger and a flywheel is also provided, which has slots that engage rollers on pistons. The rotor is driven eccentrically with respect to motion of the pistons.

Another embodiment of the present invention has dual pistons and a dual eccentric drive. In this embodiment two pistons are operated on both ends, hence the name dual pistons. The firs piston is a square piston with a round hole in the middle to accept an eccentric drive. The second piston has rectangular recess in which first piston slides. The engine is driven by dual eccentric drive, which may be implemented in one of two ways. The square piston (not shown) may driven by a dual eccentric drive, such as those shown for different embodiments in FIGS. 26A-26B. The second piston with a rectangular recess is not driven but can slide in a perpendicular to the square piston direction. The dual eccentric drive is mechanically equivalent to a 2-link system and as such could be driven to create a short dwell during which a constant volume CbC is formed. Ports are located in the stationary housing to allow induction and exhaust.

Figure 27B:
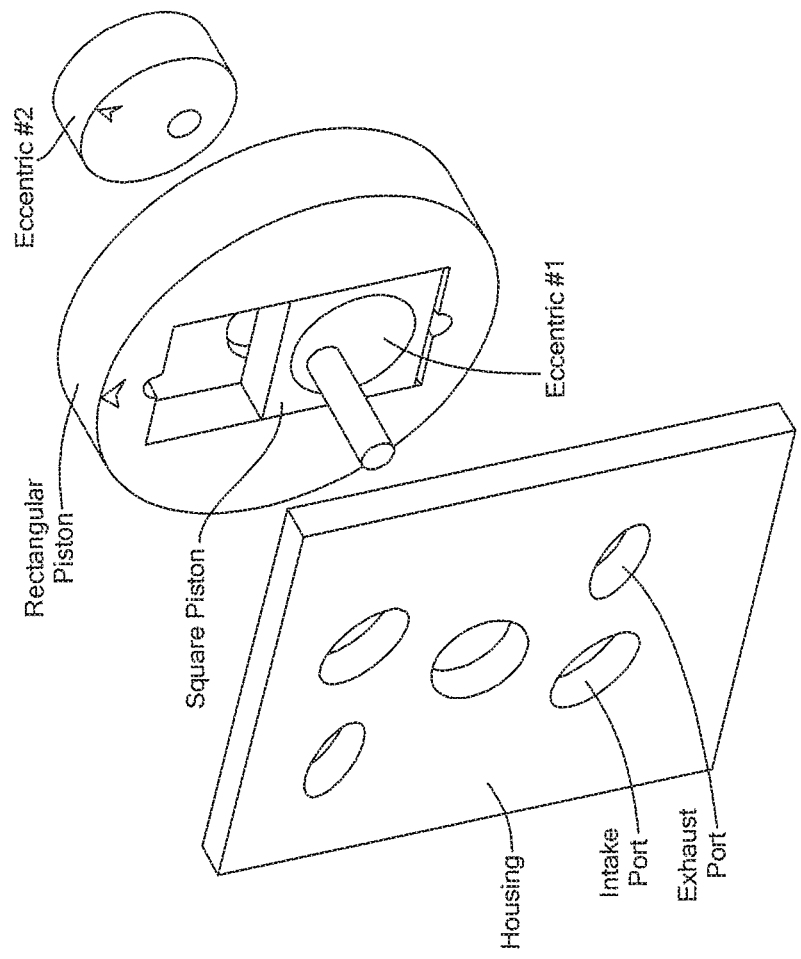
FIGS. 27A-27B illustrate a dual piston eccentric drive engine in accordance with an embodiment of the present invention.
Figure 27A:
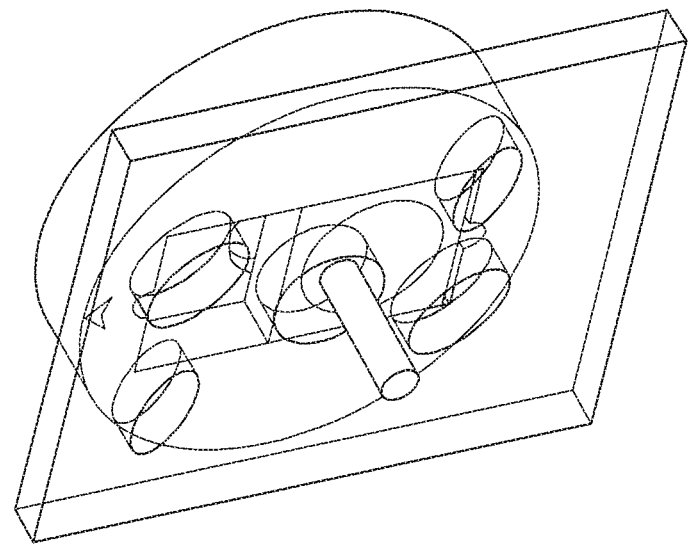
Figure 28:
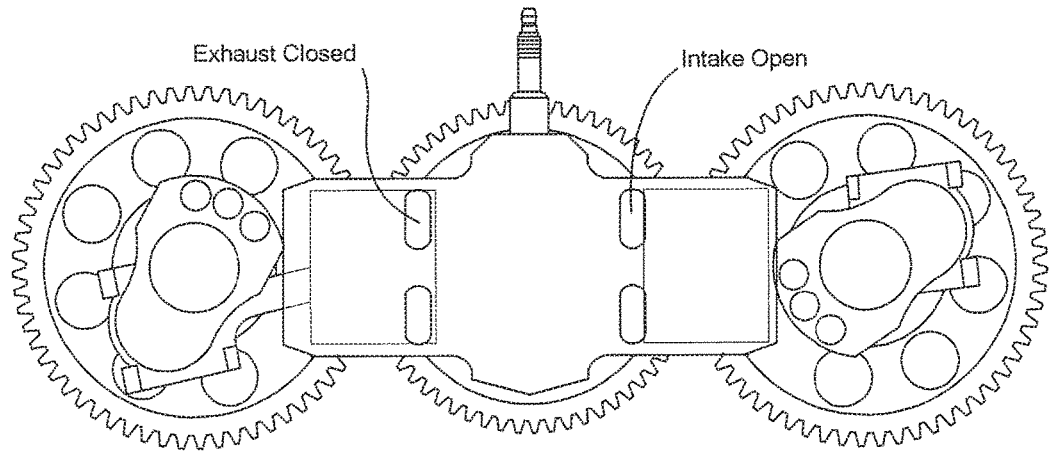
FIGS. 28-32 illustrate an opposed piston engine in accordance with an embodiment of the present invention.
Figure 29:
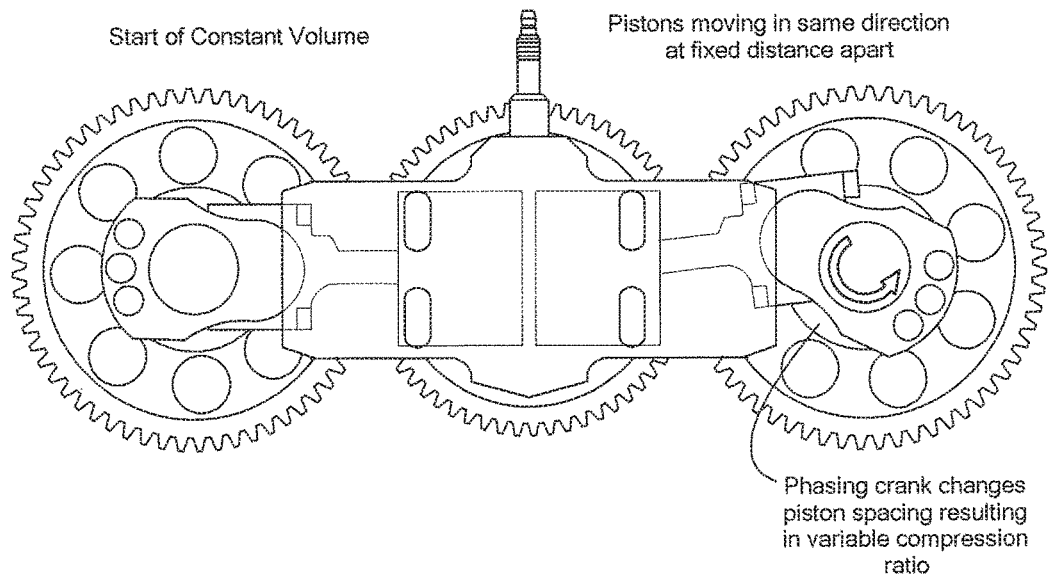
Figure 30:
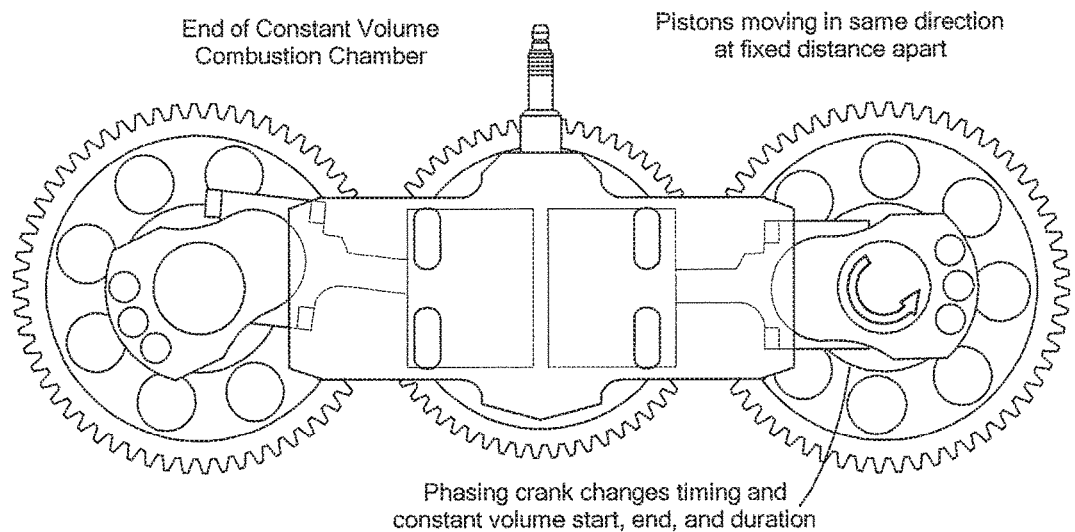
Figure 31:
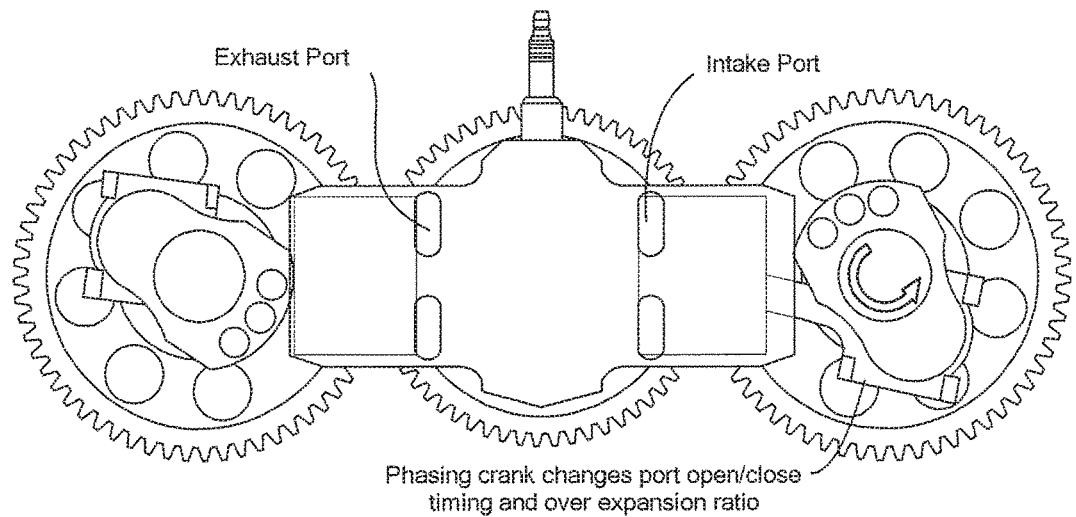
Figure 32:
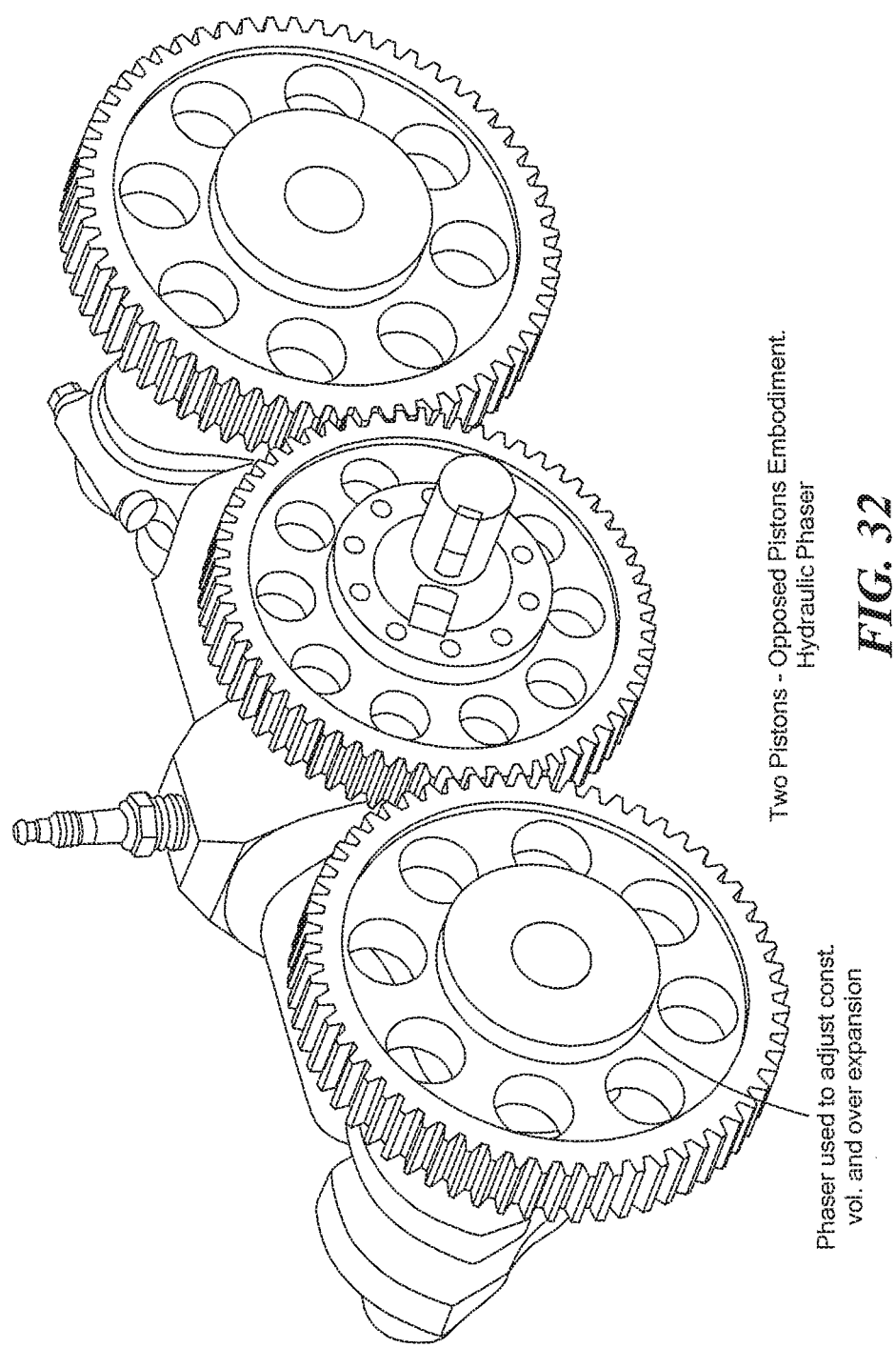
Figure 33:
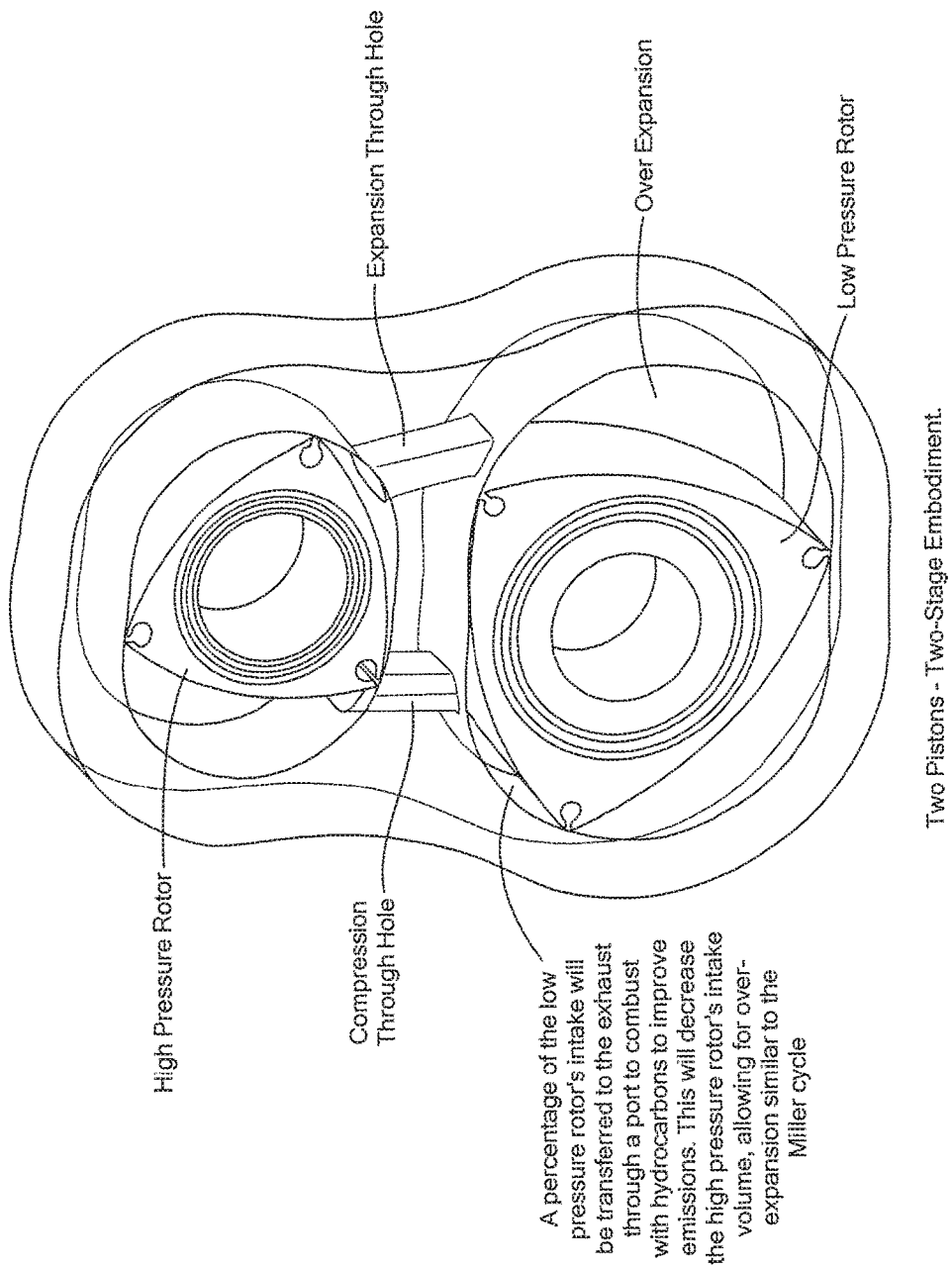
FIG. 33 illustrates a dual rotor internal combustion engine in accordance with an embodiment of the present invention.
Figure 34:
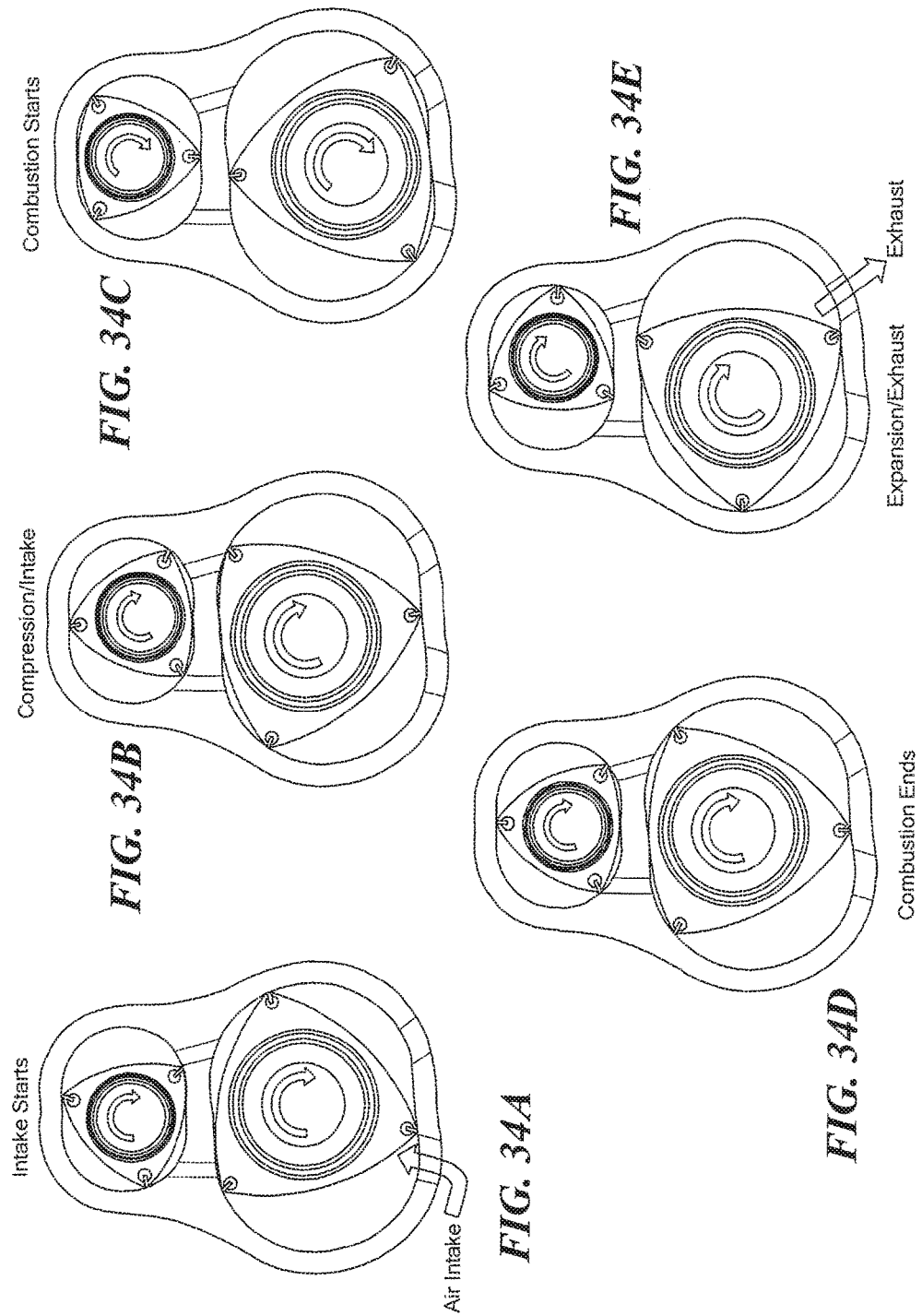
FIGS. 34A-34E illustrate the dual rotor engine of FIG. 30 throughout different portions of a cycle.

FIGS. 27A-27B illustrate another variation of the dual drive engine in which: the square piston is driven by an eccentric, while, the second piston with a rectangular recess ("Rectangular Piston") is driven by another eccentric.

In the embodiment, shown in FIGS. 27A-27B, square piston is driven by an eccentric, while "rectangular piston" is driven by another eccentric. The net effect of this arrangement is that the second "rectangular piston" rotates around the main shaft. The housing houses the intake and exhaust ports and fuel injectors (not shown). During the mutual motion of pistons, the air enters the second piston through the intake port, compressed. The fuel is injected and combusted at substantially constant volume and combustion products are expanded to a larger volume than intake and then exhausted through exhaust ports. Dual eccentrics, which, by the way may be used in many other embodiments as well, may allow a dwell, which corresponds to an isochoric heat addition process (constant volume combustion).

Another embodiment of the present invention includes a two opposed piston configuration. Internal combustion engines are used to power vehicles and other machinery. A typical reciprocating internal combustion engine includes a body, a piston, at least one port or valve, a crankshaft (which serves as a drive shaft), and a connecting rod. The body defines a cylinder. The piston is located inside the cylinder so that a surface of the piston and a wall of the cylinder define an internal volume. The port is located in the body, and allows air and fuel into and exhaust gas out of the internal volume. The valve is movable between a first position wherein the port is open, and a second position wherein the valve closes the port. A connecting rod is connected between the piston and the offset throw section of the crankshaft, such that reciprocating movement of the piston causes rotation of the offset throw section of the crankshaft about a crankshaft axis.

A reciprocating engine of the above kind typically has a cylinder head that defines the internal volume together with the surface of the piston and the wall of the cylinder. Heat is transferred to the cylinder head and conducts through the cylinder head, thereby resulting in energy losses from the internal volume and a reduction in efficiency. One way of increasing efficiency is by reducing an area of the surface of the piston and increasing a stroke (a diameter of a circle that the offset throw section follows) of the piston. Ignition delay prevents the combustion from completing before the movement of the piston lowers the pressure and temperature required for autoignition, so that the engine can only be run at lower revolutions per minute with a corresponding reduction in power. Since a conventional piston engine is symmetric (intake stroke is the same as the exhaust stroke), the expansion stroke is limited to the intake compression stroke resulting in a relatively high temperature of the gas when it is exhausted. The heat in the exhaust gas is an energy loss that results in a reduction in efficiency. Higher efficiency may be gained by expanding the exhaust gas until all of the usable temperature and pressure is extracted. Conventional engines have a fixed geometry resulting in a given compression ratio for all operating conditions. Higher efficiencies are achievable with higher compression ratios; however, different engine operating conditions require different compression ratios for highest efficiency. Due to the fixed geometry of a conventional engine only one compression ratio is achievable resulting in a compromised efficiency at other operating conditions.

The invention provides an internal combustion engine, including a body defining first and second cylinders in communication with one another (not necessarily in line), first and second pistons in the first and second cylinders respectively, surfaces of the pistons and walls of the cylinders defining an internal volume, at least one port in the body to allow air and fuel into and exhaust gas out of the internal volume, first and second drive shafts, each having a bearing section mounted for rotation on a respective drive shaft axis through the body and each having an offset throw section, the first piston and offset throw section of the first drive shaft being connected and the second piston and the offset throw section of the second drive shaft being connected, such that reciprocating movement of the first and second pistons increases and decreases a size of the internal volume between minimum and maximum sizes and causes rotation of the offset throw sections of the first and second drive shafts about the drive shaft axes, the minimum size of the internal volume being nearly constant volume and adjustable between a large size for lower compression ratios and a small size for higher compression ratios, and one port for intake and one port for exhaust mounted to the body opened and closed by the movement of the piston allowing for asymmetric expansion to compression ratios. The movement of the piston and opening and closing of the port allows and restrict flow respectively of at least the air into the internal volume for one cycle of the pistons.

The internal combustion engine can adjust the compression ratio, intake port open time and duration, exhaust port open time and duration, and expansion ratio by means of phasing one drive shaft to another though a rotary device mounted on the driveshaft. The process implemented by the above device can also be created by using two rotors mounted on two shafts instead of two pistons and two cranks. This rotary device can rotate one shaft relative to another while the engine is in operation or stationary Another embodiment of the present invention provides an internal combustion engine, including a housing defining a larger and smaller rotor in communication with one another (not necessarily end-to-end). The larger and smaller rotors in the larger and smaller end of the housing, respectively, surfaces of the rotors and walls of the housing defining an internal volume, at least one port in the housing to allow air and fuel into and exhaust gas out of the internal volume, first and second drive shafts (or, if inline, possibly one cam shaft), each having a bearing section mounted for rotation on a respective drive shaft axis through the housing. The larger rotor draws in fresh air and compresses it. A portion of the compressed air is pushed through a port or valve and injected into the exhaust gas side of the rotor. This air injection creates a reaction in the exhaust to help reduce hydrocarbon emissions while also reducing the intake air volume. The remaining compressed air is then transferred to the smaller rotor through a valve or port where the air is compressed more. This allows the second rotor to multiply the compression ratio (the amount of multiplication is dependent on the volume ratio between the two rotors; for example if the larger rotor is twice as large as the smaller rotor, it will double the compression ratio. If the larger rotor is three times the volume of the smaller rotor, it will triple the compression ratio, etc.) Combustion occurs at top dead center on the smaller rotor where volume is nearly constant for three rotor angle degrees (nine crank angle degrees). After combustion, the exhaust in the smaller rotor's housing exerts a force on the rotor thus rotating the shaft. The expansion stroke on the small rotor equals the compression stroke on the small rotor. This pressurized exhaust gas is then transferred back to the larger rotor through a valve or port where the air is expanded more. This allows the second rotor to multiply the expansion ratio as stated above for the compression strokes. At this point compressed fresh air is injected through a port or valve into the exhaust gas causing a secondary reaction reducing the unburned hydrocarbons. This second expansion is greater than the first stage compression due to the reduction in compressed air on the compression side. Then, it is able to escape the housing via a port in the larger rotor's housing.

Besides trivial modifications, for those proficient in the art, which involve changes in ports and piston sizes, shape and location the non-trivial change is to locate two piston in co-axial or nearly coaxial configurations (double deck as opposed to a single deck).

Figure 35:
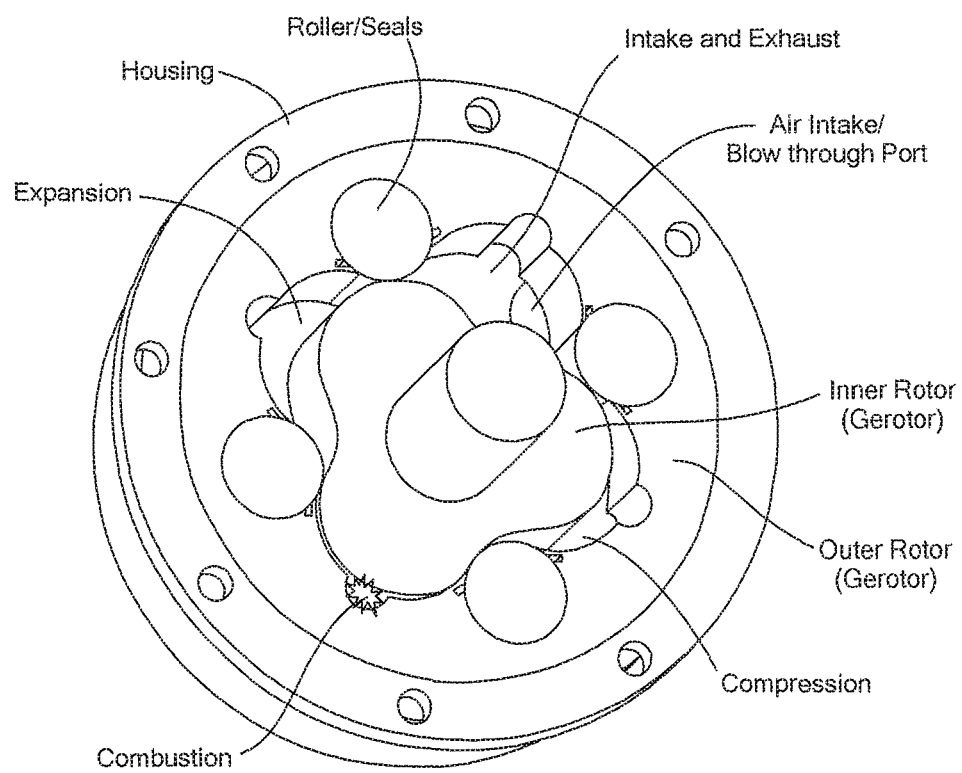
FIG. 35 illustrates another dual rotor engine in accordance with an embodiment of the present invention.

Another embodiment of the present invention includes a two rotor embodiment that is based on a gerotor design as shown in FIG. 35, in which both inner and outer gerotors may rotate with constant speed around fixed axes within the Housing. The inner gerotor uses one less tooth than outer one. The housing has an in-line intake and exhaust ports and uses turbofan (not shown) to enable an air knife scavenging. This enables HEHC-S (scavenged) operating cycle.

A low count gerotors is preferred, such as 3-4, as shown in the FIG. 35, as the almost constant volume is created when the inner gerotor lobe engages the corresponding lobe of the outer gerotor. A 2-3 lobe rotor may be used as well, but it creates a very long dwell (a constant volume duration). Higher order gerotors may be used as well, especially for HCHC operation when duration of the CV CbC is not important.

The inner rotor rotates and drives the outer rotor. A spring-loaded or oil supported rollers aid in sealing and reduce friction. The port has to be shaped and located in such a way that intake volume is less than expansion volume. No CvC exists if the rotors are driven with a constant speed, but quasi-constant volume is possible due to relatively slow rate of volume expansion that exists right after the combustion. Alternatively, using a drive with a short dwell makes it is possible to implement a true HEHC. Again, the frame may be driven by cam/gears to implement the true CvC as well. An inner Roller may be eccentric-driven. A digital mode can be used as in all above configurations as well.

During operation of this embodiment, the variable volume cavities, or chambers, are created by inner and outer gerotors and housing covers. Each chamber rotates and in a course of its motion changes the volume from minimal, $V_2$, corresponding to CbC volume, to a maximum, $V_4$, corresponding to an Exhaust volume. Fuel is injected through stationary FI (not shown) located within covers. The operation is typically according to a HEHC-S cycle where air is scavenged (exhausted and induced), air is compressed, fuel is injected and combusted, and the combustion products are expanded. While a ¾ configuration is shown ⅔, ⅘, etc. configurations are equally possible. This engine may also be operated in a digital mode.

Figures 36A, 36B, 36C:
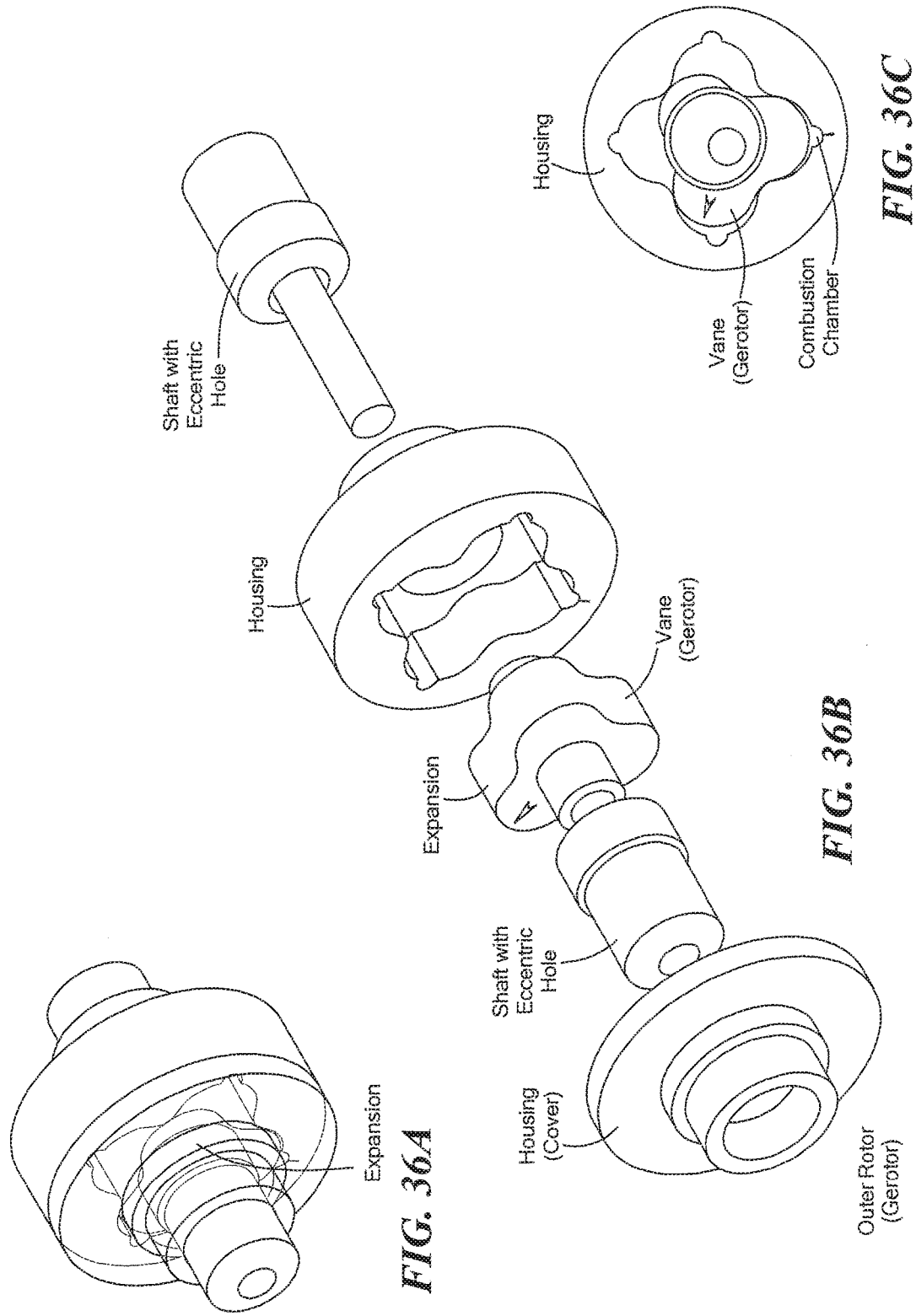
FIGS. 36A-36C illustrate an eccentric single vane engine in accordance with an embodiment of the present invention.

Another embodiment of the present invention includes a single vane configuration. This embodiment is based on a gerotor design shown in FIGS. 36A-36C, which employs a housing (the outer gerotor) and a single vane (an inner gerotor), which rotate around its axis while the axis simultaneously rotates (on the eccentric) with respect to the housing. The inner gerotor uses one less tooth than outer one. As in previous embodiment, a low count gerotors is the preferred embodiment, such as 3-4 configuration, shown in the FIGS. 36A-36C, as the almost constant volume is created when the inner gerotor lobe engages the corresponding lobe of the outer gerotor. However, 2-3 lobe configurations may be used as well, but it creates a very long dwell (a constant volume duration). Higher order gerotors may also be used, especially for HCHC operation when duration of the CV CbC is not important.

The housing of this embodiment together with the vane, forms 4 (in this instance) variable volume cavities, or chambers, which are analogous to a 4-cylinder piston engine. Vanes engaging each chamber, in turn, simulate a 4-stroke operation. The working medium will be induced, compressed, combusted, expanded, and exhausted.

The housing will house a constant volume CbC, which may be located in housing proper, or in the cover. A conventional poppet valves or spherical valves or disk valve may be used to control timing of intake and exhaust stroke. The valves are not shown in this figure. If CbC is located within housing as shown, the cylindrical valves may be employed. These valves would be concentric with the housing and would rotate exposing the opening from the CbC to Intake or Exhaust ports. Having intake valves open while chamber volume is being decreased allows a smaller intake volume than exhaust volume, thus achieving the Atkinson part of the cycle. This embodiment may also be operated in a digital mode of operation and may be used with a fuel injection system.

Conventional low-pressure and/or high-pressure fuel injectors may be used. However, these injectors and pumps typically are large (not usable for small engines) and very expensive.

Figure 37A:
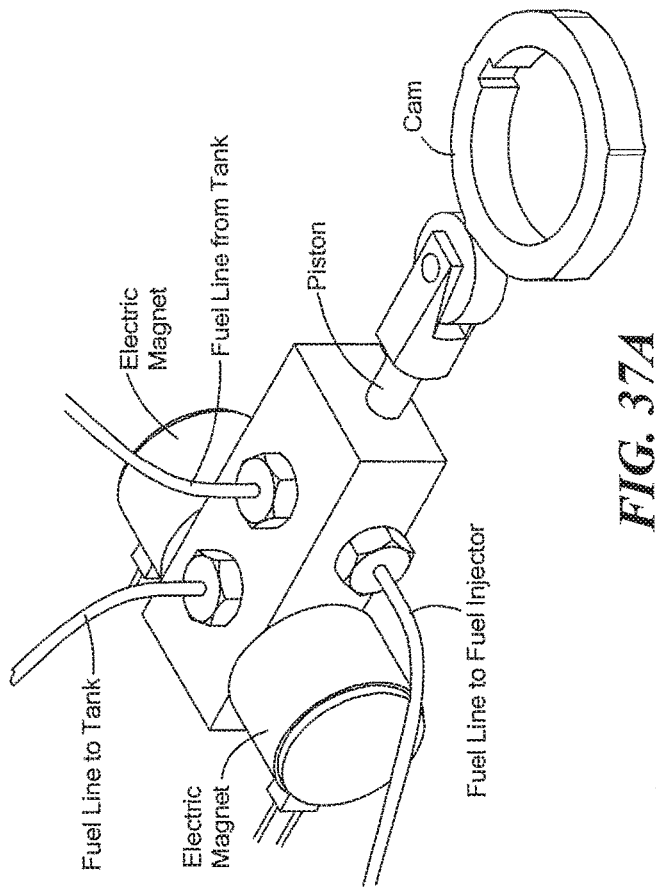
Figure 37B:
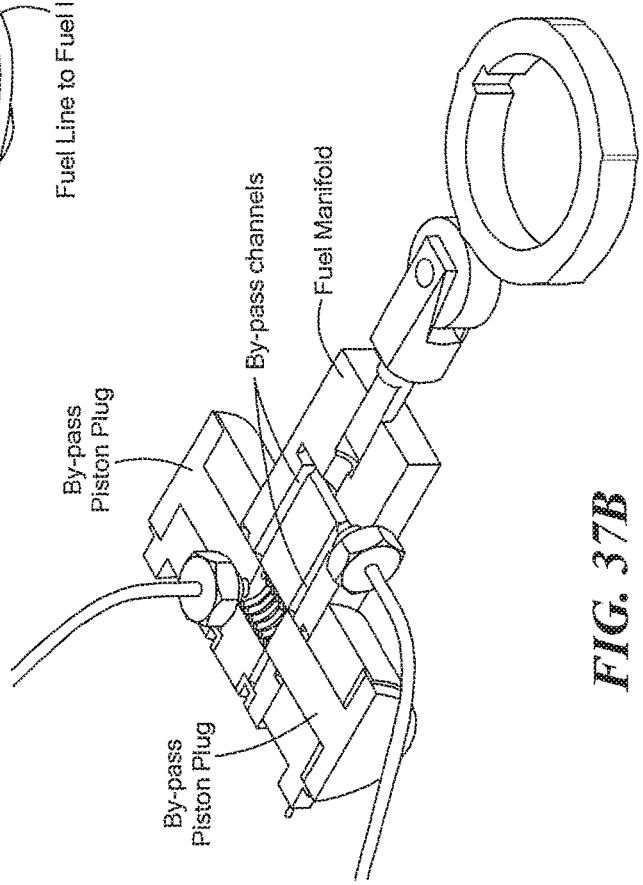

An alternative approach is to use very compact and economical system, shown in FIGS. 37A-37B. It consists of the following parts: (a) a cam, which provides a constant rate of rise to a piston pump, (b) a fuel manifold connecting fuel pump cylinder with an injector or one or more by-pass lines leading back to fuel tank, (c) one or more magnets that actuate by-pass piston plugs (d), fuel lines leading to fuel injector and to or from a fuel tank, and (e) one or more check valves (not shown) to prevent backflow of fluid into the tank and from the fuel injector.

The piston supplies high pressure fluid (fuel) to fuel injector, which will "fire" as long as high pressure is applied to its needle valve (not shown). To generate high pressure both by-pass piston plugs should be blocking the by-pass channels. If one or both plugs are in "open" position—the fluid pressure is not sufficient to open (or "fire") FI. The fluid is then returned to fuel tank (not shown) via return line. The by-pass lines are very small diameters holes in the manifold. Very little motion is required for the plugs to block the by-pass line-therefore simple magnets may be used to provide very fast motion.

The operation of the system is very simple as well. During the initial moment of time, one plug is open and the second plug is closed; therefore, the pump does not deliver the fuel in spite of the fact that piston is moving as driven by the cam. A signal from controller is sent to the currently open plug to be closed. After very short delay the plug executes this motion, pressure starts building up and FI "fires". Simultaneously, or with some delay, the second signal opens up the second plug, thus, reliving pressure in the fuel pump cylinder and stopping the injector. Therefore, the FI will be fired only during the delay between two signals, which may be very short. This will ensure that fuel may be delivered in required quantities.

For 5-vane engines, the cam has 5 segments, each generating its own pressure pulse. If two injectors are used-they may be driven from the same or different cams, which may supply the same or different pressures (which is actually the function of the fuel injector spring, rather than a pump).

One more alternative that is worth mentioning is using a piezo-crystal stack to inject fuel directly at the point of use. This is possible due to the fact that each injection requires relatively little amount and fuel pressure.

It may be desirable under certain circumstances to allow small amount of highly compressed air to be trapped between the rotor, compressor rotor and the housing. This will force this trapped air through very small nozzles into CbC during the fuel injection. The high speed, high pressure air streams will break the fuel streams, evaporate the droplets and aid in mixing of fuel and air. Alternatively, it is possible to implement the entire fuel injection mechanism (using the venture effect, or just a plunger driven by this "leftover" pressurized air)

As it was discusses above, having ability to trigger the engine operating under a homogenous charge compression ignition trigger (HCCI) cycle may prove to be very beneficial for a practical implementation of such engines. A multitude of triggers may be used in the environment of rotary engines that have constant volume combustion or near constant volume combustion. These triggers include a catalyst, a plunger, to implement a volume change, or a temperature increase caused by a spark from an ignited spark plug.

Having a constant volume combustion chamber (CV CbC) allows a large operating time window for autoignition to occur. This is due to the fact that autoignition can occur any time after constant volume combustion is created (which is equivalent to TDC point of conventional engines). Even if autoignition occurs before TDC, due to geometrical constrains, the face of the rotor exposed to combustion pressures is very small, which consequently minimizes the effect of premature combustion. Additionally, the geometry of the engine offers a unique opportunity to "trigger" the autoignition reaction by means other than spark ignition or fuel injection. In the proposed engines the issue with the control window may be resolved on two levels. The timing of ignition event, while important is not critical; therefore, if auto-ignition occurs slightly before the end of compression stroke (a point that could be compared with TDC), the differential force on the moving element (Rotor) of the engine will be very small, as will be explained later. Any occurrence of auto-ignition after the "TDC" is ok as well since it will occur within the CV CbC, i.e. at the time when forces acting upon the moving element (Rotor) will act in radial direction only and will be fully absorbed by the bearings so that they do not impede or even affect the motion.

It is also a relatively easy to introduce a "trigger" into the system, due to existence of CV CbC, by exposing the CbC to catalytic substance, as it will be explained below. The combustion will occur due to stimulated ignition which may be accomplished by various means described in patent application PCT/US07/74980, incorporated herein by reference. However, the simplest way to stimulate ignition is to deposit a catalyst, such as nickel, onto one of the surfaces that makes the CV CbC in such a way that when chamber containing the compressed air/fuel mixture in slightly "subcritical" condition enters the segment containing the catalyst a reaction will be triggered by such a catalyst. This catalytic segment may be extended into expansion zone if burning is expected to continue into this zone (though this is undesirable from efficiency standpoint)

Embodiments of the present invention are also provided in sealing systems that may be used with engine embodiments of the present invention.

The function of a sealing system is to close the gap between any two movably mounted mating parts; the gap is due to manufacturing precision as well as due to differential thermal expansion between two mating parts. A sealing arrangement may be disposed on one a movable a stationary component or on two movable sealing members in such a way that seals a gap which exists between them.

A face seal seals a the gap that exists between any two flat mating surfaces.

An apex seal seals the gap that exists between two mating surfaces, when at least one of them is cylindrical.

A sealing members may include a rotor a gate a vane or a housing.

More generally, we note that a strip seal is typically comprised of a strip of a suitable low-friction, low-wear material, which may be metal or a polymer. The strip is located within the groove of suitable shape and dimensions of one of the sealing members, while touching the surface of the other one of the sealing members, thus sealing the gap between these two members. During the operation, the strip may be energized by the fluid pressure, centrifugal force, spring or friction or all of the above.

A roller seal is typically comprised of a roller that has a diameter of at least several times larger than a gap. The roller is disposed between sealing members, closing the gap. It rests on a flat surface of one of the sealing member and on cylindrical rotating surface of another sealing member. The flat surface of the sealing member has the locating tabs that limit the position of the roller in respect to such a sealing member and allows roller only to rotate within the tabs. The roller is energized by the fluid pressure.

Many conventional ways of sealing chambers within an engine exists including, a Wankel-like apex and face seals. The variations of a later one are shown in FIGS. 40A-40E. Additional seals were described in our patent applications ## 60/535,891, 60/900,182, 60/834,919, 11/832,483 and PCT/US07/74980 and incorporated herein by reference. A number of novel configurations are described and claimed herein.

One embodiment of such a novel configuration provided in accordance with the present invention is a bevel or wedge seal. A bevel (wedge) seal is presented in FIGS. 40 *b*) and *c*). The sealing system consists of a beveled (in a cross section) seal with a matching groove in a rotor. The seal is initially energized by a spring or a system of springs and during the operation it is energized by one or more of the following mechanisms: spring(s), gas pressure as done in Wankel-style face seals, and friction.

The frictional forces drug the seal along the face of the housing in the direction opposite to the rotor's rotation. The seal, which generally conforms to the rotor's edge profile, is non-circular; therefore, it cannot rotate within the groove. Instead, it "climbs up" on the bevel surface of the groove toward the housing thus sealing the gap.

An optional elastomeric or resilient metal seal (C-, E-, U-, or any other suitable cross section) may be used to enhance the sealing performance.

Another embodiment of the present invention is providing in a floating cover sealing system. A floating cover is shown in FIGS. 41A-40B. It consists of a cover that is not rigidly constrained in axial direction. Instead, it can "float" 0.001" to 0.005" or more above the housing. The rotor's face is always in contact with this cover. The rotor may have a ridge, which actually contacts the cover, while the rest of the face is recessed few thousands of an inch below the surface of the ridge. The ridge surface could be hardened or otherwise processes to reduce the wear and friction. Furthermore, the groove in the reach could be made that will be oil-lubricated, which would further improve sealing.

To seal the floating cover includes a Wankel-style face seal (implemented as a strip of metal in a groove, energized by a spring). The diameter of this seal is ever slightly larger than the diameter of the rotor, so that when the rotor rotates, its circumference engages with the seal.

The pressure due to action of the working medium upon the floating cover will tend to move the floating cover axially away from the rotor's face. To counteract this, a fixed cover will be backs up the floating cover. To accommodate the axial movement of the floating cover and to compensate for tolerance buildup and thermal expansion, the floating cover will be supported by an oil film providing a reaction force equal and opposite to the axial force generated by pressurized gases. This film will be of variable thickness, as one per revolution of the rotor it will be "re-supplied" from the slightly pressurized (10-20 psi) constant pressure oil supply. A valve, not shown in the figure, will cut off the supply at the moment when pressure in the compression chamber starts increasing. An oil film will be contained within the ring between two sets of polymer seals located in the fixed cover.

An integrated rotor embodiment is shown in FIGS. 42A-42C and 43A-43E. In these figures a gate having a rectangular cross section is used, but the same notion applies toward any other suitable cross sections, mentioned throughout this application, such as cylindrical segment, oval, compound, etc.

The rotor in the integrated rotor embodiment consists of the rotor proper and two cylindrical end plates, rigidly attached to the rotor. End plates, as show in, FIGS. 43A and 43B contain seals, which may be piston-like seals, as shown, face seals, or both. Since end plates are integral with a rotor, there is no leak between rotor and end plates.

Figure 43A:
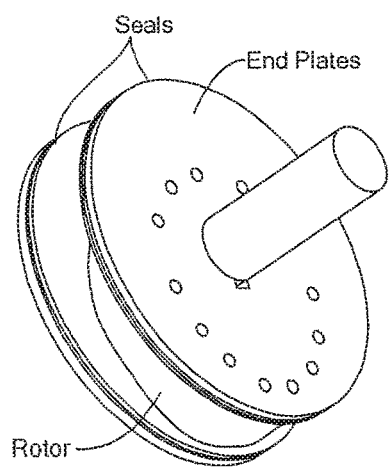
Figure 43B:
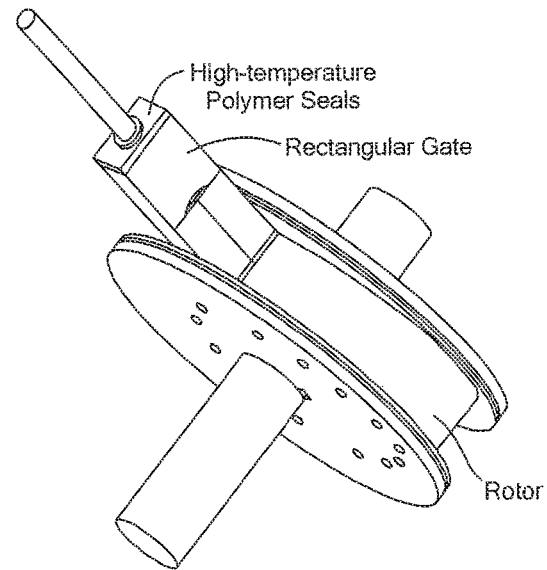
Figure 43C:
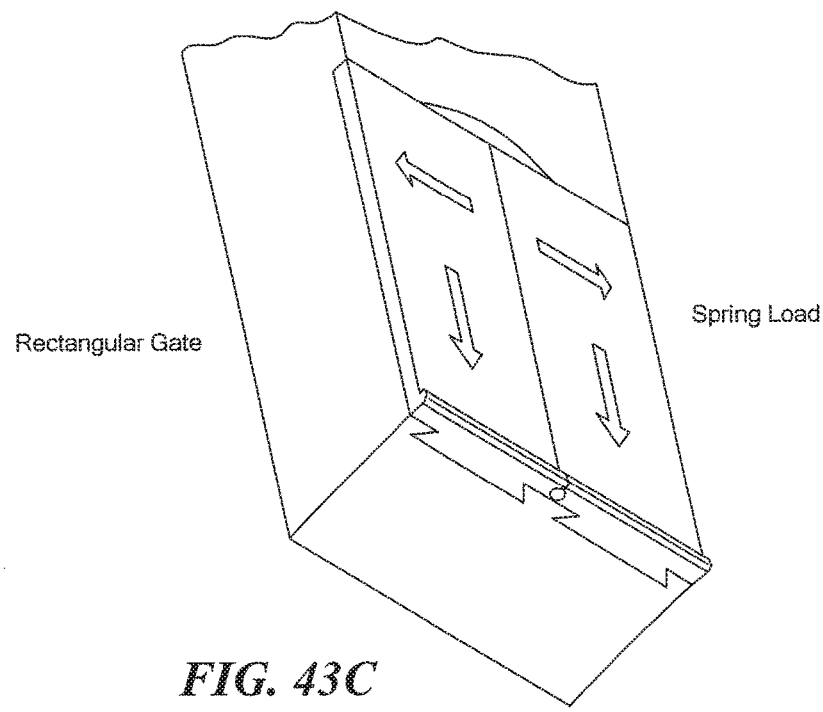
Figure 43D:
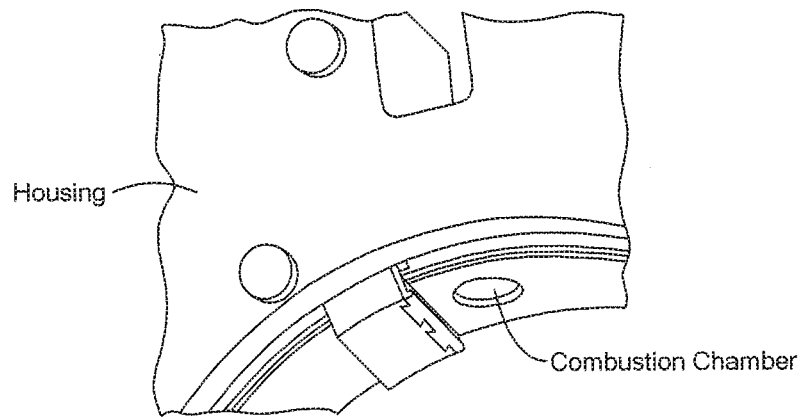
Figure 43E:
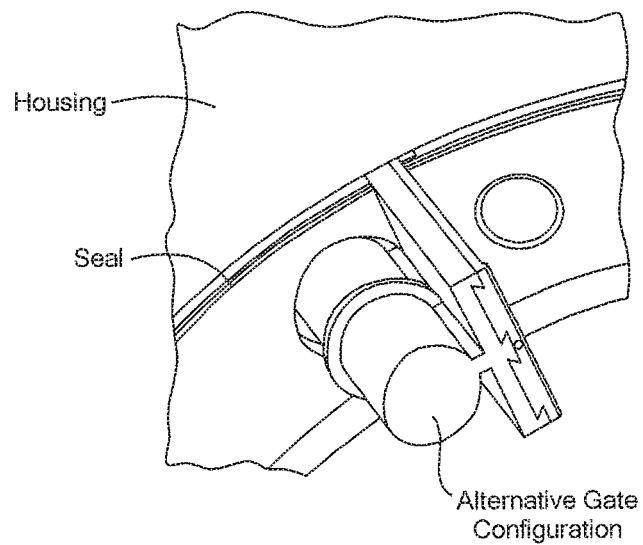

A rectangular cross-section gate is shown in FIGS. 42A-42C and FIGS. 43B, 43C, and 43D, which has face seals that are in contact with the end plates. These face seals may be of a standard Wankel type and may be integrated with the apex seals as shown in FIG. 43C).

FIG. 44 shows a roller apex sealing system. It is applicable for use with gates, vanes and rectangular pistons. It can be used to seal small (0.001" to 0.050" or above) gaps between two surfaces, one or both of which may be movable. It consists of a roller in contact with these two surfaces and it rolls on one surface while it slides on another. If it is used to seal a movable gate or vane, which is in periodic relationship to a second sealing member, such as a rotor (i.e. it periodically approaches and moves away from a rotor), then the gate would need tabs, as shown in FIG. 44A or 44B to contain the roller while it is not in contact with the second sealing member. The gas pressure energizes and enhances this seal. Since one of the contacting surfaces is in sliding motion with respect to the roller, it is beneficial to supply it with a lubrication, which would also enable oil-supported hydrodynamic bearing surface.

Both rotors and gates (or vanes or pistons, etc.) require face seals to seal them with flat surfaces of engine covers or integrated rotors. Typical face seal requires anywhere from 0 to 0.010" or more of travel. The main idea behind the split face seal system is to use the surface itself as a seal, instead of using a face seal. To accomplish this we split the surface that requires the face seal into two or more parts and supply a high-temperature elastomeric or resilient metal member (mid-plane seal) between two or more parts.

To illustrate this approach, FIGS. 45A-45C show a split rotor face seal, consisting of two parts. These face seals are supported by ball bearings to reduce the sliding friction. Face seals are energized by coil springs or wave washer spring (not shown). The mid-plane seal also provides some energy to the face seals, but its main function is to seal the gap. Due to the steep angle (~12 deg), the vertical motion of the face seals, which is on the order of +/−0.005" is translated into radial movement of the mid-plane seal on the order of less than 0.001".

FIG. 43C) shows a split gate face seal, which also consists of two parts.

If the surface is split into many part, each requiring a very small gap on the order of 0.0001" to be sealed, then instead of an elastomer or resilient metal oil pressurized to 10-15 psi may be used. The oil will not flow through the 0.0001" gap, thus, providing both the energy and a sealing function.

A similar approach is used to provide an apex seal An apex seal may be provided on a gate, vane, or piston being split into co-planar or co-radial elements that allow a relative motion between these elements. Each of these elements performs its original function and is energized independently of the other elements. FIG. 45 gives an example of this approach for vanes, which are split into two vanes, each providing the same function, except that the apex sealing function is enhanced especially if oil is used as it will collect between two vanes and provide for an additional sealing. Each half-vane is energized separately, in this case by a centrifugal force. Two or more co-planar or co-radial vanes may be used.

A rotor face may also be enhanced by providing a rotor face with radial features such as ridges (see i.e. FIG. 40E), dimples, strips, etc. radiated in a radial direction and disposed on a flat surface of the rotor. These features reduce tangential flow of the fluid across the flat face surface of the rotor. These features may be used alone or in combination with conventional face seals and with seals offered in this application.

This statement equally applies to all of the seals in this application. The seals, which are provided herein, may be used alone or in combination with each other and with other concepts presented herein. For example, the apex seal shown in FIGS. 47A-47E, can double up as a catalyst carrier. It is formed by the thin plate (0.005" to 0.025" thick or above) used as a catalytic trigger for a combustion reaction as was described above. Such a plate is naturally spring loaded as the plate tends to stay flat and also due to centrifugal force, acting on the ends of the plate, which force the plate ends toward the housing walls, thus providing the sealing. The edge of such a plate should only protrude a few thousands of an inch to cover for the manufacturing tolerances and thermal expansion of the rotor and the housing walls. The material for the spring should be chosen to be harder than the walls to reduce the wearing of the edges. Additional features on the trailing edge of such a plate (not shown) may be used to provide a constant preload on the plate against the slot of the rotor in which the plate is placed. Similarly designed face seals are shown in 47A, 47B, and 47E. These seals are also seated within machined groves. The depths of the grooves are the same as thickness of the face seals, but the seals protrude from the face of the rotor 0.005 to 0.010" due to the natural curvature of the seal. The sealing is done by the edge of the seal.

The gas pressure energizes and enhances this seal. Since one of the contacting surfaces is in sliding motion with respect to the Roller, it is beneficial to supply it with a lubrication, which would also enable oil-supported hydrodynamic bearing surface.

Various embodiments of the present invention may be characterized by the potential claims listed in the paragraphs following this paragraph (and before the actual claims provided at the end of this application). These potential claims form a part of the written description of this application. Accordingly, the following potential claims may be presented as actual claims in later proceedings involving this application or any application claiming priority based on this application.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A rotary engine comprising:
   a rotor,
   a housing, and
   a first cover and a second cover axially disposed on opposing sides of the rotor, wherein during a course of its rotation, the rotary engine forms a compression chamber, a combustion chamber, an expansion chamber, and a scavenging chamber configured to perform both intake and exhaust; and wherein the rotary engine further comprises:
   a. an inlet port through the first cover;
   b. an outlet port through the second cover; and
   c. a fan operably coupled to the inlet port, the outlet port, or both, and disposed to blow the air through the scavenging chamber to execute a scavenged operating cycle, wherein exhaust gases are removed from the scavenging chamber and fresh air or an air/fuel mixture enter into the scavenging chamber.

2. The rotary engine of claim 1, wherein the inlet port is located opposite to the outlet port and the fan is configured to blow the fresh air or the air/fuel mixture through the inlet port.

3. The rotary engine of claim 1, wherein the rotor is disposed on a rotating shaft, and the fan is disposed on the rotating shaft.

4. The rotary engine of claim 1, wherein the fan is operably coupled to the inlet port.

5. The rotary engine of claim 1, wherein the fan is operably coupled to the outlet port.

6. The rotary engine of claim 1, wherein the rotary engine is a 2-cycle engine.

7. The rotary engine of claim 1, wherein the inlet port is located at an angle to the outlet port, and the fan is configured to blow the fresh air or the air/fuel mixture through the inlet port.

8. The rotary engine of claim 1, wherein the fan is configured to blow air through the scavenging chamber in order to produce an air knife that causes the exhaust gases to be removed from the scavenging chamber as the fresh air or the air/fuel mixture enters the scavenging chamber.

9. The rotary engine of claim 1, wherein the fan is disposed to blow the air through the scavenging chamber in an axial direction.

10. The rotary engine of claim 1, wherein the combustion chamber is a constant volume combustion chamber.

\* \* \* \* \*